United States Patent
Stokes et al.

(10) Patent No.: US 9,947,309 B2
(45) Date of Patent: Apr. 17, 2018

(54) SONAR TRANSDUCER SUPPORT ASSEMBLY SYSTEMS AND METHODS

(71) Applicant: FLIR Systems, Inc., Wilsonville, OR (US)

(72) Inventors: Paul Stokes, Hampshire (GB); Christopher Page, Hampshire (GB); Stephen Pike, Hampshire (GB); Paul Muller, Hampshire (GB); William Sayer, Hampshire (GB); David Wellcome, West Sussex (GB); Gordon Pope, Hampshire (GB)

(73) Assignee: FLIR Systems, Inc., Wilsonville, OR (US)

(*) Notice: Subject to any disclaimer, the term of this patent is extended or adjusted under 35 U.S.C. 154(b) by 400 days.

(21) Appl. No.: 14/749,007

(22) Filed: Jun. 24, 2015

(65) Prior Publication Data

US 2015/0294660 A1 Oct. 15, 2015

Related U.S. Application Data

(63) Continuation-in-part of application No. PCT/US2015/032311, filed on May 22, 2015, which
(Continued)

(51) Int. Cl.
*G10K 11/00* (2006.01)
*G01S 7/521* (2006.01)
(Continued)

(52) U.S. Cl.
CPC ............ *G10K 11/006* (2013.01); *F16M 11/10* (2013.01); *F16M 11/2014* (2013.01);
(Continued)

(58) Field of Classification Search
CPC ........ G01S 15/96; G01S 15/025; G01S 15/87; G01S 15/89; G01S 7/521; G10K 11/006; F16M 13/02; F16M 11/10; F16M 11/2014
(Continued)

(56) References Cited

U.S. PATENT DOCUMENTS 2,671,206 A 3/1954 Krause
3,989,216 A 11/1976 Veatch
(Continued)

FOREIGN PATENT DOCUMENTS

EP 1148347 10/2001
JP 2012/154791 8/2012
(Continued)

*Primary Examiner* — Daniel L Murphy
(74) *Attorney, Agent, or Firm* — Haynes and Boone, LLP

(57) ABSTRACT

Techniques are disclosed for systems and methods for providing accurate and reliable compact sonar systems for mobile structures. In one embodiment, a sonar system includes a mounting bracket, a transducer support arm, and a pivoting mechanism pivotably coupling the transducer support arm to the mounting bracket such that, for forces acting on the transducer support arm that are less than a preselected kick-up level, the pivoting mechanism holds the transducer support arm against such forces and at a user selectable first angular position relative to the mounting bracket, and for forces acting on the transducer support arm that are equal to or greater than the preselected kick-up level, allows the transducer support arm to be moved by those forces to a second angular position relative to the mounting bracket.

17 Claims, 42 Drawing Sheets

FIG. 13A

Related U.S. Application Data is a continuation-in-part of application No. PCT/US2015/015279, filed on Feb. 10, 2015.

(60) Provisional application No. 62/023,787, filed on Jul. 11, 2014, provisional application No. 62/005,819, filed on May 30, 2014, provisional application No. 61/943,170, filed on Feb. 21, 2014.

(51) Int. Cl.

| | |
|---|---|
| *G01S 15/89* | (2006.01) |
| *G01S 15/96* | (2006.01) |
| *G01S 15/02* | (2006.01) |
| *G01S 15/87* | (2006.01) |
| *F16M 11/10* | (2006.01) |
| *F16M 11/20* | (2006.01) |
| *F16M 13/02* | (2006.01) |

(52) U.S. Cl.
CPC .............. *F16M 13/02* (2013.01); *G01S 7/521* (2013.01); *G01S 15/025* (2013.01); *G01S 15/87* (2013.01); *G01S 15/89* (2013.01); *G01S 15/96* (2013.01)

(58) Field of Classification Search
USPC ..................... 367/173; 248/288.11; 29/428
See application file for complete search history.

(56) References Cited

U.S. PATENT DOCUMENTS

| | | | |
|---|---|---|---|
| 4,982,924 A | | 1/1991 | Havins |
| 5,561,641 A | | 1/1996 | Nishimori et al. |
| 5,574,700 A | * | 11/1996 | Chapman ............. G10K 11/006 367/173 |
| 6,050,945 A | | 4/2000 | Petersen et al. |
| 6,798,122 B1 | * | 9/2004 | Howarth ................ G10K 9/121 310/337 |
| 6,806,622 B1 | | 10/2004 | Schmidt et al. |
| 7,542,376 B1 | | 6/2009 | Thompson et al. |
| 2004/0158147 A1 | | 8/2004 | Shifrin |
| 2012/0014220 A1 | | 1/2012 | Depasqua |
| 2014/0010049 A1 | | 1/2014 | Proctor |

FOREIGN PATENT DOCUMENTS

| | | | | |
|---|---|---|---|---|
| WO | WO 2013/063515 | | 5/2013 | |
| WO | WO 2013126761 A1 | * | 8/2013 | ............. G01S 7/521 |
| WO | WO 2015/126678 | | 8/2015 | |

* cited by examiner

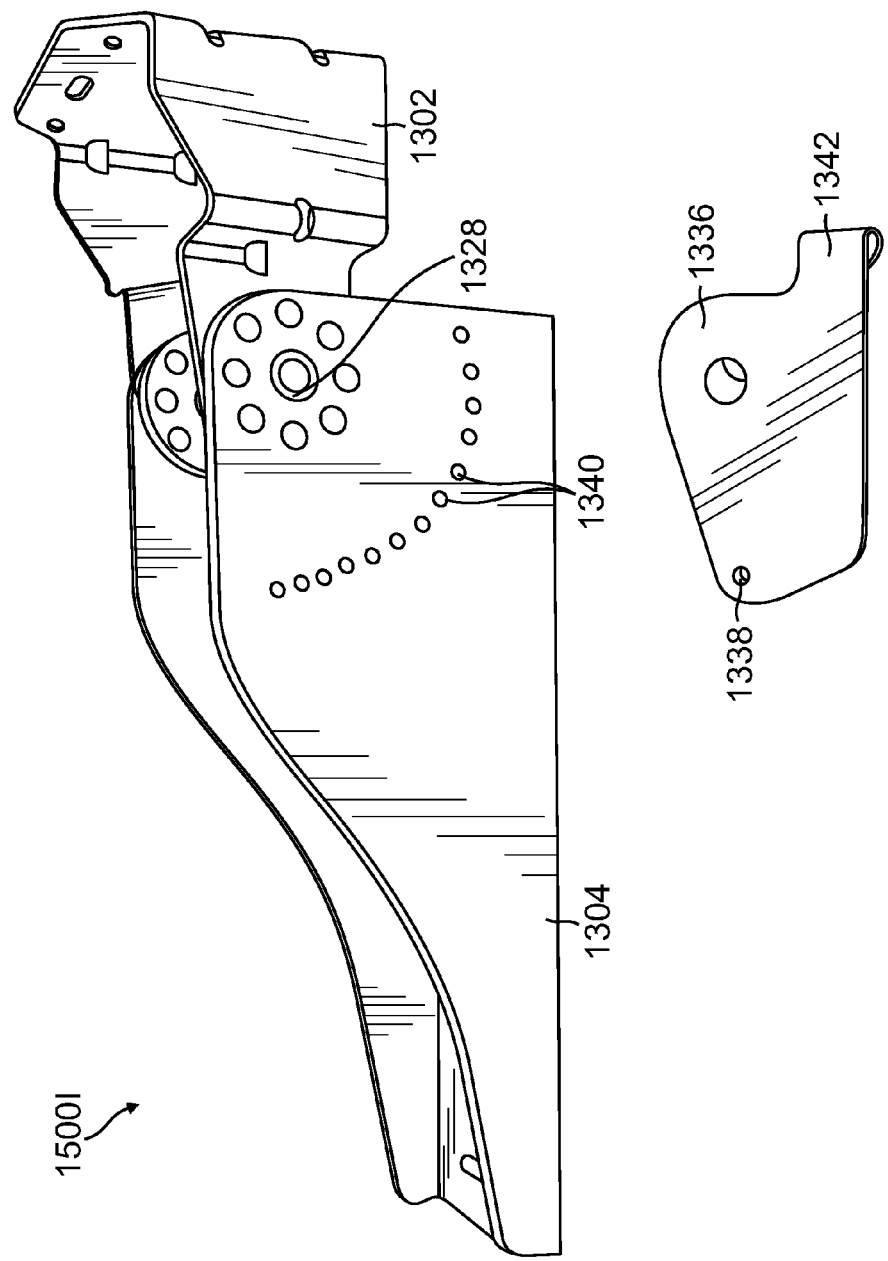

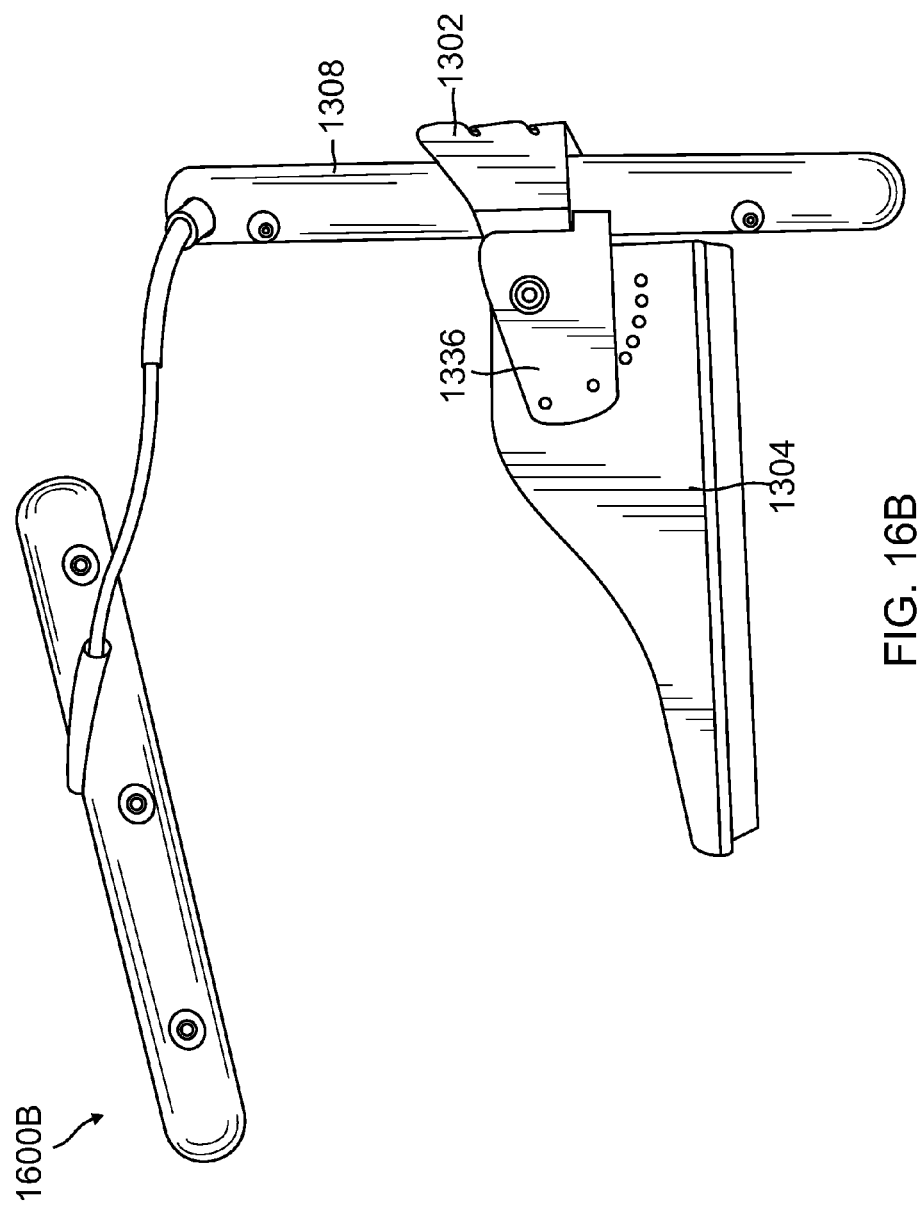

SONAR TRANSDUCER SUPPORT ASSEMBLY SYSTEMS AND METHODS

CROSS REFERENCE TO RELATED APPLICATIONS

This patent application claims priority to and the benefit of U.S. Provisional Patent Application No. 62/023,787, filed Jul. 11, 2014 and entitled "SONAR TRANSDUCER SUPPORT ASSEMBLY SYSTEMS AND METHODS", which is hereby incorporated by reference in its entirety.

This patent application is also a continuation-in-part of International Patent Application No. PCT/US2015/032311, filed May 22, 2015 and entitled "TRANSMISSION SIGNAL SHAPING SYSTEMS AND METHODS", which claims priority to and the benefit of U.S. Provisional Patent Application No. 62/005,819, filed May 30, 2014 and entitled "TRANSMISSION SIGNAL SHAPING SYSTEMS AND METHODS", both of which are hereby incorporated by reference in their entirety.

This patent application is also a continuation-in-part of International Patent Application No. PCT/US2015/015279, filed Feb. 10, 2015 and entitled "MODULAR SONAR TRANSDUCER ASSEMBLY SYSTEMS AND METHODS", which claims priority to and the benefit of U.S. Provisional Patent Application No. 61/943,170, filed on Feb. 21, 2014 and entitled "MODULAR SONAR TRANSDUCER ASSEMBLY SYSTEMS AND METHODS", both of which are hereby incorporated by reference in their entirety.

TECHNICAL FIELD

One or more embodiments of the invention relate generally to sonar transducers and more particularly, for example, to systems and methods for providing modular sonar transducer assemblies.

BACKGROUND

Underwater sonar systems have been used to safely and productively operate watercraft for almost a century. Conventionally, underwater sonar is often used to perform bathymetry, detect underwater hazards, find fish, and/or otherwise assist in navigation by producing data and/or imagery of a water column beneath a watercraft.

Conventional sonar systems are typically expensive and relatively difficult to manufacture. Market pressures and convenience dictate smaller and easier to use systems that include more features and produce higher quality resulting imagery. However, smaller and more accurate sonar systems, particularly with respect to transducer element size and orientation, can be more difficult to manufacture to reliable tolerances, in volume, and can be more difficult to operate reliably.

Thus, there is a need for an improved methodology to provide accurate and reliable compact sonar systems using relatively high yield methods of manufacture, particularly in the context of providing relatively high quality sonar data and/or imagery.

SUMMARY

Techniques are disclosed for systems and methods to provide accurate and reliable compact sonar systems for mobile structures. A modular sonar system may include a number of sonar transducer assemblies and at least two transducer modules disposed substantially within the sonar transducer assemblies. Each transducer module may include a transducer element and a module frame. The module frame may be configured to support the transducer element, to physically couple to other transducer modules, and/or to physically couple to a sonar transducer assembly to secure the transducer module. The system may additionally include an actuator configured to adjust an orientation of a transducer module and/or a logic device to control the actuator. Resulting sonar data and/or imagery may be displayed to a user and/or used to adjust various operational systems of the mobile structure.

In various embodiments, a sonar system may include a gyroscope, an accelerometer, a speed sensor, one or more additional sensors, actuators, controllers, user interfaces, mapping systems, and/or other modules mounted to or in proximity to a vehicle. Each component of the system may be implemented with a logic device adapted to form one or more wired and/or wireless communication links for transmitting and/or receiving sensor signals, control signals, or other signals and/or data between the various components.

In one embodiment, a system may include one or more sonar transducer assemblies adapted to be mounted to a mobile structure and at least two transducer modules disposed substantially within the one or more sonar transducer assemblies. Each transducer module may include a transducer element comprising an emission surface; and a module frame adapted to support the transducer element and/or other modules structures, where the module frame is physically coupled to the one or more sonar transducer assemblies and/or to at least one other transducer module.

In another embodiment, a method may include receiving a measured transducer orientation corresponding to at least one of a plurality of transducer modules disposed substantially within one or more sonar transducer assemblies; determining a transducer orientation adjustment based, at least in part, on a desired transducer orientation and the measured transducer orientation; and controlling an actuator to adjust a transducer orientation corresponding to the at least one transducer module substantially to the desired transducer orientation.

In another embodiment, a method may include assembling at least two transducer modules and assembling one or more sonar transducer assemblies adapted to be mounted to a mobile structure; wherein each transducer module includes a transducer element comprising an emission surface; and a module frame adapted to support the transducer element and/or other module structures; where the at least two transducer modules are disposed substantially within the one or more sonar transducer assemblies; and where each module frame is physically coupled to the one or more sonar transducer assemblies and/or to at least one other transducer module.

In another embodiment, a system includes a mounting bracket, a transducer support arm, and a pivoting mechanism pivotably coupling the transducer support arm to the mounting bracket such that, for forces acting on the transducer support arm that are less than a preselected kick-up level, the pivoting mechanism holds the transducer support arm against those forces and at a user selectable first angular position relative to the mounting bracket, and for forces acting on the transducer support arm that are equal to or greater than the preselected kick-up level, allows the transducer support arm to be moved by those forces to a second angular position relative to the mounting bracket.

In another embodiment, a method comprises providing a mounting bracket and pivotably coupling a transducer support arm to the mounting bracket with a pivoting mechanism such that, for forces acting on the transducer support arm that are less than a preselected kick-up level, the pivoting mechanism holds the transducer support arm against those forces and at a user selectable first angular position relative to the mounting bracket, and for forces acting on the transducer support arm that are equal to or greater than the preselected kick-up level, the pivoting mechanism allows the transducer support arm to be moved by those forces to a second angular position relative to the mounting bracket.

In another embodiment, a method comprises providing a mounting bracket and a transducer support arm and pivotally coupling the transducer support arm to the mounting bracket with a pivoting mechanism that holds the transducer support arm at a user selectable first angular position relative to the mounting bracket and against forces acting on the transducer support arm that are less than a preselected kick-up level and allows the transducer support arm to be moved to a second angular position relative to the mounting bracket by forces acting on the transducer support arm that are equal to or greater than the preselected kick-up level.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE FIGURES OF THE DRAWINGS

FIGS. 16A-16H are views illustrating sequential steps in the assembly of a transducer support and kick-up assembly in accordance with embodiments of the disclosure.

Embodiments of the invention and their advantages are best understood by referring to the detailed description that follows. It should be appreciated that like reference numerals are used to identify like elements illustrated in one or more of the figures of the drawings.

DETAILED DESCRIPTION

In accordance with various embodiments of the present disclosure, accurate and reliable compact sonar systems and methods may advantageously include a controller and one or more adjustable sonar transducer assemblies in conjunction with an orientation sensor, a gyroscope, an accelerometer, and/or a speed sensor providing measurements of an orientation, and angular velocity, an acceleration, and/or a speed of the sonar transducer assemblies and/or a mobile structure. For example, the sensors may be mounted to or within the mobile structure (e.g., a watercraft, aircraft, motor vehicle, and/or other mobile structure), or may be integrated with the sonar transducer assemblies and/or the controller.

Embodiments of the present disclosure can reliably produce higher quality imagery and be easier to use than conventional systems and/or methods by automatically coordinating sonar operation with various orientation and/or position measurements. Moreover, such embodiments are relatively inexpensive to fabricate due to their overall modular methodology, which includes reuse of common components throughout a number of unique sonar transducer arrangements. The unique sonar transducer arrangements, in turn, provide various opportunities to develop new sonar processing and/or data accumulation techniques.

Figure 1:
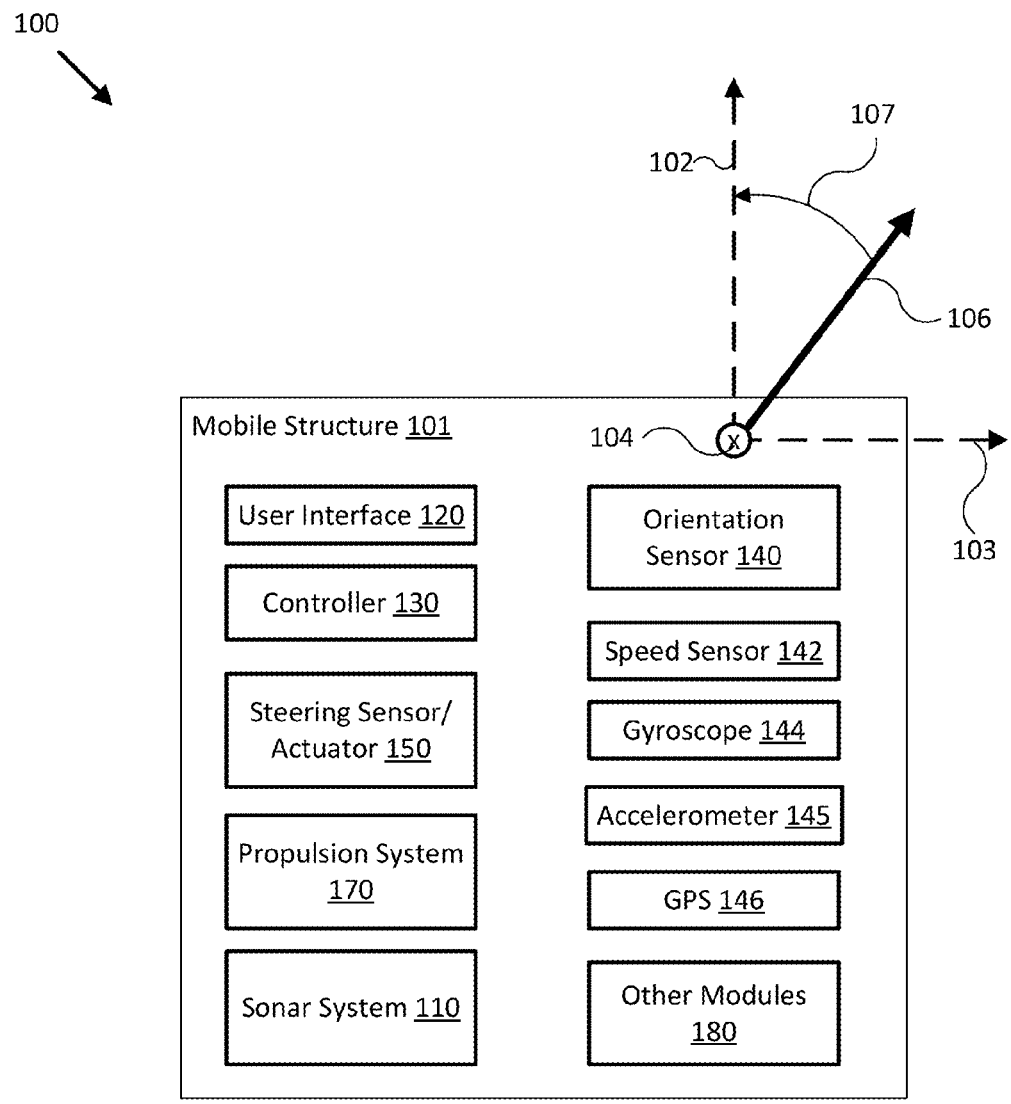
FIG. 1 illustrates a block diagram of a sonar system in accordance with an embodiment of the disclosure.

FIG. 1 illustrates a block diagram of system 100 in accordance with an embodiment of the disclosure. In various embodiments, system 100 may be adapted to measure an orientation, an angular velocity, an acceleration, and a speed of mobile structure 101 and/or sonar system 110. System 100 may then use these measurements to adjust an orientation of sonar system 110 according to a desired operation of sonar system 110 and/or mobile structure 101. In various embodiments, system 100 may display resulting sonar data and/or imagery to a user through user interface 120, and/or use the sonar data and/or imagery to control operation of mobile structure 101, such as controlling steering actuator 150 and/or propulsion system 170 to steer mobile structure 101 according to a desired heading, such as heading angle 107, for example.

In the embodiment shown in FIG. 1, system 100 may be implemented to provide sonar data and/or imagery for a particular type of mobile structure 101, such as an aerial drone, a watercraft, an aircraft, a robot, a vehicle, and/or other types of mobile structures. In one embodiment, system 100 may include one or more of a sonar system 110, a user interface 120, a controller 130, an orientation sensor 140, a speed sensor 142, a gyroscope 144, an accelerometer 145, a global positioning satellite system (GPS) 146, a steering sensor/actuator 150, a propulsion system 170, and one or more other sensors and/or actuators, such as other modules 180. In some embodiments, one or more of the elements of system 100 may be implemented in a combined housing or structure that can be coupled to mobile structure 101 and/or held or carried by a user of mobile structure 101.

Figure 2:
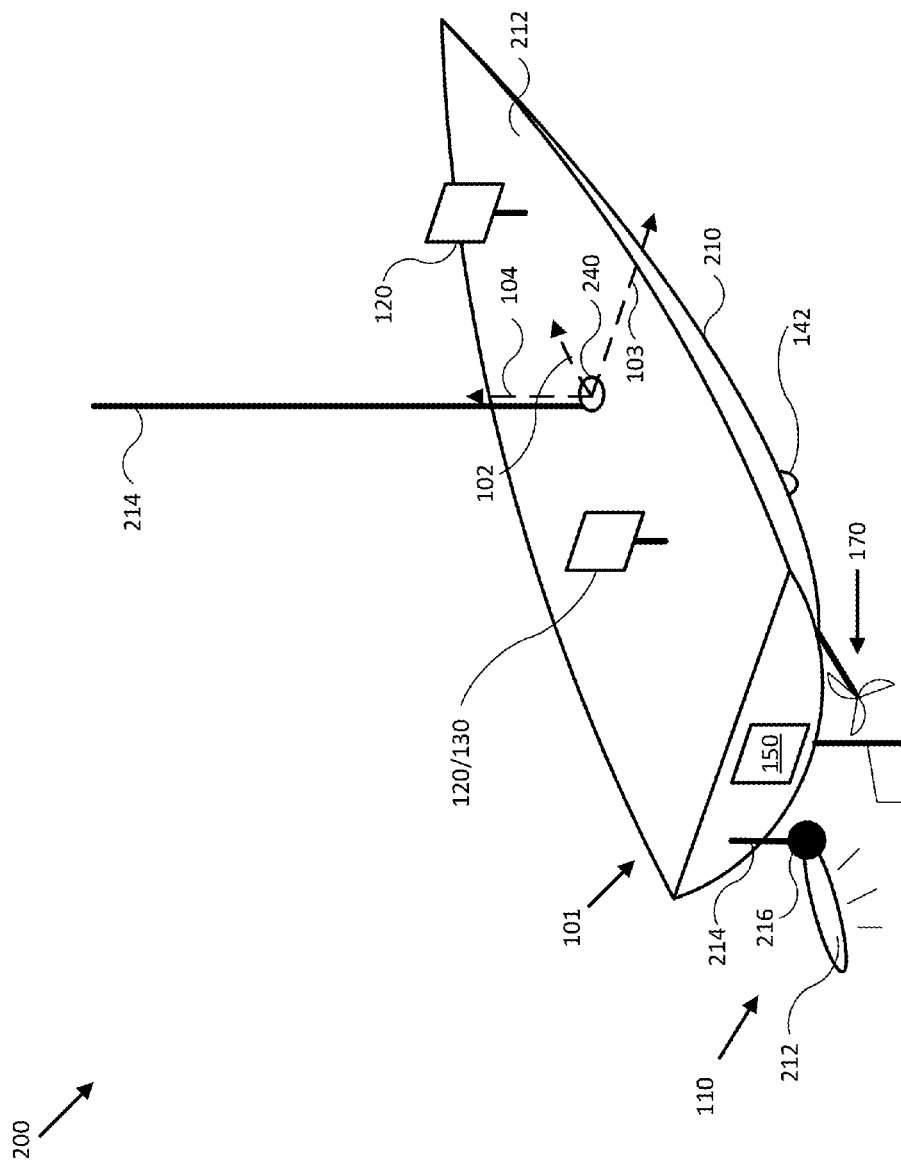
FIG. 2 illustrates a diagram of a sonar system in accordance with an embodiment of the disclosure.

Directions 102, 103, and 104 describe one possible coordinate frame of mobile structure 101 (e.g., for headings or orientations measured by orientation sensor 140 and/or angular velocities and accelerations measured by gyroscope 144 and accelerometer 145). As shown in FIGS. 1 and 2, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation). In some embodiments, directional measurements may initially be referenced to a coordinate frame of a particular sensor (e.g., a transducer assembly or module of sonar system 110) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 referenced to a local gravitational vector but with an unreferenced and/or undefined yaw reference (e.g., no reference to Magnetic North).

Sonar system 110 may be implemented as one or more electrically and/or mechanically coupled controllers, transmitters, receivers, signal processing logic devices, various electrical components, transducer elements of various shapes and sizes, transducer modules, sonar transducer assemblies, assembly brackets, transom brackets, and/or various actuators adapted to adjust orientations of any of the components of sonar system 110, as described herein. Sonar system 110 may be configured to emit one or a series of acoustic beams, receive corresponding acoustic returns, and convert the acoustic returns into sonar data and/or imagery, such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

In some embodiments, sonar system 110 may be implemented using a modular design, where one or more individual transducer modules with similar and/or identical components may be physically coupled to corresponding sonar transducer assemblies, which may in turn be physically coupled to mobile structure 101 using one or more of an assembly bracket and/or a transom bracket. In some embodiments, sonar system 110 may include multiple sonar transducer assemblies, for example, and/or may include multiple transducer modules substantially within each sonar transducer assembly. Each transducer module may include one or more transducer elements (e.g., the active elements emitting and/or receiving acoustic signals), and each transducer element may itself be implemented as a transducer element assembly formed from multiple individual shaped elements, as described more fully with respect to FIGS. 3A-3C. Due to their modular form, the transducer modules may be used to form a variety of transducer arrangements within the transducer assemblies, and the transducer assemblies may be used to form still larger and/or more complex arrangements, without a need to characterize and validate each design exhaustively. Furthermore, the modular designs facilitate creation of accurate and adjustable arrangements that can be configured to produce highly detailed and accurately registered sonar data/imagery.

For example, in some embodiments, sonar system 110 may be implemented with an actuated depression angle adjustment (e.g., an orientation measured from a horizontal reference plane) that can be remotely controlled by controller 130 and/or user interface 120, such as a multifunction display (MFD). In such embodiments, sonar system 110 may be configured to store depression angles along with other sensor information such as location/position information (global positioning data and/or text description), water depth, altitude, mobile structure speed, and/or other sensor and/or control information available to the MFD. Controller 130 may be configured to generate a look up table so that a user can select optimum depression angles for a particular location or for some other sensor information. Alternatively, an automated adjustment algorithm can be used to select optimum depression angles based on the sensor information.

For example, in one embodiment, mobile structure 101 may be located in an area identified on an MFD chart from position data, a user may have selected a user setting for optimum depression angle, and controller 130 may be configured to control an actuator to set this angle/orientation. In another embodiment, controller 130 may be configured to determine water depth and/or altitude, and use such data to control the depression angle to maintain an optimum orientation for the reported depths/altitudes. In yet another embodiment, a user may be searching for fish in a wide area and may select a depression angle setting that will adjust the transducer orientation to a shallow depression angle to ensonify a relatively broad, shallow area. In still another embodiment, controller 130 may be configured to receive attitude and/or orientation measurements for mobile structure 101. In such embodiment, controller 130 may be configured to control the actuators associated with the transducer modules to maintain their attitude relative to, for example, the water surface, and thus improve the displayed sonar images (e.g., by ensuring proper registration of a series of acoustic signals). In various embodiments, controller 130 may be configured to control steering sensor/actuator 150 and/or propulsion system 170 to adjust a position and/or orientation of mobile structure 101 to help ensure proper registration of a series of acoustic signals, sonar data, and/or sonar imagery.

Although FIG. 1 shows various sensors and/or other components of system 100 separate from sonar system 110, in other embodiments, any one or combination of sensors and components of system 100 may be integrated with a sonar assembly, an actuator, a transducer module, and/or other components of sonar system 110. For example, orientation sensor 140 may be integrated with a transducer module of sonar system 110 and be configured to provide measurements of an absolute and/or relative orientation (e.g., a roll, pitch, and/or yaw) of the transducer module to controller 130 and/or user interface 120, which may also be integrated with sonar system 110.

User interface 120 may be implemented as a display, a touch screen, a keyboard, a mouse, a joystick, a knob, a steering wheel, a ship's wheel or helm, a yoke, and/or any other device capable of accepting user input and/or providing feedback to a user. In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods.

In various embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101. In such embodiment, user interface 120 may be adapted to process the sensor signals to determine sensor information indicating an estimated and/or absolute roll, pitch, and/or yaw (attitude and/or rate), and/or a position or series of positions of mobile structure 101, for example, and display the sensor information as feedback to a user. In one embodiment, user interface 120 may be adapted to display a time series of various sensor information and/or other parameters as part of or overlaid on a graph or map, which may be referenced to a position and/or orientation of mobile structure 101. For example, user interface 120 may be adapted to display a time series of positions, headings, and/or orientations of mobile structure 101 and/or other elements of system 100 (e.g., a transducer assembly and/or module of sonar system 110) overlaid on a geographical map, which may include one or more graphs indicating a corresponding time series of actuator control signals, sensor information, and/or other sensor and/or control signals.

In some embodiments, user interface 120 may be adapted to accept user input including a user-defined target heading, route, and/or orientation for a transducer module, for example, and to generate control signals for steering sensor/actuator 150 and/or propulsion system 170 to cause mobile structure 101 to move according to the target heading, route, and/or orientation. In further embodiments, user interface 120 may be adapted to accept user input including a user-defined target attitude for an actuated device (e.g., sonar system 110) coupled to mobile structure 101, for example, and to generate control signals for adjusting an orientation of the actuated device according to the target attitude. More generally, user interface 120 may be adapted to display sensor information to a user, for example, and/or to transmit sensor information and/or user input to other user interfaces, sensors, or controllers of system 100, for instance, for display and/or further processing.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of sonar system 110, steering sensor/actuator 150, mobile structure 101, and/or system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for actuated device control, steering control (e.g., using steering sensor/actuator 150) and/or performing other various operations of mobile structure 101 and/or system 100. In some embodiments, a control loop may include processing sensor signals and/or sensor information in order to control one or more operations of sonar system 110, mobile structure 101, and/or system 100.

Orientation sensor 140 may be implemented as one or more of a compass, float, accelerometer, and/or other device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide roll, pitch, and/or yaw rates for mobile structure 101 (e.g., using a time series of orientation measurements). Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101.

Gyroscope 144 and/or accelerometer 145 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). Gyroscope 144 and/or accelerometer 145 may be positioned and/or adapted to make such measurements in relation to a particular coordinate frame of mobile structure 101, for example. In various embodiments, gyroscope 144 and accelerometer 145 may be implemented in a common housing and/or module to ensure a common reference frame or a known transformation between reference frames.

GPS 146 may be implemented as a global positioning satellite receiver and/or other device capable of determining absolute and/or relative position of mobile structure 101 based on wireless signals received from space-born and/or terrestrial sources, for example, and capable of providing such measurements as sensor signals that may be communicated to various devices of system 100. In some embodiments, GPS 146 may be adapted to determine a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information.

Steering sensor/actuator 150 may be adapted to physically adjust a heading of mobile structure 101 according to one or more control signals, user inputs, and/or a stabilized attitude estimates provided by logic device of system 100, such as controller 130. Steering sensor/actuator 150 may include one or more actuators and control surfaces (e.g., a rudder or other type of steering mechanism) of mobile structure 101, and may be adapted to physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated and coupled to and/or integrated with steering sensor/actuator 150, for example, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), or an aircraft propeller or turbine with a variable thrust vector, for example.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example. In some embodiments, other modules 180 may include one or more actuated devices (e.g., spotlights, cameras, radars, sonars, and/or other actuated devices) coupled to mobile structure 101, where each actuated device includes one or more actuators adapted to adjust an orientation of the device, relative to mobile structure 101, in response to one or more control signals (e.g., provided by controller 130).

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100. In one embodiment, such method may include instructions to receive an orientation, acceleration, and/or speed of mobile structure 101 and/or sonar system 110 from various sensors, to determine an a transducer orientation adjustment (e.g., relative to a desired transducer orientation) from the sensor signals, and/or to control an actuator to adjust a transducer orientation accordingly, for example, as described herein. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein. For example, the same or similar components may be used to create an acoustic pulse, convert the acoustic pulse to an excitation signal and transmit it to a sonar transducer element to produce an acoustic beam, receive an acoustic return (e.g., electrical signals from the sonar transducer element), convert the acoustic return to acoustic data, and/or store sensor information, configuration data, and/or other data corresponding to operation of a sonar system, as described herein. Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various measurements of magnetic fields and accelerations. For example, gyroscope 144, accelerometer 145, and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cells or other electrical power generating devices (e.g., a wind or water-powered turbine, or a generator producing electrical power from motion of one or more elements of system 100). In some embodiments, one or more of the devices may be powered by a power source for mobile structure 101, using one or more power leads.

In various embodiments, a logic device of system 100 (e.g., of gyroscope 144, accelerometer 145, and/or other elements of system 100) may be adapted to determine parameters (e.g., using signals from various devices of system 100) for transforming a coordinate frame of sonar system 110 and/or other sensors of system 100 to/from a coordinate frame of mobile structure 101, at-rest and/or in-motion, and/or other coordinate frames, as described herein. One or more logic devices of system 100 may be adapted to use such parameters to transform a coordinate frame of sonar system 110 and/or other sensors of system 100 to/from a coordinate frame of orientation sensor 140 and/or mobile structure 101, for example. Furthermore, such parameters may be used to determine and/or calculate one or more adjustments to an orientation of sonar system 110 that would be necessary to physically align a coordinate frame of sonar system 110 with a coordinate frame of orientation sensor 140 and/or mobile structure 101, for example, or an absolute coordinate frame. Adjustments determined from such parameters may be used to selectively power adjustment servos/actuators (e.g., sonar system 110 and/or other sensors or elements of system 100), for example, or may be communicated to a user through user interface 120, as described herein.

FIG. 2 illustrates a diagram of a system 200 in accordance with an embodiment of the disclosure. In the embodiment shown in FIG. 2, system 200 may be implemented to provide sonar data and/or imagery for use with operation of mobile structure 101, similar to system 100 of FIG. 1. For example, system 200 may include sonar system 110, integrated user interface/controller 120/130, secondary user interface 120, steering sensor/actuator 150, sensor cluster 240 (e.g., orientation sensor 140, gyroscope 144, accelerometer 145, and/or GPS 146), and various other sensors and/or actuators. In the embodiment illustrated by FIG. 2, mobile structure 101 is implemented as a motorized boat including a hull 210, a deck 212, a mast/sensor mount 214, a rudder 266, an inboard motor 170, and an actuated sonar system 110. In other embodiments, hull 210, deck 212, mast/sensor mount 214, rudder 266, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 2, mobile structure 101 includes actuated sonar system 110, which in turn includes transducer assembly 212 coupled to mobile structure 101 through assembly bracket/actuator 216 and transom bracket/electrical conduit 214. In some embodiments, assembly bracket/actuator 216 may be implemented as a roll, pitch, and/or yaw actuator, for example, and may be adapted to adjust an orientation of transducer assembly 212 according to control signals and/or an orientation (e.g., roll, pitch, and/or yaw) or position of mobile structure 101 provided by user interface/controller 120/130. For example, user interface/controller 120/130 may be adapted to receive an orientation of transducer assembly 212 configured to ensonify a portion of surrounding water and/or a direction referenced to an absolute coordinate frame, and to adjust an orientation of transducer assembly 212 to retain ensonification of the position and/or direction in response to motion of mobile structure 101, using one or more orientations and/or positions of mobile structure 101 and/or other sensor information derived by executing the various methods described herein. In another embodiment, user interface/controller 120/130 may be configured to adjust an orientation of transducer assembly 212 to direct sonar transmissions from transducer assembly 212 substantially downwards and/or along a predetermined underwater track during motion of mobile structure 101.

In one embodiment, user interfaces 120 may be mounted to mobile structure 101 substantially on deck 212 and/or mast/sensor mount 214. Such mounts may be fixed, for example, or may include gimbals and other leveling mechanisms/actuators so that a display of user interfaces 120 stays substantially level with respect to a horizon and/or a "down" vector (e.g., to mimic typical user head motion/orientation). In another embodiment, at least one of user interfaces 120 may be located in proximity to mobile structure 101 and be mobile throughout a user level (e.g., deck 212) of mobile structure 101. For example, secondary user interface 120 may be implemented with a lanyard and/or other type of strap and/or attachment device and be physically coupled to a user of mobile structure 101 so as to be in proximity to mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 2, in some embodiments, speed sensor 142 may be mounted to a portion of mobile structure 101 substantially below a typical user level, such as to hull 210, and be adapted to measure a relative water speed. Speed sensor 142 may be adapted to provide a thin profile to reduce and/or avoid water drag. Speed sensor 142 may include one or more batteries and/or other electrical power storage devices, for example, and may include one or more water-powered turbines to generate electrical power. In other embodiments, speed sensor 142 may be implemented as a wind velocity sensor, for example, and may be mounted to mast/sensor mount 214 to have relatively clear access to local wind.

In the embodiment illustrated by FIG. 2, mobile structure 101 includes direction/longitudinal axis 102, direction/lateral axis 103, and direction/vertical axis 104 meeting approximately at mast/sensor mount 214 (e.g., near a center of gravity of mobile structure 101). In one embodiment, the various axes may define a coordinate frame of mobile structure 101 and/or sensor cluster 240. Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 200 and/or mobile structure 101. Each element of system 200 may be located at positions different from those depicted in FIG. 2. Each device of system 200 may include one or more batteries or other electrical power storage devices, for example, and may include one or more solar cells or other electrical power generating devices. In some embodiments, one or more of the devices may be powered by a power source for mobile structure 101. As noted herein, each element of system 200 may be implemented with an antenna, a logic device, and/or other analog and/or digital components enabling that element to provide, receive, and process sensor signals and interface or communicate with one or more devices of system 200. Further, a logic device of that element may be adapted to perform any of the methods described herein.

Figure 3A:
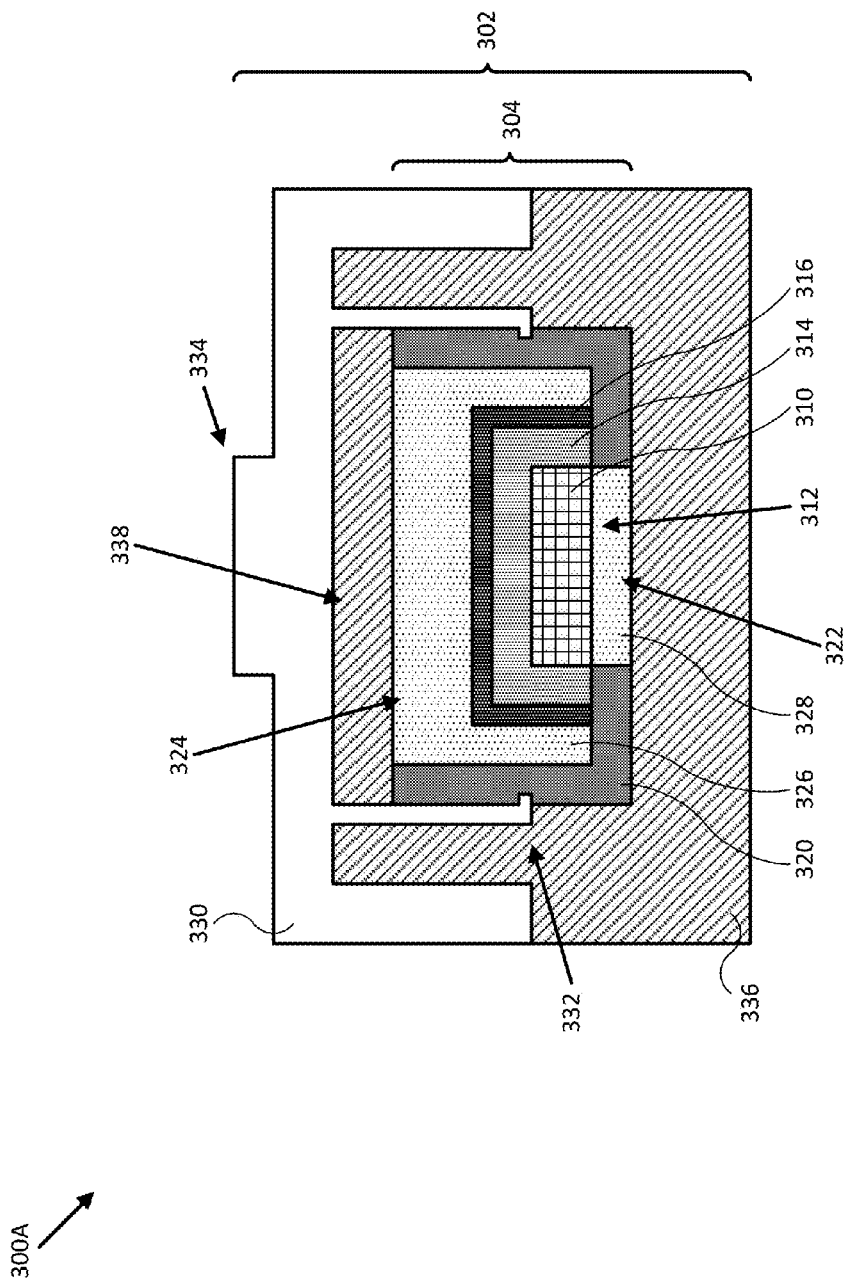
FIG. 3A illustrates a cross section of a sonar transducer assembly in accordance with an embodiment of the disclosure.

FIG. 3A illustrates a cross section 300 of a sonar transducer assembly 302 (e.g., similar to transducer assembly 212 of FIG. 2) in accordance with an embodiment of the disclosure. In the embodiment shown in FIG. 3, transducer assembly 302 is physically coupled to a transducer module 304. In some embodiments, transducer assembly 302 may include more than one transducer modules. In various embodiments, transducer module 304 may include one or more transducer elements 310, insulating covers 314, conductive cans 316, and module frame 320. In addition, transducer module 304 may include a number of recesses, such as bottom recess 322 and top recess 324, that may be filled with a material to secure electrical connections/wiring (not shown in FIG. 3A) and/or the various elements of transducer module 304, using a potting layer 326 for example, and/or to provide an acoustic matching layer 328. Transducer module 302 may be physically coupled to transducer assembly 302 (e.g., to assembly top 330) using one or more clips 332, for example, and/or other physical retention systems, such as those described herein. In other embodiments, transducer module 304 and/or assembly top 330 may be physically coupled to assembly bottom 336, such as through a molding process and/or another physical retention system. As shown in FIG. 3A, assembly top 330 and assembly bottom 336 may be coupled together to form transducer assembly 302.

Transducer element 310 may be implemented as one or more substantially linear and/or conical transducer elements, for example, and be made of a ceramic material, a metal or alloy material, a piezoelectric material, a combination of insulating and conductive materials, and/or other single or multi-layered transducing materials that can be energized by an electrical signal to produce an acoustic signal or beam, such as an acoustic signal/beam emitted from emission surface 312 of transducer element 310. In some embodiments, transducer element 310 may also be configured to sense acoustic returns received through emission surface 312. Electrical signals used to energize transducer element 310 and/or produced by received acoustic returns may be coupled directly (e.g. through soldered wiring) and/or indirectly (e.g., inductively and/or through electric field coupling), for example, and access to transducer element 310 may be provided by recesses and/or other structures of insulating cover 314, conductive can 316, potting layer 326, and/or module frame 320.

Conductive can 316 may be implemented as a stamped metal can, a metal foil can, a conductive ceramic can, a mu metal can, and/or other conductive can that may be used to shield transducer element 310 from external electrical and/or magnetic noise and, in some embodiments, may be used to help shape an acoustic beam emitted from emission surface 312, similar to how a ground plane can help shape an antenna radiation pattern. For example, a shape and/or material of conductive can 316 may be selected to help provide uniformity in an acoustic beam emitted from transducer element 310, for example, or to help direct the acoustic beam from emission surface 312 through acoustic matching layer 328. More generally, conductive can 316 may be configured to surround substantially all but emission surface 312 of transducer element 310. Insulating cover 314 may be implemented as one or more of an insulating foam or a deposited, grown, and/or painted insulating layer configured to prevent electrical shorting between transducer element 310 and conductive can 316.

As shown in FIG. 3A, module frame 320 may be configured to support transducer element 310, conductive can 316, and/or insulating cover 314, for example, so as to provide a stable support structure for the various elements of transducer module 304 and access to emission surface 312. In various embodiments, module frame 320 may also be configured to support potting layer 326 and/or acoustic matching layer 328 by, for example, providing top and bottom recesses 324 and 322 that can be filled by a material used to secure the various elements of transducer module 304 (e.g., including electrical connections to transducer element 310) and/or to provide acoustic matching layer 328. In additional embodiments, module frame 320 may be implemented with notches and/or other structures to engage with clips and/or other retention systems of transducer assembly 302.

In some embodiments, module frame 320 may be a machined, cast, and/or injection molded material, such as a ceramic and/or a plastic (e.g., a polycarbonate, polyurethane, and/or other plastic) material that can be formed into one or more rigid, pliable, and/or combination of rigid and pliable structures, as described herein. In some embodiments, recess 322 of module frame 320 (e.g., and acoustic matching layer 312) may be wider than shown in FIG. 3A, such that module frame 320 may be faulted from a conductive material (e.g., similar to conductive can 316) without risk of electrical short to transducer element 310. In such embodiments, module frame 320 may be used to help shield transducer element 310 from external noise and to help shape an acoustic beam emitted from emission surface 312.

In the embodiment shown in FIG. 3A, potting layer 326 and acoustic matching layer 328 may be made from the same material and may be formed during the same potting process used to assemble and secure transducer module 304. For example, potting layer 326 and acoustic matching layer 328 may be formed from a filled epoxy that can be injected into recesses 322 and 324 and allowed to cure to form potting layer 326 and acoustic matching layer 328. In some embodiments, potting layer 326 and/or acoustic matching layer 328 may be made from different materials, may be pre-formed, and/or may be individually inserted and secured/sealed into module frame 320.

In particular, acoustic matching layer 328 may be configured (e.g., through selection of shape, thickness, and/or material, including variations in each) to allow transducer module 304 (and transducer assembly 302) to be operated at a much wider frequency band (e.g., transmit and/or receive band) than conventional sonar systems. For example, acoustic matching layer may be formed from a metal or metal oxide filled epoxy (e.g., alumina, stainless steel, copper, and/or other metal and/or metal oxide powder, flakes, microballs, and/or other type of filler). In some embodiments, a thickness of acoustic matching layer 328 may roughly correspond to a quarter-wavelength of the excitation signal (e.g., of a central frequency of the excitation signal) used to generate acoustic beams using transducer element 310. More generally, acoustic matching layer 328 may be used to protect transducer element 310 from the environment, for example, and, in some embodiments, may be implemented as part of assembly bottom 336. In various embodiments, the shapes and/or thickness of each of potting layer 326 and acoustic matching layer 328 may be determined by the shape of recesses 322 and/or 324.

As shown in FIG. 3A, transducer assembly 302, which includes assembly top 330 and assembly bottom 336, may be configured to physically couple to and/or provide structural and/or protective support for transducer module 304. In some embodiments, assembly top 330 may be implemented from a machined, cast, and/or injection molded material, such as a metal, ceramic, and/or plastic (e.g., a polycarbonate, polyurethane, and/or other plastic) material that can be formed into one or more rigid, pliable, and/or combination of rigid and pliable structures, as described herein. In various embodiments, assembly top 330 may be Ruined with one or more retention systems, such as clips 332, to physically couple and secure transducer module 304 to transducer assembly 302. Such retention systems may include one or more actuators, for example, that are configured to adjust an orientation of transducer module 304 relative to transducer assembly 302 based on one or more control signals (e.g., provided by controller 130). Assembly top 330 may include one or more recesses 338 configured to accept transducer module 304 and/or a portion of assembly bottom 336.

Assembly bottom 336, like assembly top 330, may be configured to physically couple to and/or provide structural and/or protective support for transducer module 304. In addition, in some embodiments, assembly bottom 336 may be configured to allow acoustic beams and acoustic returns (e.g., typically with a wider frequency band than emitted acoustic beams) to pass through between transducer element 310 and a surrounding medium (e.g., a water column and/or volume and bottom profile beneath and/or around a watercraft) with minimal attenuation and/or signal anisotropies due to, for example, material damping and/or poor acoustic coupling. For example, in some embodiments, assembly bottom 336 may be formed from a polyurethane plastic and/or other types of thermosetting polymers substantially transparent to acoustic signals and able to be overmolded into and/or around assembly top 330 and/or transducer module 304. In other embodiments, assembly bottom may be pre-formed and sealed (e.g., thermally, and/or through use of a glue or epoxy resin) to assembly top 330 and/or transducer module 304. In still further embodiments, transducer module 304 may be physically coupled to assembly bottom 336 using one or more retention systems before assembly bottom 336 is attached/sealed to assembly top 330. In general, assembly bottom 330 may be implemented from a machined, cast, and/or injection molded material, such as a metal, ceramic, and/or plastic material that can be formed into one or more rigid, pliable, and/or combination of rigid and pliable structures. Other methods of forming transducer assembly 302 are contemplated, such as forming vertically symmetric port and starboard assemblies (e.g., roughly corresponding to top and bottom assemblies 330 and 336), coupling transducer module 304 to one of the port or starboard assemblies, and then attaching/sealing the other of the port or starboard assemblies to form transducer assembly 302.

In some embodiments, transducer assembly 302/assembly top 330 may also include interface structure 334, for example, to help secure transducer assembly 302 to mobile structure 101, to transom bracket 214, to an assembly bracket, to other transducer assemblies, and/or to other structures. In various embodiments, interface structure 334 may be implemented as an assembly bracket and/or a transom bracket, for example, that is molded into assembly top 330 or otherwise secured to assembly top 330. In further embodiments, interface structure 334 may be implemented with one or more actuators (e.g., assembly bracket/actuator 216) providing roll, pitch, and/or yaw adjustment for an orientation of transducer assembly 302 relative to mobile structure 101. In still further embodiments, interface structure 334 may be implemented with one or more electrical conduits configured to accept electrical cables and/or electrically couple one or more transducer modules 304 to a controller/transmitter/receiver, as described herein.

Figure 3B:
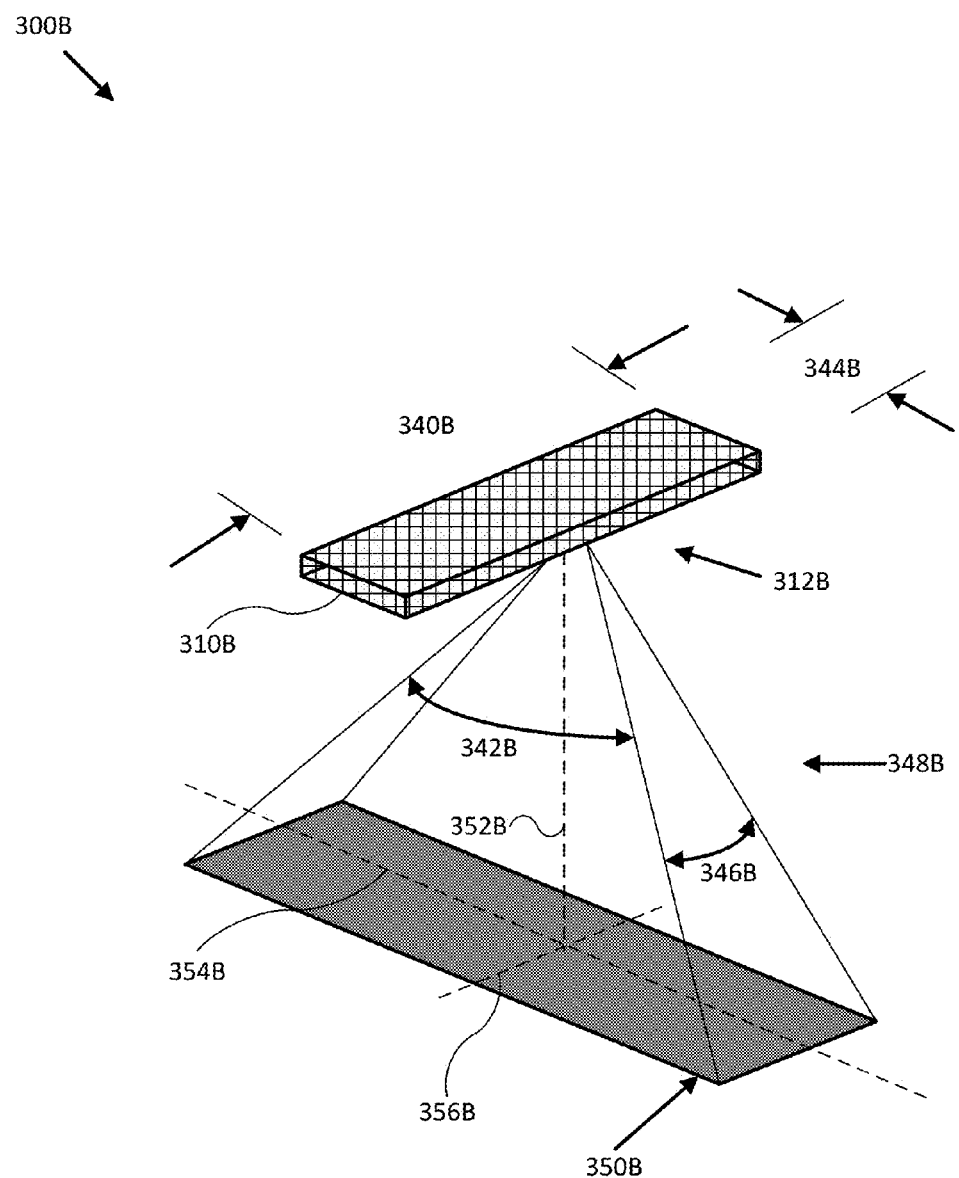
FIGS. 3B-3C illustrate diagrams of various transducer elements and their corresponding acoustic beams in accordance with embodiments of the disclosure.
Figure 3C:
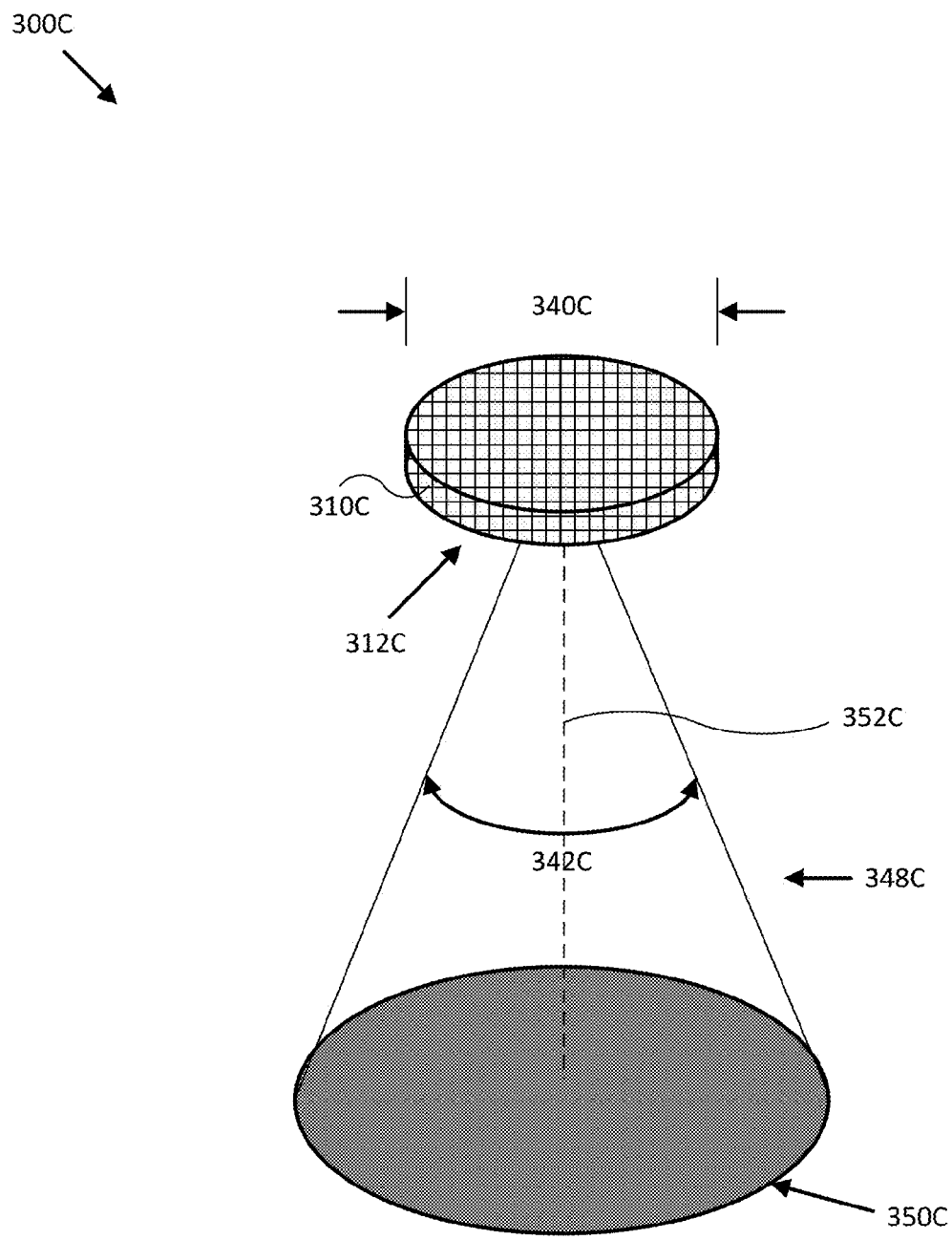

FIGS. 3B-3C illustrate diagrams 300B and 300C of various transducer elements and their corresponding acoustic beams in accordance with embodiments of the disclosure. FIG. 3B shows linear transducer element 310B producing a fan shaped acoustic beam 348B from emission surface 312B having footprint 350B, where linear transducer element 310B and emission surface 312B may correspond to transducer element 310 and emission surface 312 of transducer module 304. The overall dimensions and shape of fan shaped acoustic beam 348B roughly correspond to the radiation pattern produced by linear transducer element 310B as referenced to half power (−3 dB) beamwidth limits of the pattern, as is known in the art. For example, longitudinal length 340B (L1) of transducer element 310B may be roughly related to the lateral beamwidth 346B (B1) by: $B1 \sim 50*\lambda/L1$, and lateral length 344B (L2) of transducer element 310B may be roughly related to the longitudinal beamwidth 342B (B2) by: $B2 \sim 50*\lambda/L2$, where $\lambda$ is the wavelength of the signal used to excite transducer element 310B. Also shown are center axis 352B and orthogonal axes 354B and 356B, which may be used as references to define an orientation and/or aiming angles of transducer element 310B and/or footprint 350B, such as a depression/emission angle and/or a roll, pitch, and/or yaw of transducer element 310B and/or acoustic beam 348B.

FIG. 3C shows circular transducer element 310C producing a conical acoustic beam 348C from emission surface 312C having footprint 350C, where circular transducer element 310C and emission surface 312C may correspond to transducer element 310 and emission surface 312 of transducer module 304. The overall dimensions and shape of conical acoustic beam 348C roughly correspond to the radiation pattern produced by circular transducer element 310C as referenced to half power (−3 dB) beamwidth limits of the pattern, as is known in the art. For example, diameter 340C (D1) of transducer element 310C may be roughly related to the beamwidth 342C (B1) by: $B1 \sim 65*\lambda/D1$, where $\lambda$ is the wavelength of the signal used to energize transducer element 310C. Also shown is center axis 352C, which may be used as a reference to define an orientation and/or aiming/emission angle of transducer element 310C and/or footprint 350C, such as a depression angle and/or a roll and/or pitch of transducer element 310C and/or acoustic beam 348C.

In some embodiments, linear transducer element 310B and/or circular transducer element 310C may be implemented as a transducer element assembly, for example, including multiple individual transducer elements coupled together electrically and/or physically to act as a single transducer element. For instance, in one embodiment, linear transducer element 310B may be implemented as multiple rectangular, circular, and/or otherwise shaped elements soldered together and arranged in a shape roughly corresponding to the shape of linear transducer element 310B, so as to collectively produce fan shaped acoustic beam 348B. In another embodiment, circular transducer element 310C may be implemented as multiple circular, rectangular, and/or otherwise shaped elements soldered together and arranged in an overall shape roughly corresponding to the circular shape of circular transducer element 310C, so as to collectively produce conical acoustic beam 348C. In such embodiments, interstitial spaces between elements may be filled with a material to help secure the elements to each other and form a transducer element assembly. In one embodiment, the interstitial material may be similar the material used for acoustic matching layer 328.

In various embodiments, the orientation and/or aiming angles, the longitudinal beamwidth 342B, lateral beamwidth 346B, and/or beamwidth 342C may be selected (e.g., by adjusting the orientation and/or angles, by selecting a shape and/or size of linear transducer element 310B and/or circular transducer 310C, and/or by adjusting the excitation wavelength) to emphasize detail (e.g., narrower acoustic beams and/or smaller excitation wavelengths) in a particular direction, to emphasize breadth of coverage (e.g., broader acoustic beams and/or larger excitation wavelengths) in a particular direction, and/or to emphasize penetration distance (e.g., narrower acoustic beams and/or larger excitation wavelengths), for example, among other sonar system characteristics. Embodiments of the present disclosure provide the ability to adjust such characteristics according to the local environment (e.g., shallow water, deep sea, approach to a shallow submerged object, tracking of a deep school of fish), according to an operational state of a coupled mobile system (e.g., narrow, forward looking, and quickly updated depth measurements while at speed, broad side and down looking and/or target searching while at rest searching for fish), and/or according to other orientation, position, and/or operational characteristics of a coupled mobile system.

Figure 4A:
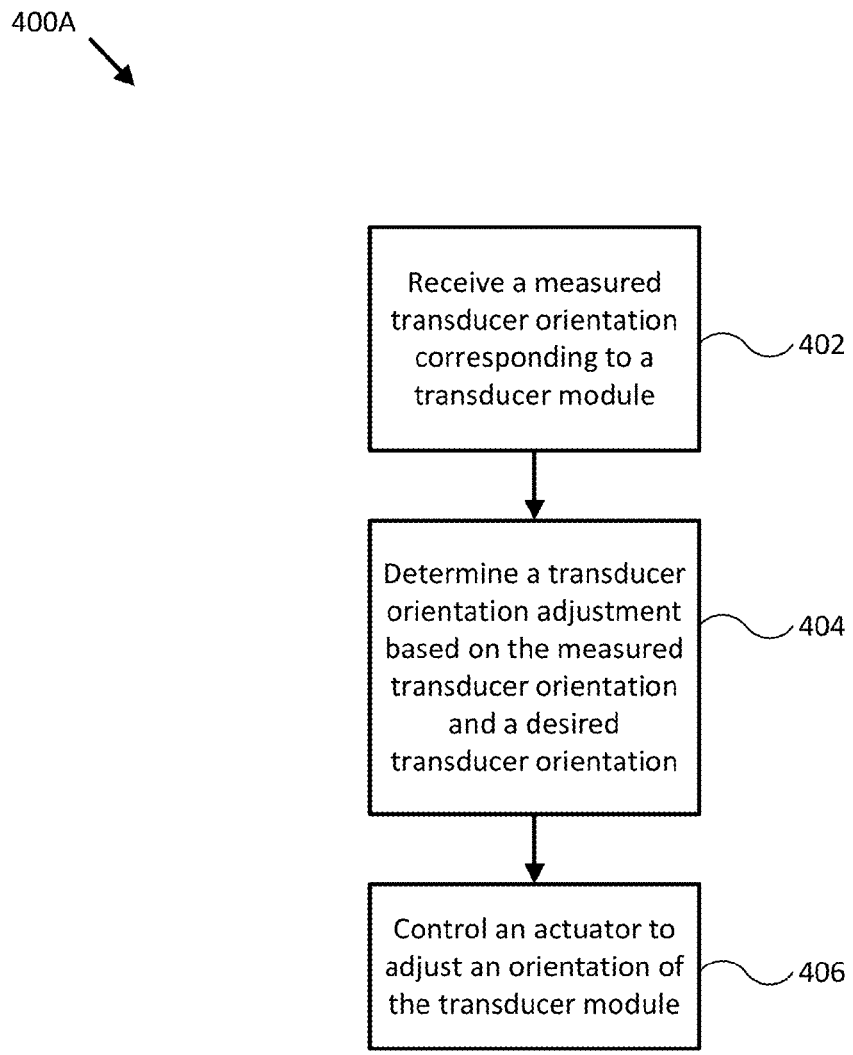
FIG. 4A illustrates a flow diagram of various operations to form a sonar system in accordance with an embodiment of the disclosure.
Figure 4B:
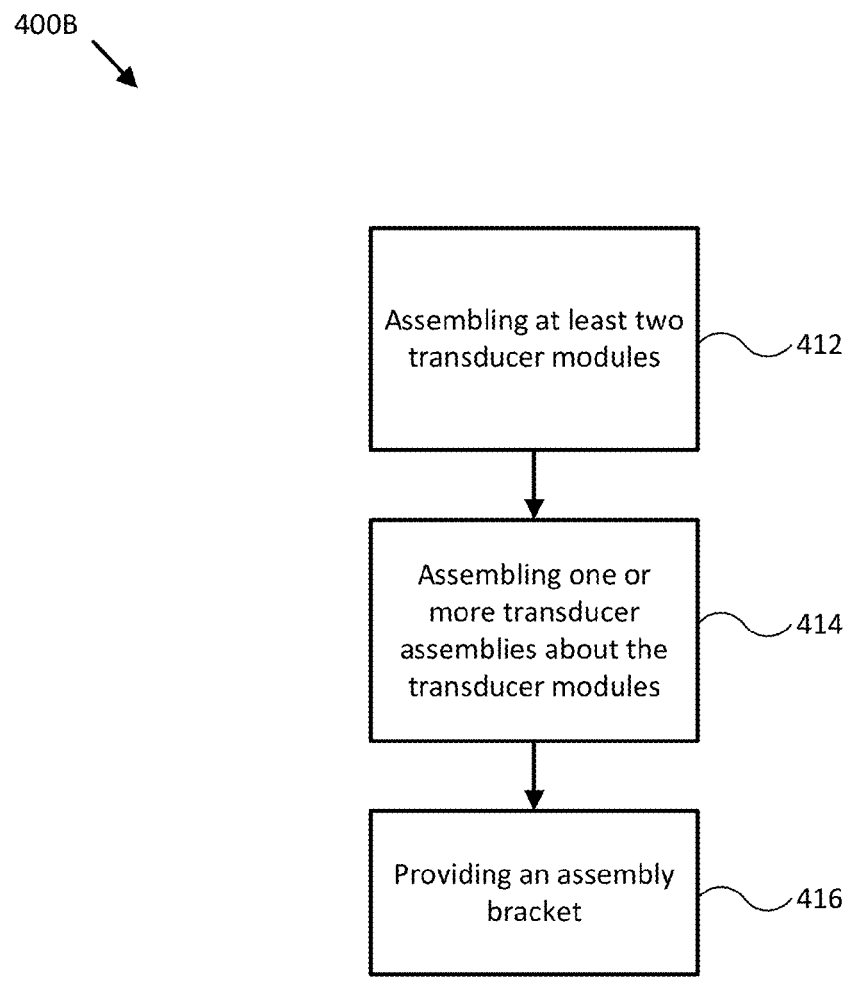
FIG. 4B illustrates a flow diagram of various operations to operate a sonar system in accordance with an embodiment of the disclosure.

FIGS. 4A-4B illustrate flow diagrams of respective processes 400A and 400B to provide sonar data and/or imagery for mobile structure 101 in accordance with embodiments of the disclosure. In some embodiments, the operations of FIGS. 4A-4B may be implemented as software instructions executed by one or more logic devices associated with corresponding electronic devices, sensors, and/or structures depicted in FIGS. 1 through 3C. More generally, the operations of FIGS. 4A-4B may be implemented with any combination of software instructions and/or electronic hardware (e.g., inductors, capacitors, amplifiers, actuators, assembly lines, or other analog and/or digital components).

It should be appreciated that any step, sub-step, sub-process, or block of processes 400A and 400B may be performed in an order or arrangement different from the embodiments illustrated by respective FIGS. 4A-4B. For example, in other embodiments, one or more blocks may be omitted from the various processes, and blocks from one process may be included in another process. Furthermore, block inputs, block outputs, various sensor signals, sensor information, calibration parameters, and/or other operational parameters may be stored to one or more memories (e.g., of systems 100 and/or 200) prior to moving to a following portion of a corresponding process. Although processes 400A and 400B are described with reference to systems 100 and 200 and FIGS. 3A-12, processes 400A and 400B may be performed by other systems different from systems 100 and 200 and including a different selection of electronic devices, sensors, assemblies, mobile structures, and/or mobile structure attributes.

Process 400A represents a method for providing sonar data and/or imagery for mobile structure 101 using systems 100 and/or 200 in accordance with embodiments of the disclosure. At the initiation of process 400A, various system parameters may be populated by prior execution of a process similar to process 400A, for example, or may be initialized to zero and/or one or more values corresponding to typical, stored, and/or learned values derived from past operation of process 400A, as described herein.

In block 402, a logic device receives a measured transducer orientation corresponding to a transducer module. For example controller 130 of system 200 may be configured to receive an absolute and/or relative orientation (e.g., roll, pitch, and/or yaw) from an orientation sensor (e.g., similar to orientation sensor 140) integrated with transducer assembly 212, transom bracket 214, and/or assembly bracket/actuator 216 of sonar system 110. In some embodiments, the measured transducer orientation may correspond to an individual transducer module within transducer assembly 212, for example, or may correspond to an orientation of transducer assembly 212, assembly bracket/actuator 216, and/or transom bracket 214. In various embodiments, the measured transducer orientation may be derived from one or more absolute and/or relative orientation measurements made by orientation sensors, actuators, stepper motors, and/or other devices coupled to mobile structure 200.

In block 404, a logic device determines a transducer orientation adjustment based on the measured transducer orientation and a desired transducer orientation. For example, controller 130 may be configured to determine a transducer orientation adjustment based on the measured transducer orientation received in block 402 and a desired transducer orientation received as user input from user interface 120. In some embodiments, the user input may correspond to a desired absolute transducer orientation, such as substantially gravitationally down regardless of an instantaneous roll and/or pitch of mobile structure 101, for example, or along an absolute heading regardless of a yaw of mobile structure 101. In other embodiments, the user input may correspond to a desired operational state of sonar system 110, for example, such as a fish finding state where the transducer orientation may be selected to ensonify relatively wide swaths of a water column/volume surrounding mobile structure 101 (e.g., relatively small depression angles, or relatively large emission angles).

In some embodiments, the desired transducer orientation may be derived from an estimated water depth, for example, where narrower acoustic beams directed substantially downwards may be preferable over wider acoustic beams directed substantially side to side. For example, controller 130 may be configured to use sonar system 110 to transmit acoustic beams downwards, receive acoustic returns, estimate a water depth based on the acoustic returns, and then aim one or more transducer modules increasingly downwards (e.g., larger depression angles, and/or smaller emission angles) as the water depth increases.

In other embodiments, the desired transducer orientation may be derived from position measurement and/or mapping data for mobile structure 101. For example, controller 130 may be configured to receive positions of mobile structure 101 and determine a desired transducer orientation based on the position of mobile structure 101 in relation to prior user input selecting a particular transducer orientation, in relation to corresponding bathymetry/depth maps, and/or in relation to other mapping, memory, and/or operational data. More generally, any sensor data provided by system 100 and/or 200 (e.g., speed, acceleration, orientation, wind speed, and/or other sensor data associated with mobile structure 101 or any component of systems 100 and/or 200) may be used to determine a desired transducer orientation. Such determination may include one or more coordinate frame transformations, as described herein.

In block 406, a logic device controls an actuator to adjust an orientation of the transducer module. For example, controller 130 may be configured to control (e.g., using one or more control signals) assembly bracket/actuator 216 to adjust an orientation of transducer assembly 212, transom bracket 214, assembly bracket/actuator 216, and/or any corresponding transducer modules to adjust the orientation of a corresponding transducer module substantially to the desired transducer orientation. In some embodiments controller 130 may additionally or alternatively be configured to control (e.g., using one or more control signals) steering sensor/actuator 150 and/or propulsion system 170 to adjust an orientation and/or position of mobile structure 101 to adjust and/or help or assist adjusting the orientation of a transducer module substantially to a desired transducer orientation. For example, controller 130 may be configured to align mobile structure 101 substantially with a route or planned track and/or a range of orientations of mobile structure 101 (e.g., corresponding to an adjustment range of assembly bracket/actuator 216). In another embodiment, controller 130 may be configured to adjust a heading and/or speed of mobile structure 101 to reduce sonar data/imagery acquisition defects caused by environmental conditions, such as steering mobile structure 101 to avoid high frequency motion due to ocean swells and/or wind direction, to avoid collisions, and/or to avoid other localized environmental sources of sonar data/imagery acquisition defects.

In various embodiments, once the transducer orientation is adjusted, controller 130 may be configured to control sonar system 110 to collect sonar data and/or imagery and store and/or display such data/imagery.

It is contemplated that any one or combination of methods to provide sonar data and/or imagery may be performed according to one or more operating contexts of a control loop, for example, such as a startup, learning, running, and/or other type operating context. For example, process 400A may proceed back to block 402 and proceed through process 400A again to produce updated sonar data and/or imagery, as in a control loop.

Process 400B represents a method for manufacturing sonar system 110 and/or systems 100 or 200 in accordance with embodiments of the disclosure, such as the embodiments discussed with reference to FIGS. 5-12. At the initiation of process 400B, various system parameters may be populated by prior execution of a process similar to process 400A and/or 400B, for example, or may be initialized to zero and/or one or more values corresponding to typical, stored, and/or learned values derived from past operation of process 400B, as described herein.

In block 412, a logic device assembles at least two transducer modules. For example, a controller coupled to an assembly line may be configured to use various pick and place machines, various foundries, fixtures, metal stamping apparatus, injection molding apparatus, potting apparatus, cutting and/or shaping apparatus, and/or other fabrication apparatus to assemble one or more transducer modules, as described herein. In one embodiment, the assembling may include forming one or more transducer elements, forming additional module components to engage with the transducer elements, such as a conductive can, an insulating cover, and/or a module frame, physically assembling the various components and/or electrically coupling them to feed wires as needed, and then clamping the resulting structure to a potting fixture and potting them together to form a single transducer module. In various embodiments, the potting process may be configured to additionally form an acoustic matching layer disposed opposite an emission surface of the transducer element.

In various embodiments, the modules and/or any one or more of the module components can be substantially identical across multiple product lines, for example, so that the fabrication techniques can be perfected for a limited number of different components and then relatively inexpensively leveraged across the product lines. In some embodiments, the transducer element may be implemented as a transducer element assembly, for example, including multiple shaped individual transducer elements coupled together and/or arranged to produce selected acoustic beam shapes.

In optional block 414, a logic device assembling one or more transducer assemblies about the transducer modules assembled in block 412. For example, a controller coupled to an assembly line may be configured to use various fabrication apparatus to assemble one or more transducer assemblies, as described herein. In one embodiment, an injection molding machine may be used with a mold to form an assembly top with one or more clips configured to engage with one or more module frames of corresponding transducer modules. Once formed, the assembly top may be physically coupled to the one or more transducer modules, and the resulting structure may then be clamped to an overmolding fixture where an assembly bottom may be attached and/or molded over and/or around the assembly top and the transducer module(s) to form a transducer assembly. In various embodiments, the process can be repeated to form transducer assemblies with any remaining transducer modules.

In optional block 416, a logic device provides an assembly bracket. For example, a controller coupled to an assembly line may be configured to use various fabrication apparatus to provide an assembly bracket, as described herein. In some embodiments, the assembly bracket may be configured to be disposed between the one or more sonar transducer assemblies and a mobile structure, where the one or more sonar transducer assemblies include first and second substantially identical sonar transducer assemblies, the assembly bracket includes first and second mating surfaces corresponding to the first and second sonar transducer assemblies, and the first and second sonar transducer assemblies are configured to physically couple to the one or more sonar transducer assemblies at the first and second mating surfaces, respectively. In one embodiment, the first and second mating surfaces may include respective first and second curved mating surfaces, and the first and second sonar transducer assemblies may include respective first and second external curved surfaces configured to mate securely with the first and second curved mating surfaces throughout respective first and second ranges of rotations of the first and second sonar transducer assemblies. In another embodiment, the assembly bracket may include an actuator configured to adjust orientations of the sonar transducer assemblies corresponding to one or more orientations of the transducer modules.

It is contemplated that any one or combination of methods to manufacture a sonar system and/or control system may be performed according to one or more operating contexts of a control loop, for example, such as a startup, learning, running, and/or other type operating context. For example, process 400B may proceed back to block 412 and proceed through process 400B again to provide updated attitude adjustments, as in a control loop.

Embodiments of the present disclosure can thus provide inexpensive, feature-filled, reliable, and accurate sonar systems, data and/or imagery. Such embodiments may be used to provide sonar data to assist in navigation and/or mapping for a mobile structure and/or to assist in the operation of other systems, devices, and/or sensors coupled to the mobile structure.

FIGS. 5-12 each illustrate various diagrams of a corresponding sonar system in accordance with embodiments of the disclosure. For example, FIGS. 5-12 each include a number of views of various transducer assemblies and/or sub-assemblies in various stages of assembly that indicate both methods of assembly and methods of use, in accordance with embodiments of the disclosure. In some embodiments, the methods of assembly may be implemented as software instructions executed by one or more logic devices associated with corresponding manufacturing assembly lines used to form and/or assemble the depicted transducer assemblies. In other embodiments, the methods of use may be implemented as software instructions executed by one or more logic devices associated with electronic devices and/or sensors of system 100 of FIG. 1 and/or system 200 of FIG. 2. More generally, the methods of FIGS. 5-12 may be implemented with any combination of software instructions and/or electronic hardware (e.g., inductors, capacitors, amplifiers, actuators, assembly lines, or other analog and/or digital components).

It should be appreciated that any step, sub-step, sub-process, or block of processes illustrated in FIGS. 5-12 may be performed in an order or arrangement different from the embodiments illustrated by respective FIGS. 5-12. For example, in other embodiments, one or more blocks and/or elements may be omitted from the various processes, and blocks and/or elements from one process may be included in another process. Furthermore, inputs, outputs, various sensor signals, sensor information, calibration parameters, and/or other operational parameters, constants, state variables or other information may be stored to one or more memories (e.g., of systems 100 and/or 200) prior to proceeding to a following portion of a corresponding process. Although the illustrated methods are described with reference to systems 100 and 200 and structures depicted in FIGS. 3A-3C, the illustrated methods may be performed by other systems and with respect to other structures, and including a different selection of electronic devices, sensors, structures, mobile structures, and/or mobile structure attributes.

Figure 5:
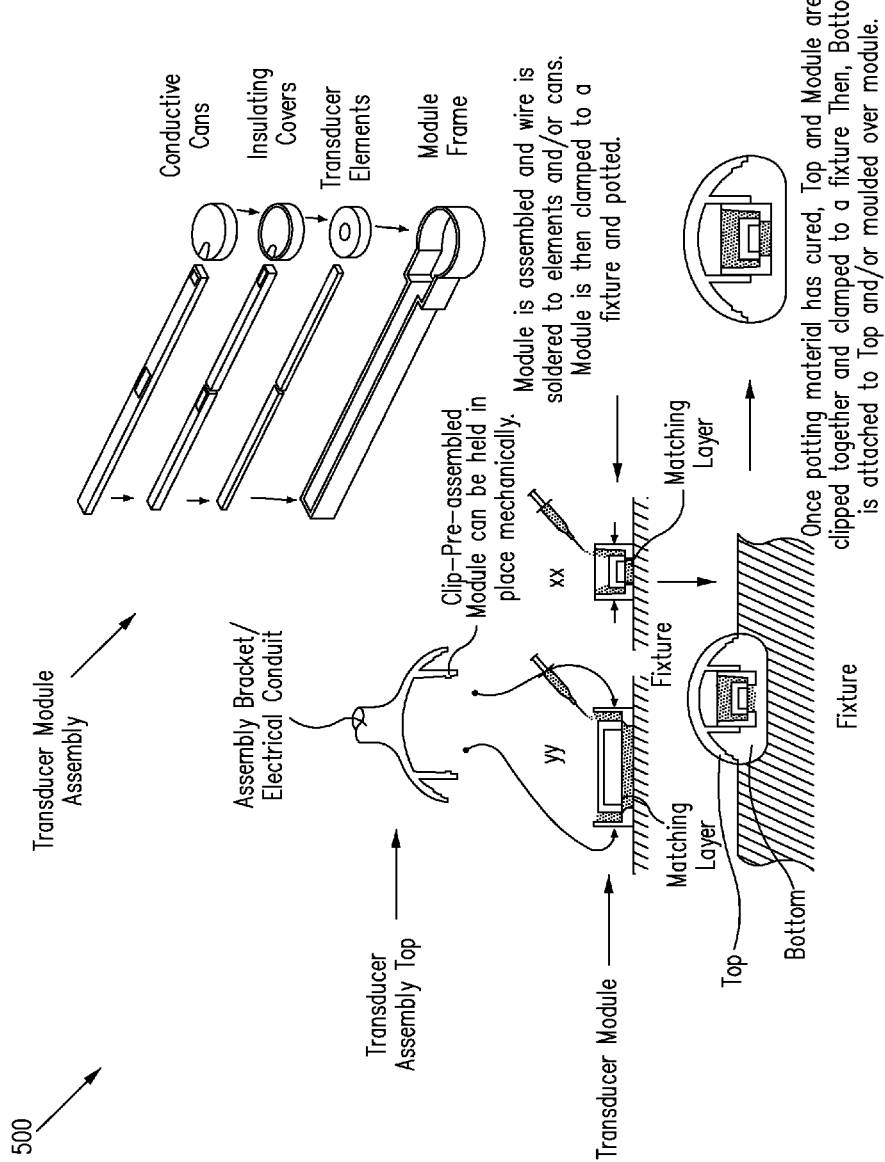
FIGS. 5-12 each illustrate various diagrams of a corresponding sonar system in accordance with embodiments of the disclosure.

Diagrams 500 of FIG. 5 illustrate an embodiment of a sonar system including one or more sonar assemblies with various multi-element transducer modules. In the embodiment shown in FIG. 5, the assembly top may include an electrical conduit, an assembly bracket, and one or more clips molded into the assembly top. The electrical conduit may be configured to provide sealed electrical access to transducer elements and/or electronics/sensors within the transducer assembly, and the assembly bracket may be configured to provide adjustable and/or actuated coupling to a transom bracket and/or a mobile structure. The one or more clips may be configured to physically couple each multi-element transducer module to the assembly top.

As shown in FIG. 5, each multi-element transducer module may include multiple linear transducer elements (e.g., disposed end-to-end) and a circular transducer element, each of which may individually be formed from multiple elements as a transducer element assembly, as described herein. The multiple linear transducer elements and circular transducer element may be mated with one or more insulating covers and/or conductive cans, for example, and be assembled into a single module frame, as shown. Once the various components of a transducer module are assembled and/or electrically coupled to lead wires and/or various electronics, the collection of components may be affixed and/or clamped to a fixture (e.g., a shaped and/or flat surface on which to assemble, pot, and/or mold components) and, in some embodiments, potted with a material (e.g., epoxy resin) used to secure the components to each other and/or to form a matching layer, as described herein. After the potting material has cured, each multi-element transducer module may be physically coupled to an assembly top (e.g., using one or more clips), and the resulting structure affixed to another fixture to attach/form the assembly bottom to the assembly top by one or more of clamping, clipping, gluing, sealing, overmolding, and/or other assembly process. For example, in one embodiment, the assembly bottom may be formed by injecting a polyurethane plastic into a shaped depression in the fixture to mold to the shaped depression, substantially fill recesses within the assembly top, and seal the transducer assembly against ingress of water. A shape of the transducer assembly may be selected to be streamlined to ease its passage through a surrounding medium.

In some embodiments, an assembly top and bottom may be sized to allow inclusion of various electronic components (e.g., a transmitter, receiver, controller, analog to digital and/or digital to analog converter, orientation and/or other sensors, various communication electronics) that may be used to control operation of the transducer module and provide data and/or imagery to, for example, a user interface. As described herein, the linear transducer elements may be configured to produce one or more fan shaped acoustic beams and receive corresponding acoustic returns, and the circular transducer element may be configured to produce one or more conical beams and receive corresponding acoustic returns. The acoustic returns may be converted into sonar data and/or imagery, transmitted to a user interface, and displayed to a user. In some embodiments, imagery from each transducer element may be combined into a single image using various image combining techniques.

Figure 6:
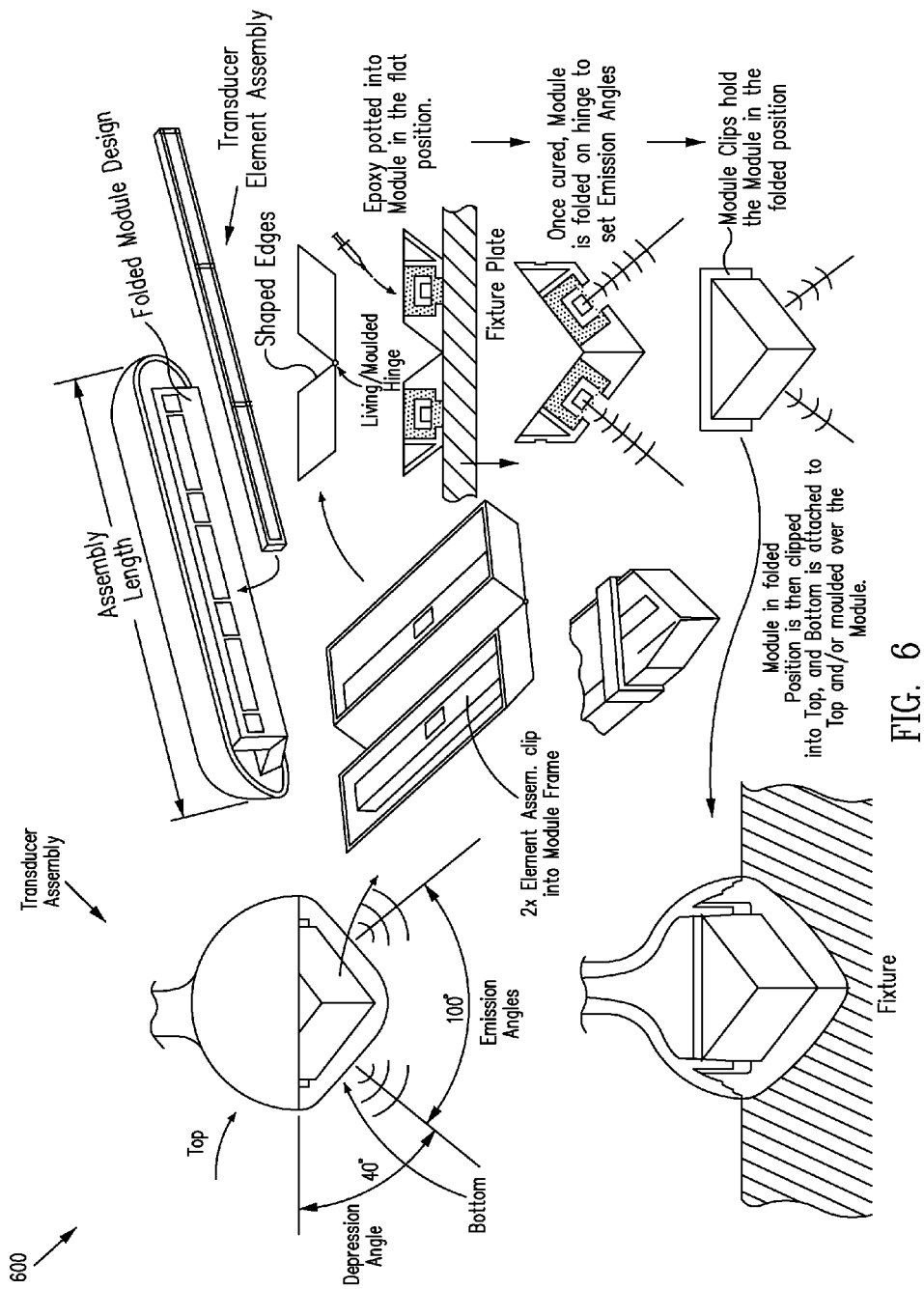

Diagrams 600 of FIG. 6 illustrate an embodiment of a sonar system including a single transducer assembly and multiple transducer modules formed according to a folded design. In the embodiment shown in FIG. 6, two module frames may be formed so as to be attached along a living or molded hinge such that when the two module frames are folded along the hinge, the respective shapes of the module frames limit the folding action to relative orientations that set the transducer modules' relative emission angles, as shown.

For example, in one embodiment, both module frames may be formed from a single sheet of machined, cast, and/or molded material that includes the living hinge disposed between the module frames. Assembly of the various components of the transducer modules may be performed as described generally herein. In addition, the formation of a potting layer and/or a matching layer may be performed for multiple modules (e.g., joined by a hinge) at the same time and without the need for a shaped fixture (e.g., the fixture used for potting may be substantially flat). The shape of each module frame may be selected to produce desired relative emission angles when the assembled transducer modules are folded towards each other along the hinge. As shown in FIG. 6, one or more module clips or other type of retention systems may be used to secure the two transducer modules in the folded position while the transducer modules are clipped or otherwise secured to the assembly top. In various embodiments, the resulting structure may be attached to the assembly bottom using the methods described herein. As noted in conjunction with FIG. 5, the assembly top and bottom may be sized to allow inclusion of various electronic components, and each transducer module may include one or multiple transducer elements and/or transducer element assemblies.

For example, in one embodiment, the transducer element assembly may include three individual linear transducer elements, each approximately 70 mm long and surrounded by approximately 1.5 mm of matching layer material, conductive epoxy, solder, and/or other material, and resulting in a transducer element assembly approximately 216 mm (e.g., 7.5-8.5 in) long. The individual linear transducer elements may be electrically coupled to form a single linear transducer element assembly, for example, to form multiple individual linear transducer elements with longitudinally separated acoustic beams, or to form an electronically selectable version of both. In such embodiment, the transducer assembly may be approximately 260 mm (e.g., 10 in) long to allow room for the transducer modules, electrical connections, electronics modules, and/or other shaping of the assembly top and/or bottom.

Figure 7:
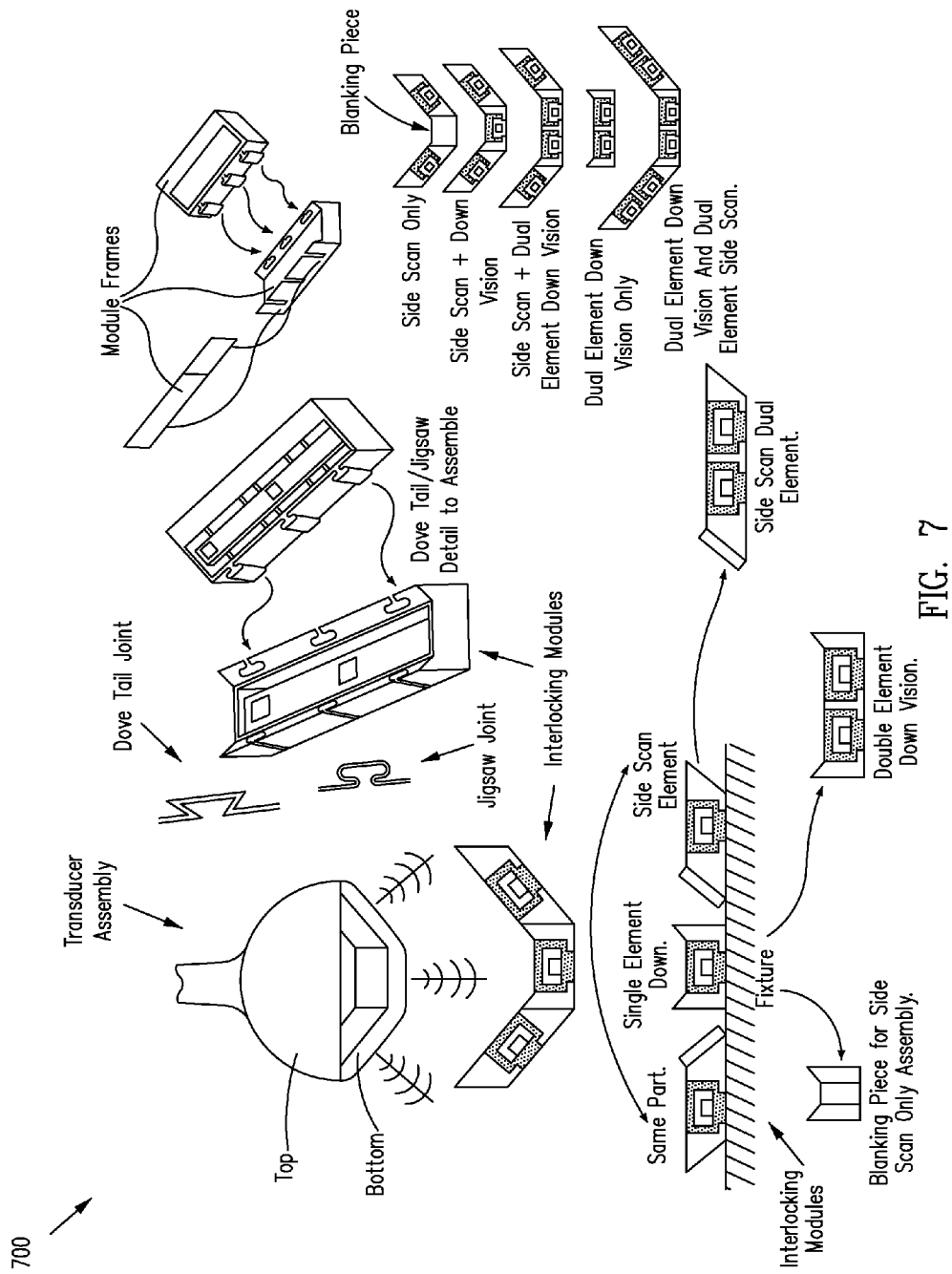

Diagrams 700 of FIG. 7 illustrate an embodiment of a sonar system including a single transducer assembly and multiple transducer modules formed according to an interlocking design. In the embodiments shown in FIG. 7, individual module frames may be formed so as to attach to each other using one or more joints (e.g., one or more dovetail and/or jigsaw joints, for example) such that when one module frame is attached to another using the one or more joints, the respective shapes of the module frames and joints set the relative orientations and/or positions of the transducer modules that, in turn, set the transducer modules' relative emission angles and/or positions, as shown. Assembly of the various components of the transducer modules may be performed as described generally herein. In addition, the formation of potting layers and/or matching layers may or may not be performed for multiple different modules at the same time, and without the need for a shaped fixture.

In some embodiments, various types of transducer module frames (e.g., down vision, side vision, blanking, and/or dual element versions of each, as shown) may be formed so as to produce desired relative emission angles and/or positions when the corresponding transducer modules are joined and/or locked together. To explain, a down vision transducer module (e.g., a down scan transducer module) may refer to a transducer module configured to produce an acoustic beam aimed substantially downward through the assembly bottom, a side vision transducer module (e.g., a side scan transducer module) may refer to a transducer module configured to produce an acoustic beam aimed substantially through a side of the assembly bottom, and a blanking transducer module may refer to a non-operational transducer module frame (e.g., corresponding to a down vision or side vision transducer module without a transducer element) configured to space adjoining transducer elements. Dual element versions of each may refer to a single transducer module including two transducer elements/element assemblies, for example, or may refer to multiple similarly-typed transducer modules interlocked together. One or more of each type of transducer module may be joined to produce a variety of different transducer module arrangements, as shown in FIG. 7, which can help reduce manufacturing expense and increase yield rates across a relatively wide range of product lines. Dual and/or multiple transducer modules may be used to perform multi-beam sonar imaging, interferometry sonar imaging, and/or relatively high power sonar imaging, for example.

Figure 8:
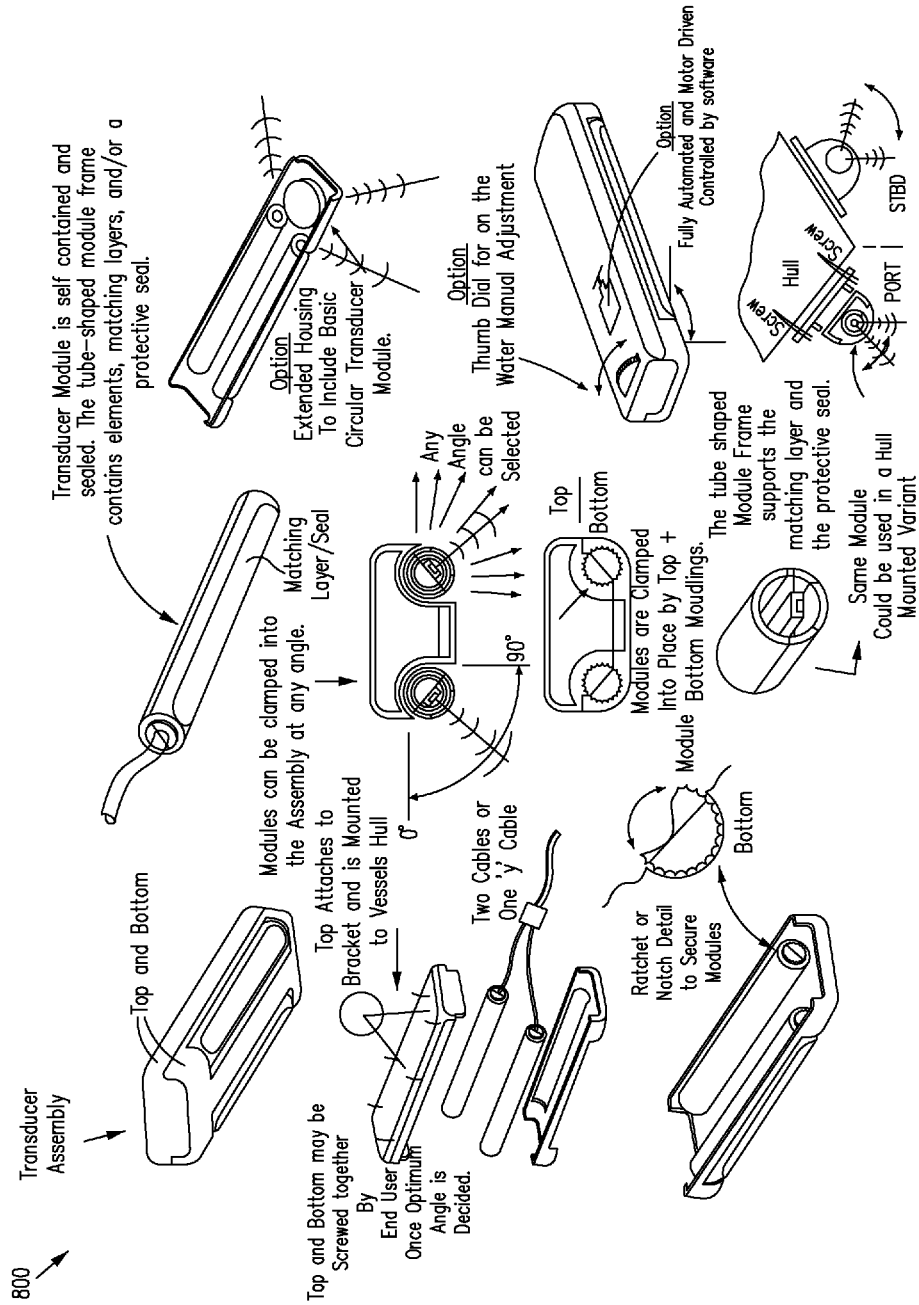

Diagrams 800 of FIG. 8 illustrate an embodiment of a sonar system including a single transducer assembly and multiple transducer modules with user and/or individually adjustable orientations. In the embodiments shown in FIG. 8, individual module frames may be formed so as to include a ratchet or notch detail at one or both ends to secure the transducer modules in a particular orientation relative to the transducer assembly (e.g., the assembly top and/or bottom). Corresponding ratchets, notches, thumb dials, and/or actuators/motors may be integrated with the assembly top and/or bottom to allow user adjustment of each transducer module's orientation, as shown.

In some embodiments, each transducer module may be tube-shaped so that multiple transducer modules of the same shape (e.g., manufactured using the same assembly line/techniques) may be used in a single transducer assembly. For example, each transducer module may be formed by coupling the transducer element, the insulating cover, and the conductive can to each other, sliding the resulting structure into an end of a tubular module frame (e.g., including the ratchet/notch detail), and then potting the various components together. Additionally, since the depicted transducer modules are substantially open to the environment, an additional protective layer or waterproof seal (e.g., polyurethane or another sealing plastic) may be formed around the transducer module, and each transducer module may include its own electrical conduit. In other embodiments, each transducer module may include a two part module frame and be assembled similar to the coupling of the assembly top to the assembly bottom described with reference to FIGS. 5-7.

As shown in FIG. 8, in some embodiments, the assembly top and bottom may be screwed together to fix the relative emission angles of the ratcheted/notched transducer modules. The assembly top may include an assembly bracket, for example, and/or may be attached to the fuselage, transom, and/or hull of a mobile structure. In additional embodiments, the sonar system may include multiple transducer assemblies, each with its own adjustable tube-shaped transducer module, where each transducer assembly may be individually mounted to a hull of a mobile structure. It is contemplated that each transducer assembly may include one, two, three, or many transducer modules with linked and/or individual ratchets, notches, and/or actuators.

Figure 9:
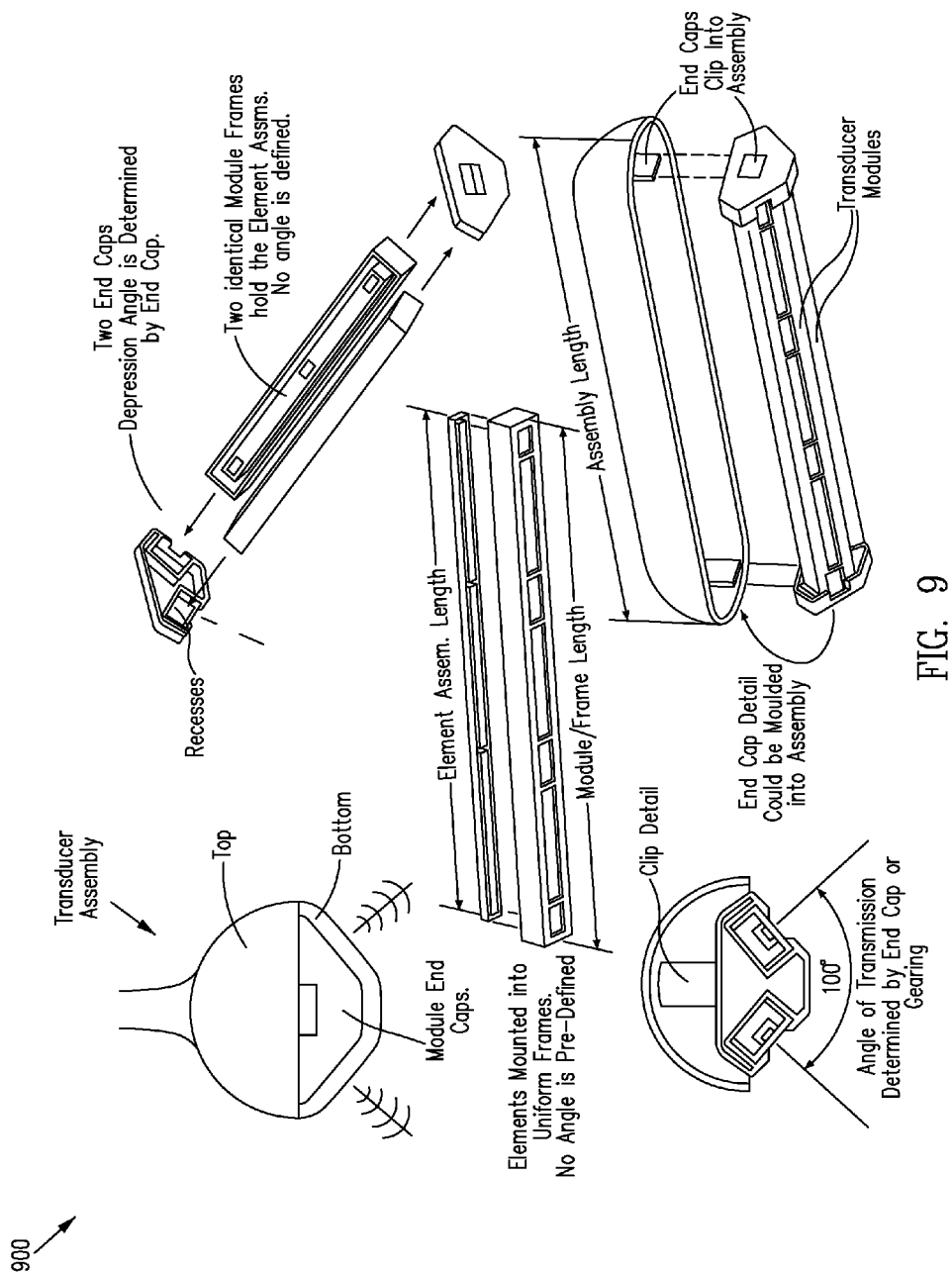

Diagrams 900 of FIG. 9 illustrate an embodiment of a sonar system including a single transducer assembly and multiple transducer modules with individual orientations set by one or more end caps physically coupled to each transducer module and, in some embodiments, to the assembly top. In the embodiment shown in FIG. 9, individual module frames may be formed so as to have ends configured to mate with one or more corresponding recesses in end caps to secure the transducer modules in a particular orientation relative to each other and/or the transducer assembly (e.g., the assembly top and/or bottom). Such end caps may be configured to secure one, two, and/or any number of transducer modules. In some embodiments, the end caps may be configured to physically couple the transducer modules to the transducer assembly top and/or bottom, using corresponding end clips for example, and may be configured to form at least a portion of a physical retention system for the transducer modules, as described herein. In various embodiments, the emission angles of the transducer modules may be set by the shape of the end caps, and desired emission angles may be implemented (e.g., by a manufacturer and/or a user) by selecting pairs of end caps with shapes corresponding to the desired emission angles and then assembling the transducer assembly with the selected end caps.

In related embodiments, the end caps may include one or more gears, actuators, thumb dials, ratchets, and/or notches, for example, and be configured to allow and/or provide adjustment of the individual, collective, and/or relative emission angles of the transducer modules while the transducer assembly is assembled, similar to the embodiments described with reference to FIG. 8. In other embodiments, the mating surfaces of the assembly bracket may be adjusted mechanically, such as by inserting shims and/or wedges between the mating surfaces and the transducer assemblies, for example, to select other emission angles. In one embodiment, the transducer element assembly may include three individual linear transducer elements, disposed end to end, and resulting in a transducer element assembly approximately 216 mm (e.g., 7.5-8.5 in) long (e.g., similar to the embodiments described with reference to FIG. 6) and a transducer module approximately 224 mm long. Shorter and longer lengths are contemplated, for example, to narrow or widen resulting acoustic beams, as described herein. In various embodiments, the transducer assembly may be approximately 260 mm (e.g., 10 in) long to allow room for the transducer modules, electrical connections, electronics modules, end caps and/or clips, and/or other shaping of the assembly top and/or bottom. Other lengths are contemplated to adjust to the selected length of the transducer modules.

Figure 10:
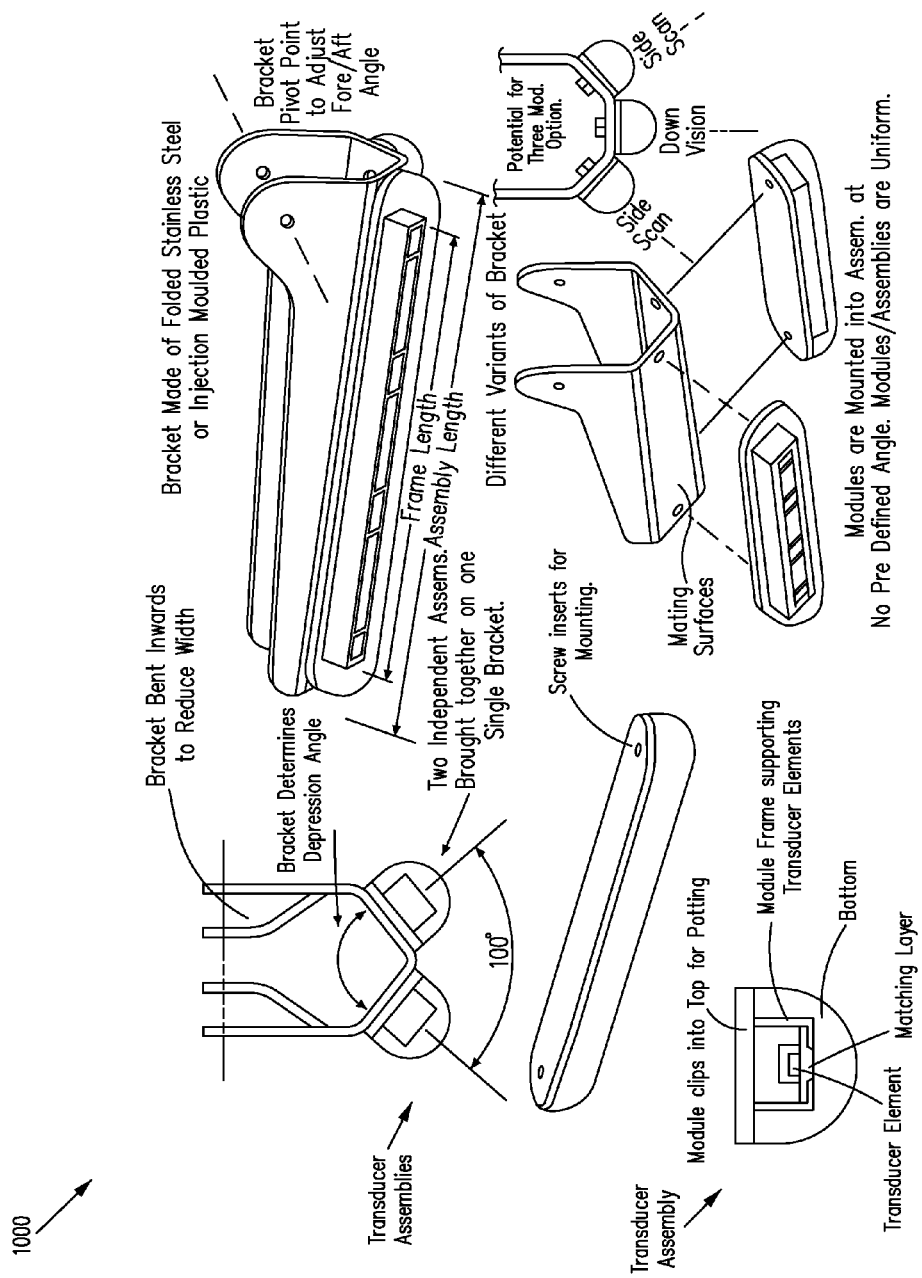

Diagrams 1000 of FIG. 10 illustrate an embodiment of a sonar system including multiple transducer assemblies and multiple transducer modules with individual orientations set by an assembly bracket. In the embodiment shown in FIG. 10, each transducer assembly includes a single transducer module, and each transducer assembly is configured to physically couple to a different portion of the assembly bracket. In other embodiments, each transducer assembly may include multiple transducer modules, similar to the embodiments described with reference to FIGS. 6-9. Moreover, each transducer module may include multiple transducer elements and/or transducer element assemblies, as described herein.

In some embodiments, the assembly bracket may be implemented from a relatively rigid material, such as a molded, cast, and/or folded plastic or metal, for example. The assembly bracket may be configured to provide mating surfaces for each transducer assembly, for example, and the shape of the mating surfaces and/or assembly bracket may be configured to set the relative orientations of the transducer assemblies, which in turn may be configured to set and/or limit the emission angles of the transducer modules. As shown in FIG. 10, the assembly bracket may be configured to physically couple to a transom bracket, for example, and may include one or more joints, hinges, pivot points, actuators, and/or other structures to allow and/or provide adjustment of the orientations of the coupled transducer assemblies. As is also shown in FIG. 10, the assembly bracket may be configured to include two, three, or any number of mating surfaces and/or physically coupled transducer assemblies.

In one embodiment, the transducer modules (e.g., the module frames) may be approximately 216 mm (e.g., 7.5-8.5 in) long (e.g., similar to the embodiments described with reference to FIG. 6), for example, or may be between approximately 216 mm and 224 mm long (e.g., similar to the embodiments described with reference to FIG. 9). Various other lengths are contemplated, for example, to narrow or widen resulting acoustic beams, as described herein. In various embodiments, the transducer assemblies may be approximately 260 mm (e.g., 10 in) long to allow room for the transducer modules, electrical connections, electronics modules, other structures, and/or other shaping of the assembly tops and/or bottoms. Other lengths are contemplated to adjust to the selected length of the transducer modules, and may include lengths approximately 20% longer than the selected length of the transducer modules.

Figure 11:
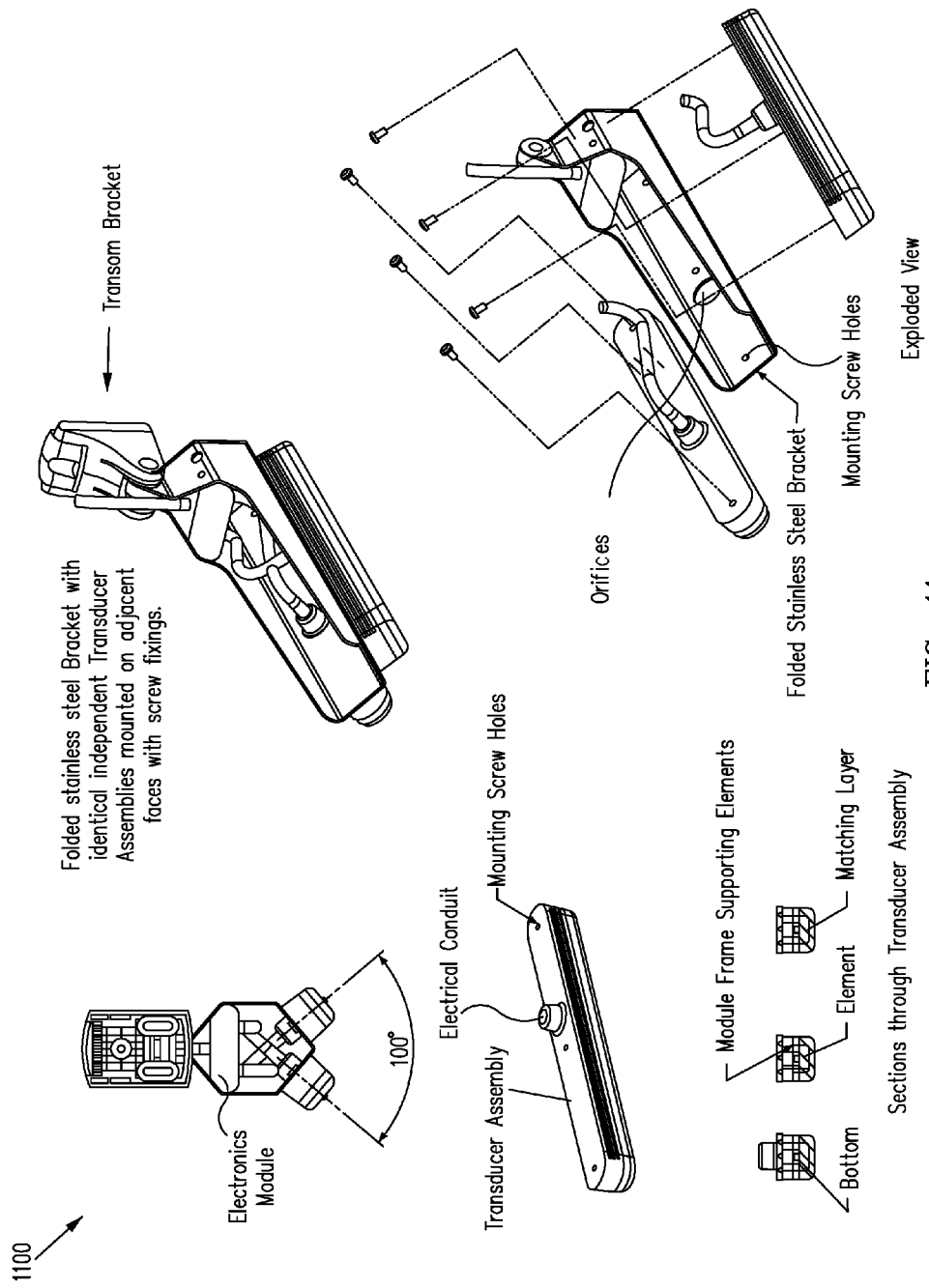

Diagrams 1100 of FIG. 11 illustrate an embodiment of a sonar system including multiple transducer assemblies and multiple transducer modules with individual orientations set by an assembly bracket, similar to the embodiment depicted in FIG. 10. In the embodiment shown in FIG. 11, the assembly bracket may be configured to include a mating surface physically coupling an electronics module to the assembly bracket. In some embodiments, the electronics module may be implemented as a sealed box containing one or more controllers, orientation sensors, electrical junctions, and/or other devices and/or systems described herein. For example, the electronics module may include one or more electrical junctions configured to combine electrical cables (e.g., containing power leads and/or sensor, control, and/or communication signal wires) from each transducer assembly into a single electrical cable (e.g., coupling the transducer assemblies to additional devices and/or systems).

Also shown in FIG. 11, each transducer assembly may include a number of mounting screws holes and/or electrical conduits, and the transducer assembly may include various screw holes and/or orifices in corresponding mating surfaces to facilitate physically coupling the transducer assemblies to the assembly bracket. As shown, the electrical conduits and/or screw holes may be staggered along a transducer assembly length to allow identical transducer assemblies to be mated to adjoining mating surfaces of the assembly bracket. FIG. 11 also shows a transom bracket coupled to the assembly bracket. In some embodiments, the transom bracket may be configured to physical couple the assembly bracket and/or the transducer assemblies to the transom of a mobile structure, for example, and/or to provide or allow adjustment of an orientation of the transducer assemblies and/or the assembly bracket relative to the mobile structure.

In some embodiments, the transducer modules may be approximately 213 mm long, for example, or may be between approximately 213 mm and 224 mm long. In various embodiments, the transducer assemblies may be approximately 258 mm to 260 mm long to allow room for the transducer modules, electrical connections, electronics modules, other structures, and/or other shaping of the assembly tops and/or bottoms. The length of the assembly bracket may or may not substantially correspond to the length of the transducer assemblies. Other lengths for the transducer modules, corresponding transducer elements, the transducer assemblies, and/or the assembly bracket are contemplated.

Figure 12:
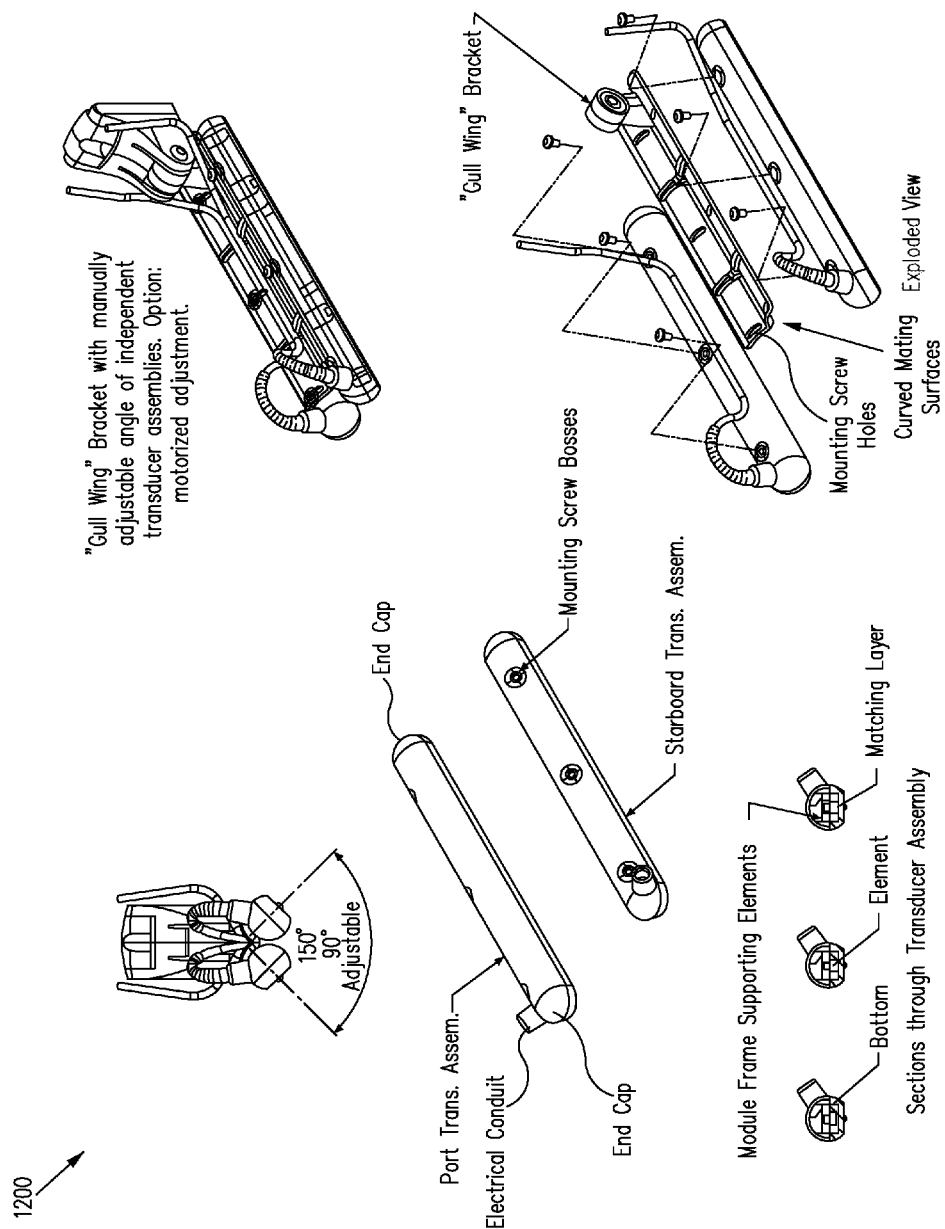

Diagrams 1200 of FIG. 12 illustrate an embodiment of a sonar system including multiple transducer assemblies and multiple transducer modules with individual orientations set by an assembly bracket, similar to the embodiments depicted in FIGS. 10 and 11, but where orientations of the transducer assemblies and/or modules may be adjusted without also adjusting their relative positions, similar to the embodiment depicted in FIG. 9. In the embodiment shown in FIG. 12, the mating surfaces of the assembly bracket may be formed in the shape of one or more curved gull wings (e.g., as viewed from the long end of the assembly bracket), for example, and may include one or more slotted mounting screw holes allowing each transducer assembly to be rotated in the mating surface to adjust the orientation of the transducer assembly (e.g., to adjust its "roll" relative to the assembly bracket) without adjusting its position relative to other transducer assemblies physically coupled to the assembly bracket (e.g., measured center-to-center).

In some embodiments, the gull wing assembly bracket may be implemented from a relatively rigid material, such as a molded, cast, and/or folded plastic or metal, for example, and may include one or more ribs, embedded reinforcing bars, and/or other reinforcing structures. As shown in FIG. 12, the gull wing assembly bracket may be configured to physically couple to a transom bracket, for example, and may include one or more joints, hinges, pivot points, actuators, electronics modules, and/or other structures to allow and/or provide adjustment of the orientation of the assembly bracket and/or the coupled transducer assemblies. In one embodiment, the assembly bracket may include one or more actuators and/or electronics modules, for example, configured to adjust an orientation of the transducer modules, for example by rotating each transducer assembly individually and/or all transducer assemblies collectively according to one or more control signals provided by a controller. The assembly bracket may be configured to include two, three, or any number of physically coupled transducer assemblies and/or curved mating surfaces, where the shape of each curved mating surface and/or corresponding slotted mounting screw holes are configured to help to define the range of orientation adjustments for each transducer assembly relative to an orientation of the assembly bracket.

Also shown in FIG. 12, each transducer assembly may include a number of mounting screw bosses, end caps, and/or electrical conduits, and the transducer assembly may include various slotted screw holes in corresponding mating surfaces to facilitate physically coupling the transducer assemblies to the assembly bracket. The mounting screw bosses may be implemented as screw holes and/or a pattern of ribs, roughened surfaces, and/or other structures configured to reduce or eliminate slip between a transducer assembly and a corresponding mating surface when they are pressed together (e.g., when the transducer assembly is securely physically coupled to the assembly bracket).

Each transducer assembly may include one or more transducer modules and/or transducer module arrangements, for example, and each may have various selected lengths, as described herein. As shown in FIG. 12, in some embodiments, the transducer assemblies may be formed to be substantially identical (e.g., externally and/or internally, to help reduce manufacturing cost and/or increase yield rates) and formed roughly in the shape of a tube and/or with an external curved surface configured to mate securely with the curved mating surface of the gull wing assembly bracket throughout a range of rotations. In such embodiments, the transducer assemblies may include a pair of external end caps configured to help seal the transducer assemblies against environmental ingress and/or help make the overall shape of the transducer assembly substantially streamlined. In some embodiments, one or both the end caps may also be configured to help orient one or more transducer modules disposed within the transducer assemblies, similar to the internal end caps described with reference to FIG. 9.

In various embodiments, one or both end caps for each transducer assembly may be implemented with electrical conduits. As shown, each electrical conduit may be positioned and/or formed in the end cap to allow otherwise identical transducer assemblies to be mated to adjoining mating surfaces of the assembly bracket. In some embodiments, each electrical conduit may be positioned to provide sufficient separation of electrical cables coupled to the electrical conduits to allow full adjustment of the orientations of adjacent transducer assemblies, as provided for by the slotted mounting screw holes in the assembly bracket, the mounting screw bosses in the transducer assemblies, and the shapes of the transducer assemblies and/or the assembly bracket. In various embodiments, the lengths for the transducer modules (e.g., including the end caps), corresponding transducer elements, the transducer assemblies, and/or the assembly bracket may be selected to emphasize compactness, specific acoustic beam characteristics, ease of actuation, aero and/or hydro-dynamics, and/or other characteristics of a constituent sonar system, including the various lengths described herein with reference to FIGS. 6 and 9-11).

As those of some skill will appreciate, sonar transducers that are fitted to the transom of a watercraft (e.g., mobile structure 101 as illustrated in FIG. 2) are often subject to collision with submerged objects, which can result in damage to the transducer and/or the watercraft. One method for reducing this problem is to provide a "kick-up" mechanism that, upon a collision with a submerged object, releases the transducer to rotate through a pivot mechanism that is attached to the watercraft. This reduces the force of the impact on both the transducer and the transom/watercraft.

Figure 13A:
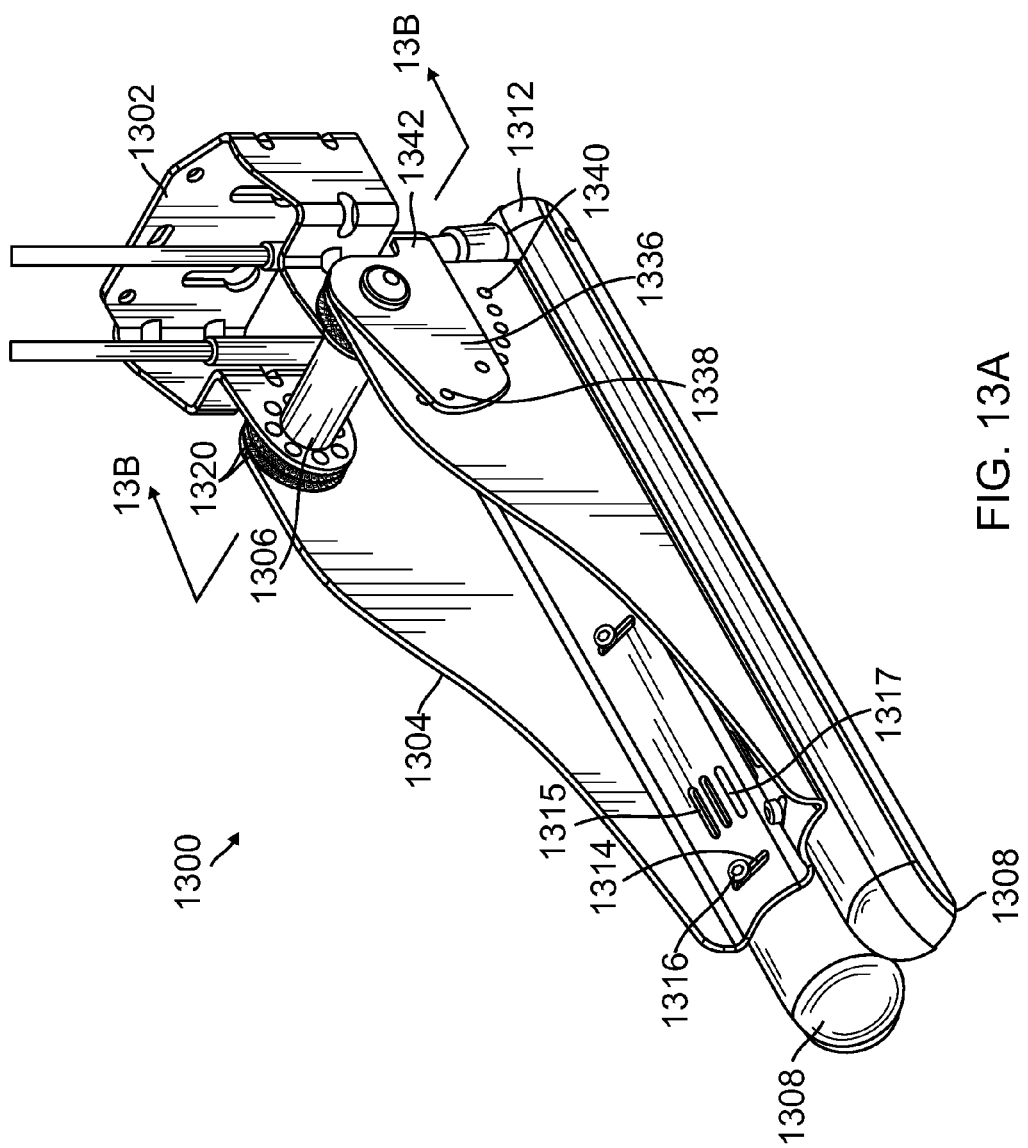
FIG. 13A is a perspective view of a transducer support and kick-up assembly of a sonar system in accordance with embodiments of the disclosure.
Figure 13B:
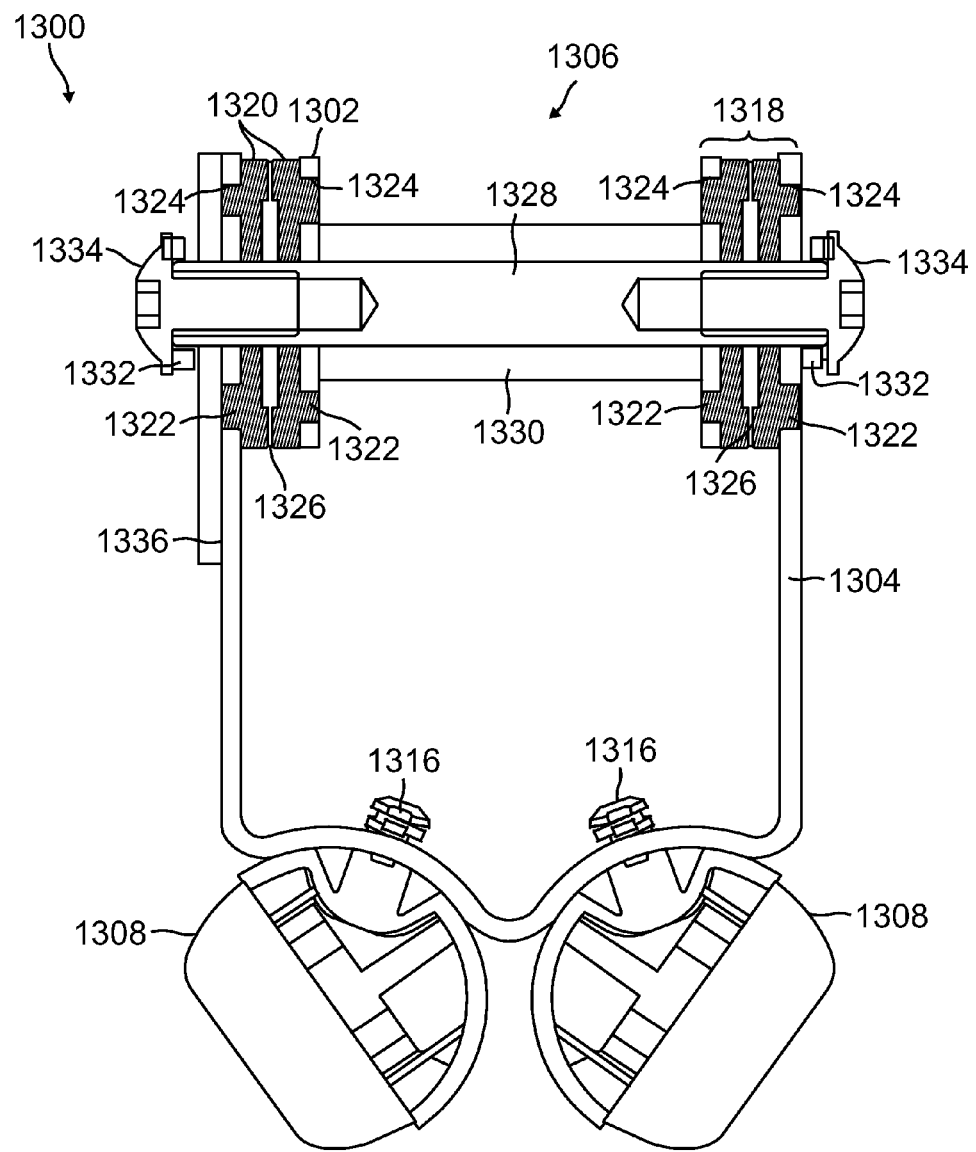
FIG. 13B is a cross-sectional view of a transducer support and kick-up assembly, as seen along the lines of the section 13B-13B taken in FIG. 13A, in accordance with embodiments of the disclosure.
Figure 14A:
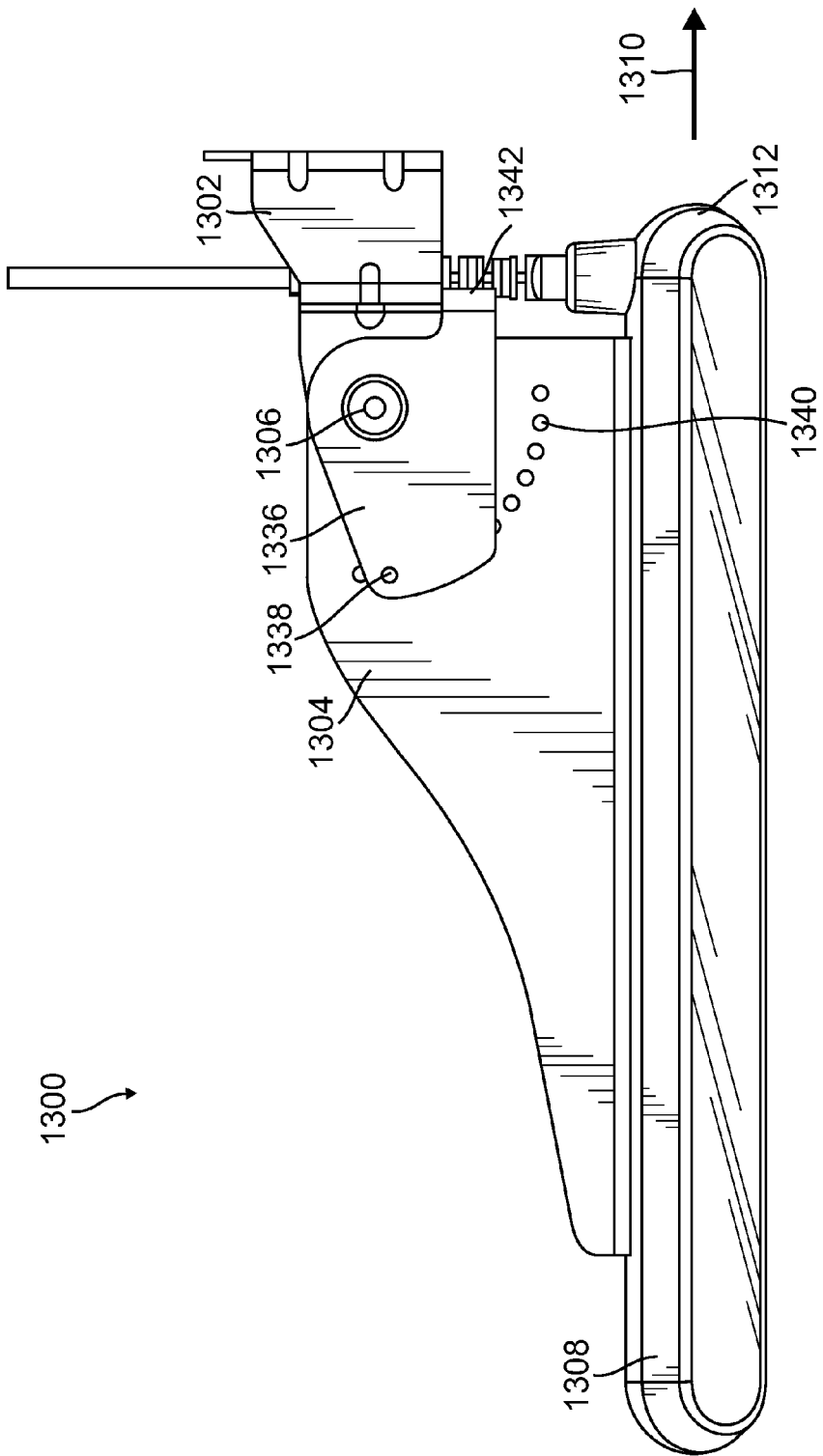
FIG. 14A is a right side elevation view of a transducer support and kick-up assembly, showing a transducer support arm disposed in a deployed or operational position relative to a mounting bracket, in accordance with embodiments of the disclosure.
Figure 14B:
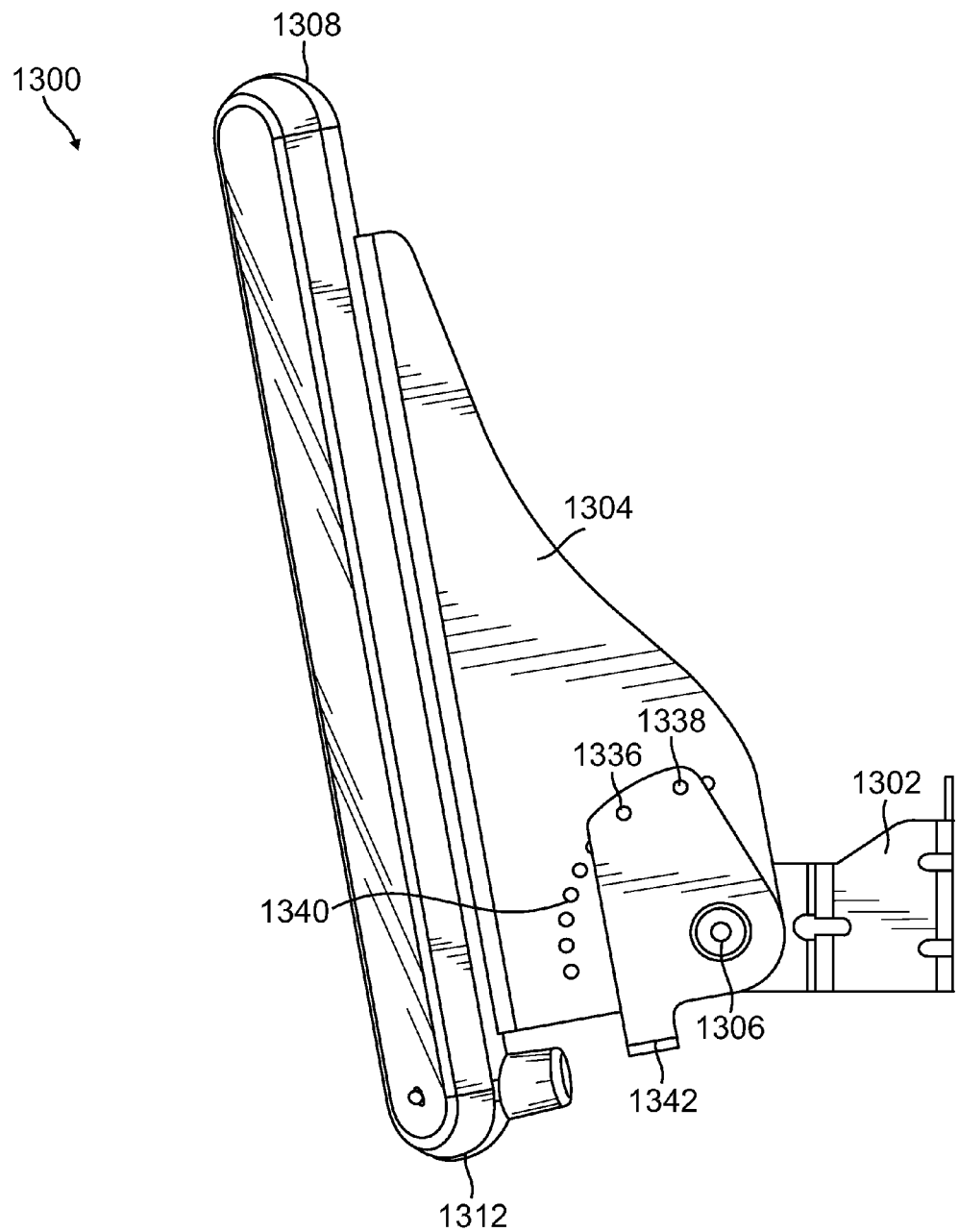
FIG. 14B is a right side elevation view of a transducer support and kick-up assembly, showing the transducer support arm disposed in a retracted or kicked-up position relative to the mounting bracket, in accordance with embodiments of the disclosure.

FIG. 13A is an upper, right side and rear end perspective view of an example embodiment of such a transducer support and kick-up assembly 1300 of a sonar system, and FIG. 13B is a cross-sectional view of the example transducer support and kick-up assembly 1300, as seen along the lines of the section 13B-13B taken in FIG. 13A. FIG. 14A is a right side elevation view of the assembly 1300, showing a transducer support arm 1304 of the assembly disposed in a deployed or operational position relative to a mounting bracket 1302 of the assembly, and FIG. 14B is a right side elevation view of the assembly 1300, showing the transducer support arm 1304 disposed in a retracted or kicked-up position relative to the mounting bracket 1302.

As illustrated in these figures, the example transducer support and kick-up assembly 1300 comprises an attachment or mounting bracket 1302 for mounting the assembly 1300 to, for example, the transom of a boat, a transducer support arm 1304, and a pivoting mechanism 1306 that pivotably couples the transducer support arm 1304 to the mounting bracket 1302. As described in more detail below, the pivoting mechanism 1306 is configured, on one hand, to hold the transducer support arm 1304, and hence, one or more transducer assemblies 1308 coupled to it, at a user selectable first angular position relative to the mounting bracket 1302, and against forces acting on the transducer support arm 1304 that are less than a preselected "kick-up" level of force, such as those acting on the transducer support aim 1304 and associated sensors 1308 as a result of being pulled, trolled, or conveyed through water by, e.g., a boat or other vessel, and on the other hand, to allow the transducer support arm 1304 and associated transducer assemblies 1308 to "kick up," or be moved to a second angular position relative to the mounting bracket 1302 by forces acting on the transducer support arm 1304 and associated transducer assemblies 1308 that are equal to or greater than the preselected kick-up level, such as those acting on the transducer support arm 1304 and associated transducer assemblies 1308 as a result of a collision between the latter and a submerged object. Moreover, the pivoting mechanism 1306 advantageously allows a user to move or reset the transducer support arm 1304, and hence, the one or more transducer assemblies 1308 coupled to it, to the first angular position at a user specified later time without the need for tools (e.g., allen/hex wrench, screwdriver, pliers, and/or other tools) to ensure proper alignment to the first angular position.

Thus, FIG. 14A illustrates the transducer support arm 1304 and associated transducer assemblies 1308 disposed in a "deployed" or first angular position relative to the mounting bracket 1302, such that the transducer assemblies 1308 are disposed, for example, below the surface of a body of water through which they can be conveyed, e.g., by a boat to which the mounting bracket 1302 is mounted, and below the lower trailing edge of the transom so as to be substantially below the hull of the boat. FIG. 14B illustrates the transducer support arm 1304 and associated transducer assemblies 1308 disposed in a "kicked-up," or retracted, second angular position relative to the mounting bracket 1302, such that the transducer assemblies 1308 are disposed above the lower trailing edge of the transom so as to be substantially above the hull of the boat and/or partially or fully above the surface of the body of water.

As discussed above in connection with FIGS. 5-12, in some embodiments, the transducer assemblies 1308 can be elongated and arranged on the transducer support arm 1304 to be conveyed by the associated vessel longitudinally through a body of water, for example, in the direction of the arrow 1310 in FIG. 14A. In this configuration, the forces acting on the transducer support arm 1304 primarily comprise those acting on the leading or forward end 1312 of the transducer assemblies 1308, and the kick-up level corresponds to a force imparted to the forward end of the transducer assemblies 1308 by a collision of the transducer assemblies 1308 with a submerged object while being pulled through the water.

As discussed above in connection with FIG. 12, in some embodiments, the transducer assemblies 1308 can be respectively configured with arcuate upper surfaces and the transducer support arm 1304 can be configured with arcuate lower surfaces corresponding to the upper surface of the transducer assemblies 1308. As illustrated in FIGS. 13A and 13B, the arcuate lower surfaces of the transducer support arm 1304 can be respectively provided with circumferential slots 1314 extending through them. This enables the angular position of the transducer assemblies 1308 relative to the transducer support arm 1304 to be manually adjusted by rotating them about their long axes relative to the transducer support arm 1304 before the transducer assemblies 1308 are fixed to the latter using, e.g., threaded fasteners 1316 that respectively extend through the circumferential slots 1314 and into corresponding threaded receptacles in the transducer assemblies 1308. In some embodiments, transducer support arm 1304 may be provided with multiple sets of transducer assembly alignment slots 1315 which may be used to set predetermined depression angles for transducer assemblies 1308 by mating with corresponding elongate nubs 1317 formed in an outer surface of transducer assemblies 1308.

Figure 15A:
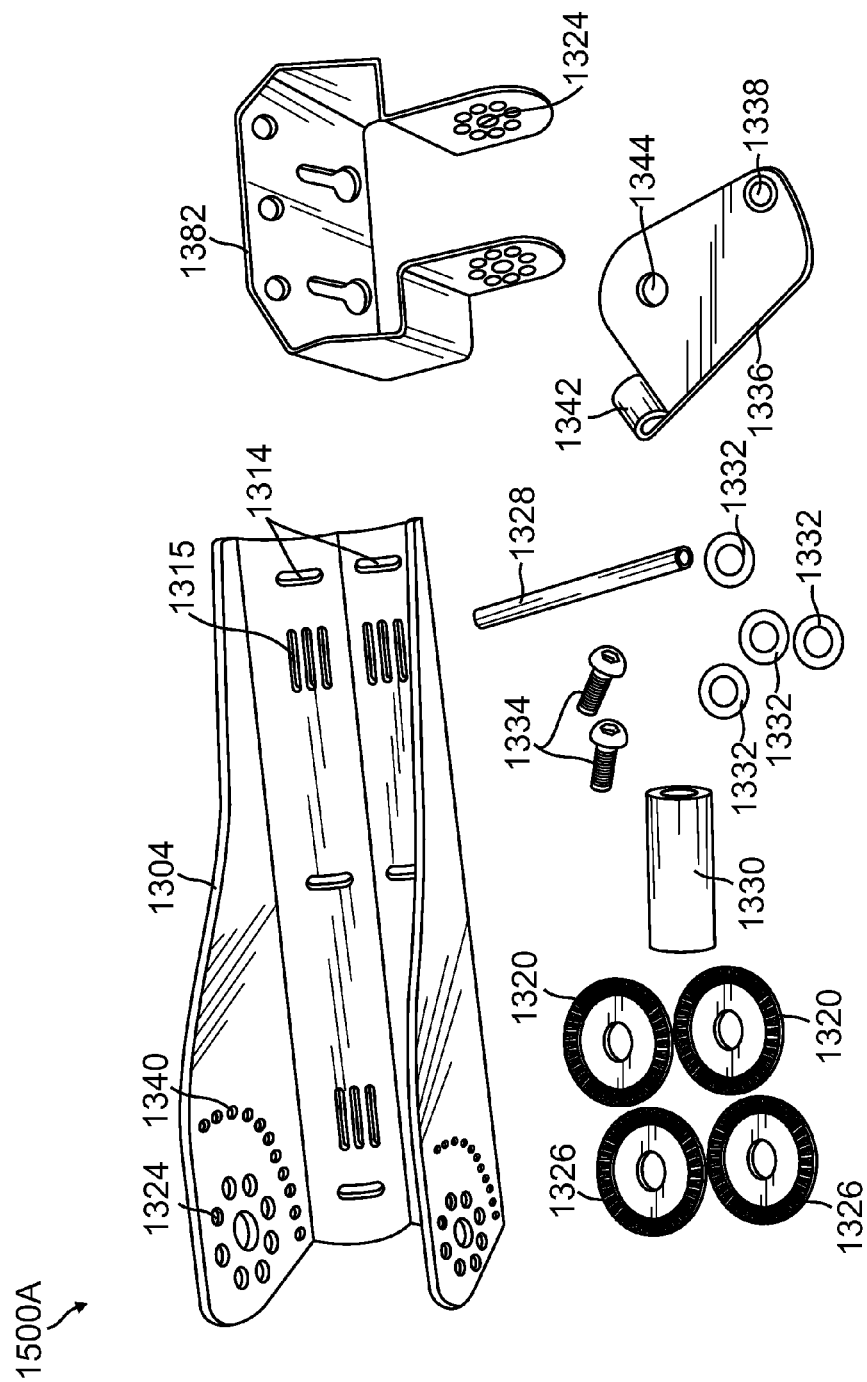
FIGS. 15A-15O are views illustrating sequential steps in the assembly of a transducer support and kick-up assembly in accordance with embodiments of the disclosure.
Figure 15B:
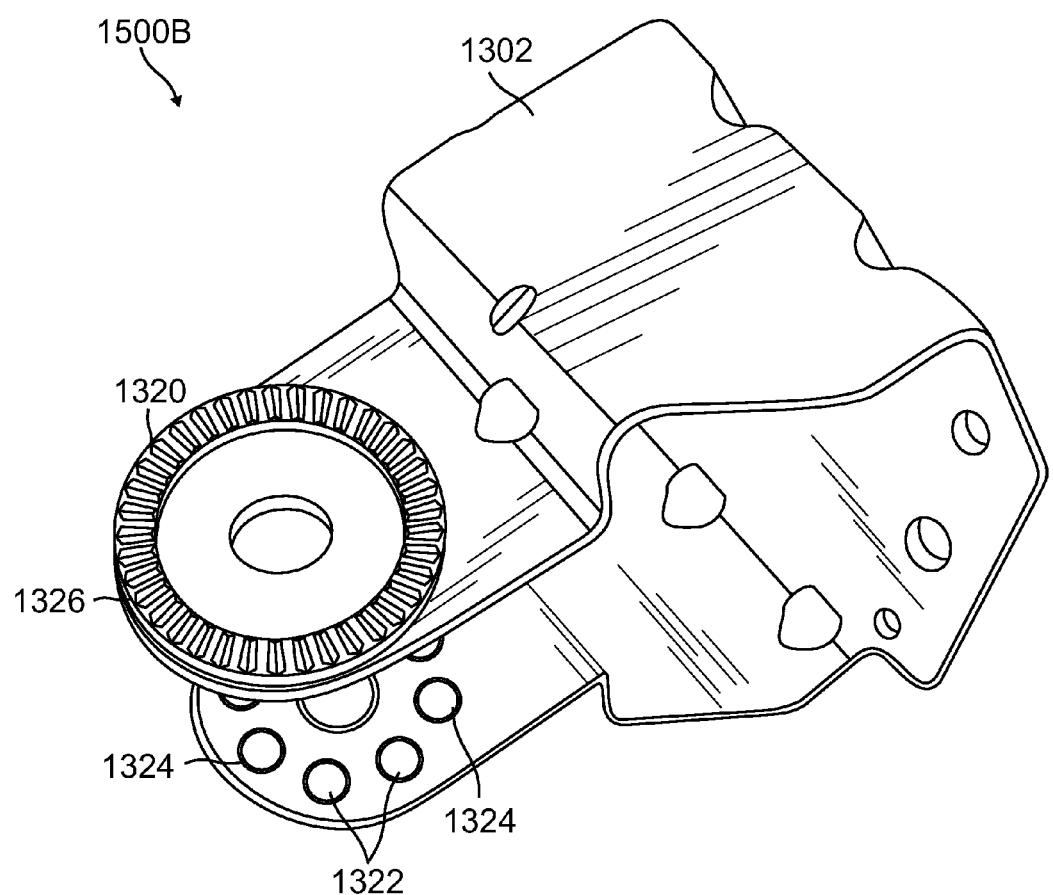
Figure 15C:
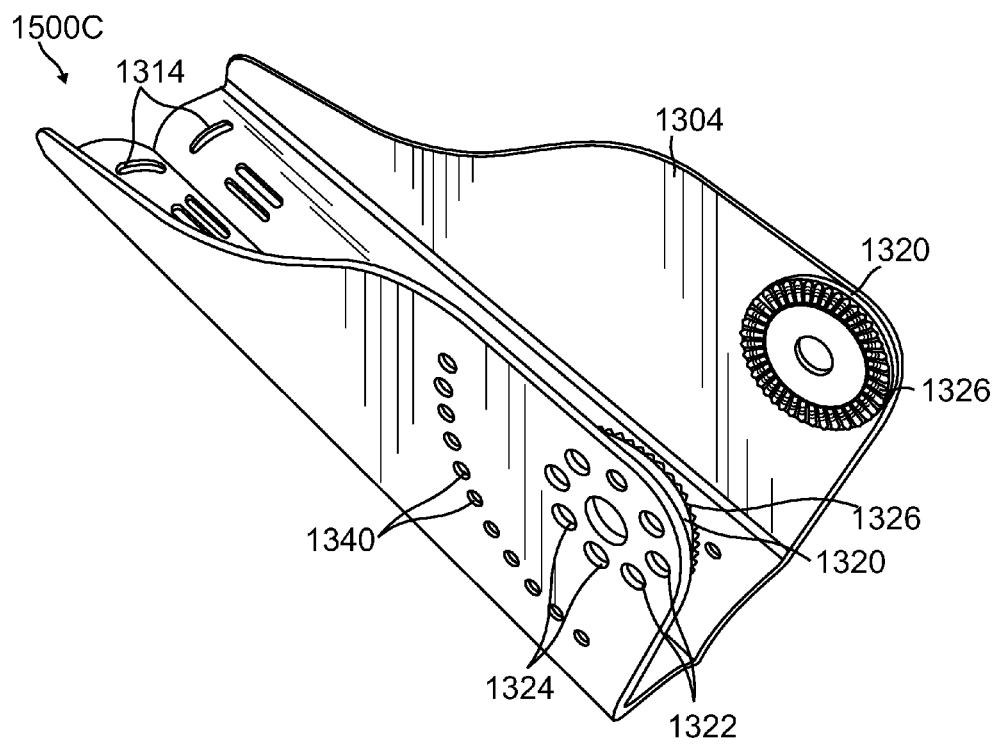

As illustrated in the cross-sectional view of FIG. 13B, in some embodiments, the pivoting mechanism 1306 can comprise a pair 1318 of ratchet plates 1320 respectively coupled to associated ones of the mounting bracket 1302 and the transducer support arm 1304 for conjoint rotation therewith. In the particular example embodiment illustrated in FIG. 13B, the pivoting mechanism 1306 includes two pairs 1318 of the ratchet plates 1320 disposed bilaterally symmetrical with respect to a sagittal plane extending though the transducer support and kick-up assembly 1300. As illustrated in FIGS. 13B, 15B and 15C, each of the ratchet plates 1320 is provided with a circular array of cylindrical bosses 1322 protruding from one face of the ratchet plate 1320, each of which snaps into a corresponding one of a circular array of apertures 1324 disposed in the associated mounting bracket 1302 or transducer support arm 1304.

As illustrated in, e.g., FIGS. 13B, 15A, 15B and 15C, each of the ratchet plates 1320 has a plurality of radial teeth 1326 extending from a side of the plate opposite to the bosses 1322 that, during assembly, extend laterally to interdigitate with the teeth 1326 of the opposing ratchet plate 1320 of that pair 1318. As illustrated in FIG. 13B, the respective ratchet plates 1320 of each pair 1318 of plates are biased toward each other laterally with a resilient biasing force such that rotation of the transducer support arm 1304 relative to the mounting bracket 1302, and hence, the teeth 1326 of one plate 1320 of each pair 1318 relative to the teeth 1326 of the opposing plate 1320 of the pair 1318, causes the two plates 1320 of each pair 1318 to be forced apart laterally and against the resilient biasing force. Thus, the force that must be applied to the transducer support arm 1304 to allow it to rotate relative to the mounting bracket 1302 can be selectably controlled by controlling the resilient lateral biasing force applied to the ratchet plates 1320.

In the particular example embodiment of FIG. 13B, the resilient biasing force is applied to the ratchet plates 1320 by means of a coaxial assembly comprising a compression stop 1328 that extends coaxially through central openings in each of the mounting bracket 1302, transducer support arm 1304 and ratchet plates 1320, a spacing tube 1330 disposed concentrically about the compression stop 1328, and a pair of spring washers 1332, each of which is compressed axially inward toward the ratchet plates 1320 by means of a corresponding threaded fastener 1334 that engages in a corresponding threaded aperture in a corresponding end of the compression stop 1328. Thus, the force that must be applied to the transducer support arm 1304 to allow it to rotate relative to the mounting bracket 1302 can be selectably adjusted by controlling the spring force exerted by the two spring washers 1332 in compression (e.g., ultimately against spacing tube 1330), i.e., by controlling their spring constant. Loosening of the two threaded fasteners 1334 decompresses the spring washers 1332, and hence, reduces the resilient biasing force acting on the ratchet plates 1320. As discussed below, this enables the angular position of the transducer support arm 1304 relative to the mounting plate 1302 to be adjusted manually using little or no force, whereas, tightening of the two threaded fasteners 1334 increases the resilient biasing force acting on the ratchet plates 1320 to the selected "kick-up" level of force (e.g., to provide proper positioning during motion through water).

As those of some skill will appreciate, it might be desirable to provide a mechanism for returning the transducer assemblies 1308 to a known position, such as illustrated in FIG. 14A, for normal operation after a kick-up event has occurred, or after the user has moved the transducer assemblies 1308 manually to a safe non-operational position, such as illustrated in FIGS. 13A and 14A. As illustrated in, e.g., FIGS. 13A, 14A and 14B, this can be achieved through an end stop mechanism 1336. In the particular example embodiment illustrated in these figures, the end stop mechanism 1336 is rotatably disposed on the pivoting mechanism 1306 for rotational movement relative to the mounting bracket 1302 and the transducer support arm 1304.

The end stop mechanism 1336 includes a location pin 1338 (see, also, FIG. 15A) configured to engage within one of a plurality of adjustment holes 1340 disposed in the transducer support aim 1302 and arrayed in a semicircular pattern about the pivoting mechanism 1306 so as to prevent rotation of the end stop mechanism 1336 relative to the transducer support arm 1304, and a stop tab 1342 disposed to abut the mounting bracket 1302 when the transducer support arm 1304 is disposed in the first angular position, as illustrated in FIG. 14A, and thereby prevent further rotation of the transducer support arm 1304 away from the mounting bracket 1302.

Thus, the position of the end stop mechanism 1336 can be initially set by the user manually using the adjustment holes 1340, for example, as illustrated in FIG. 14A, where the transducer support arm 1304 is shown rotated or deployed to the horizontal position relative to the mounting bracket 1302, i.e., for operational use. Then, an impact force acting on the front end 1312 of the transducer assemblies 1308 of a magnitude equal to or greater than the preselected kick-up value will actuate the ratcheting action of the pivoting mechanism 1306 discussed above and allow the transducer support arm 1304 to rotate to a retracted position, such as that illustrated in FIG. 14B. The end stop mechanism 1336 will rotate with the transducer support arm 1304, as also illustrated in FIG. 14B, because it is physically connected to (e.g., registered to) the arm by the location pin 1338.

Then, to return the transducer support arm 1304 and transducer assemblies 1308 to their original position, a force is applied (e.g., manually) on the top of the transducer support arm 1304 to rotate the arm back to the stop position, which is provided by the stop tab 1338 of the end stop mechanism 1336 coming into abutting contact with the support bracket 1302. The transducer support arm 1304 is then prevented from rotating any further relative to the support bracket 1302 by the end stop mechanism. The user can initially set the end stop position by releasing loosening the threaded fasteners 1334, which as discussed above, releases the compression force on the ratchet plates 1320 and end stop mechanism 1336. The transducer support arm 1304 can then be easily moved to the desired or first angular position illustrated in FIG. 14A and the end stop position can be set by holding the stop tab 1342 of the end stop mechanism 1336 against the attachment bracket 1302, inserting the location pin 1338 into the closest end stop mechanism adjustment hole 1340 and re-tightening the threaded fasteners 1334. In some embodiments, a second end stop mechanism may be implemented on a second side of the support arm 1304 in a mirror like fashion for additional mechanical support.

In the particular embodiment illustrated in the figures, both the teeth 1326 of the ratchet plates 1320 and the adjustment holes 1340 are positioned at about 10 degree intervals, thereby enabling the end stop position of the transducer support arm 204 relative to the mounting bracket 1302 to be set with a resolution of about 10 degrees. This, in turn, enables the deployed angular position of the transducer support arm 1304 and transducer assemblies 1308 relative to the mounting bracket 1302 and the surface of a body of water within which they are immersed to be varied so as to accommodate any tumblehome or rake, i.e., variation from the vertical, in a boat transom to which the transducer support and kick-up assembly 1300 may be attached. Of course, the resolution of the teeth 1326 of the ratchet plates 1320 and the adjustment holes 1340 can be different than that discussed above, depending on the particular application at hand.

FIGS. 15A-15H are views illustrating sequential steps involved in an example method for assembling the transducer support and kick-up assembly 1300. As discussed above and illustrated in FIG. 15A, a "kit" for assembling the assembly 1300 comprises a mounting bracket 1302, a transducer support arm 1304, two pairs of ratchet plates 1320, a compression stop 1328, a spacing tube 1330, a pair of spring washers 1332, a pair of threaded fasteners 1334 and an end stop mechanism 1336.

Figure 15D:
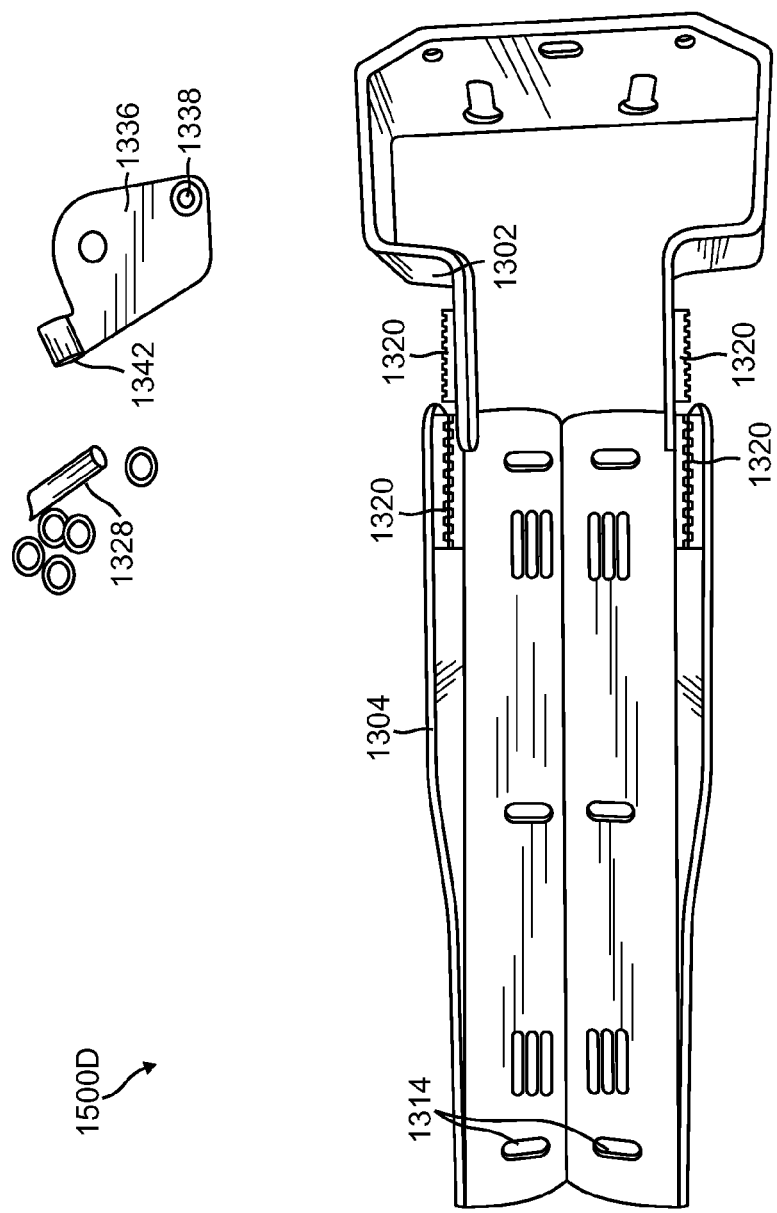
Figure 15E:
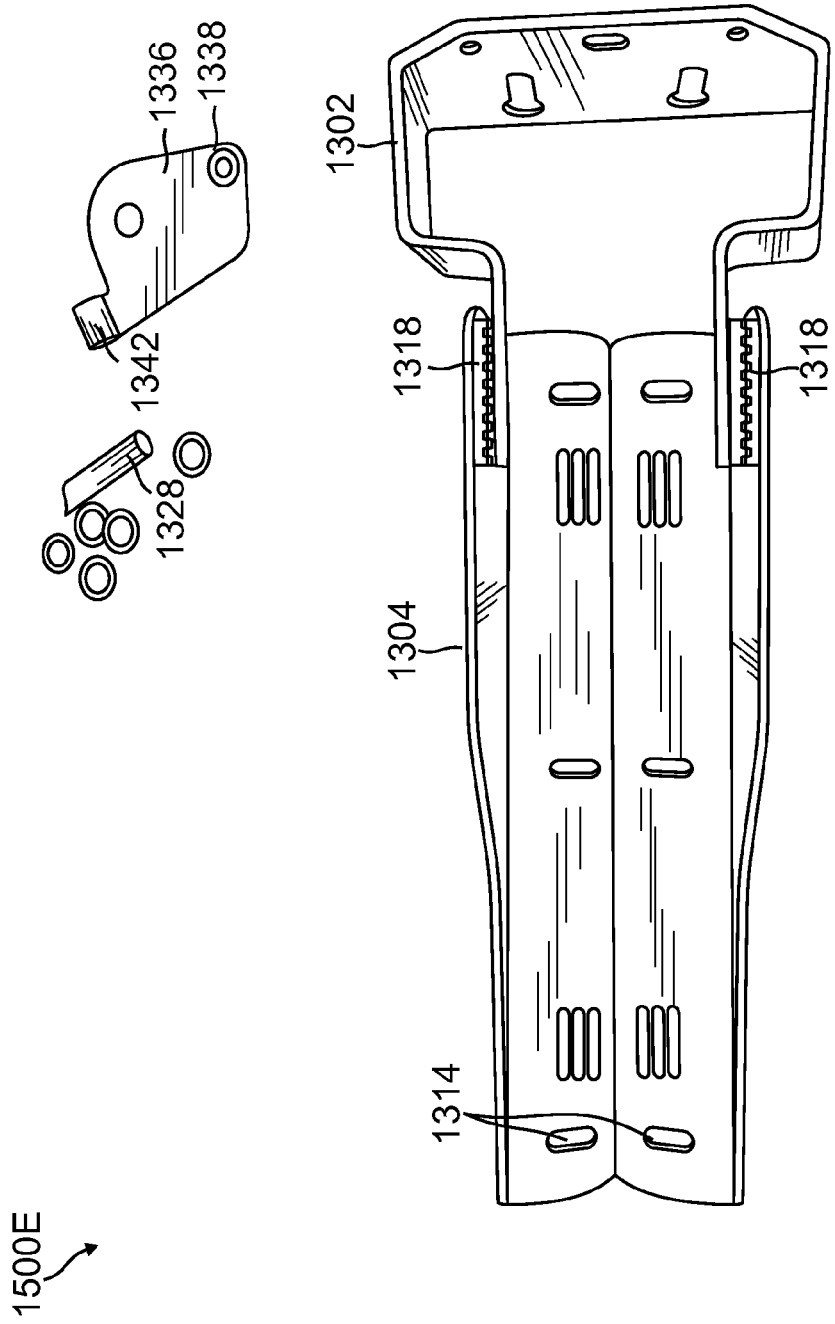

As illustrated in FIGS. 15B and 15C, a first step in the assembly method can comprise snapping the bosses 1322 of the ratchet plates 1320 into the corresponding apertures 1324 in the associated mounting bracket 1302 and transducer support arm 1304. As illustrated in FIG. 15D, after the ratchet plates 1320 have been installed, the ratchet plates 1320 of the mounting bracket 1302 can be slipped between the opposing ratchet plates 1320 of the transducer support arm 1304 to form corresponding pairs 1318 of plates 1320 and such that the respective teeth 1326 of the ratchet plates 1320 interdigitate with the teeth 1326 of the opposing plate 1320 in each pair, resulting in the "loose" assembly illustrated in FIGS. 15E and 15F.

Figure 15F:
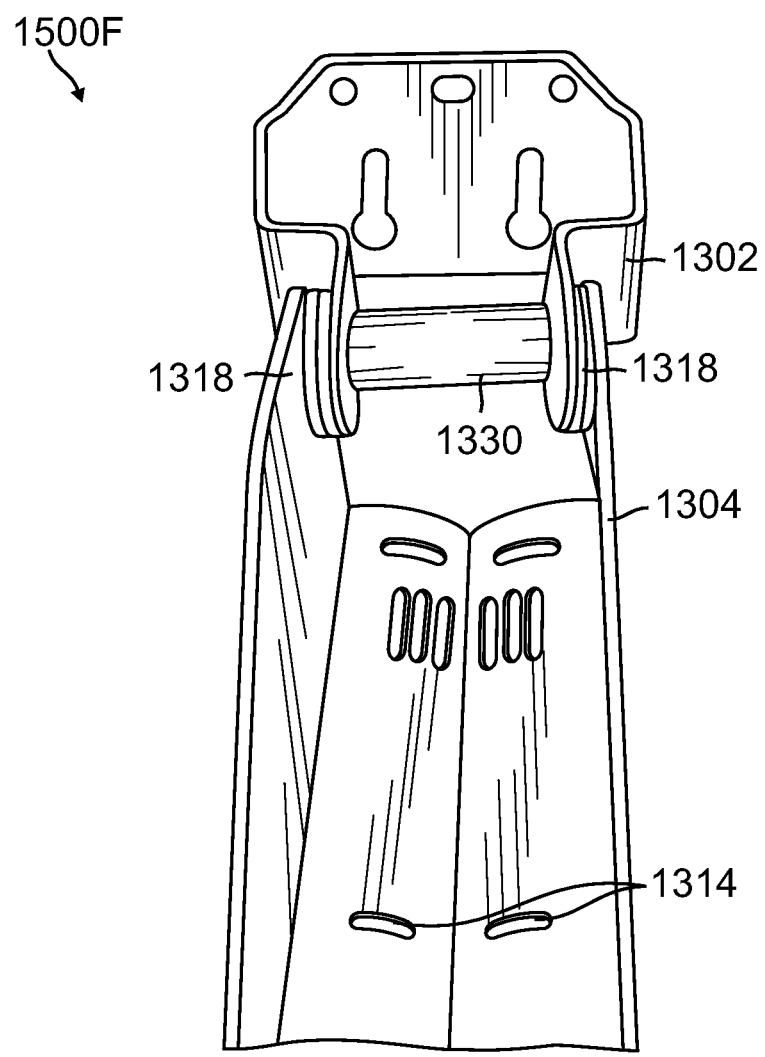
Figure 15G:
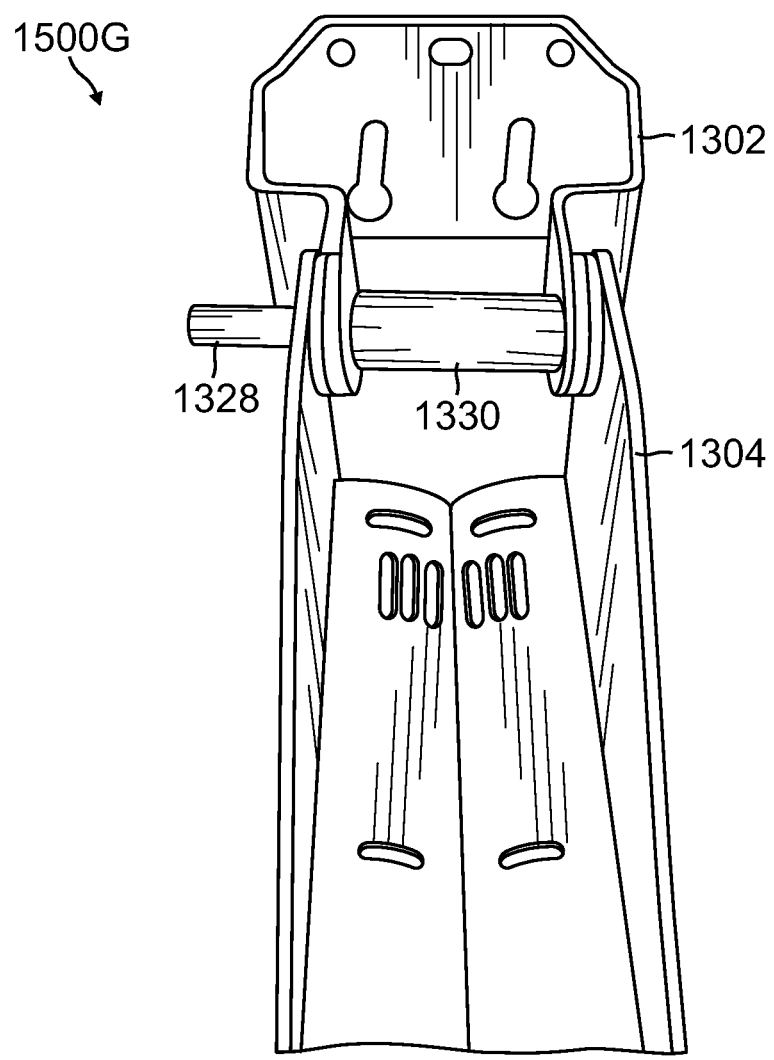
Figure 15H:
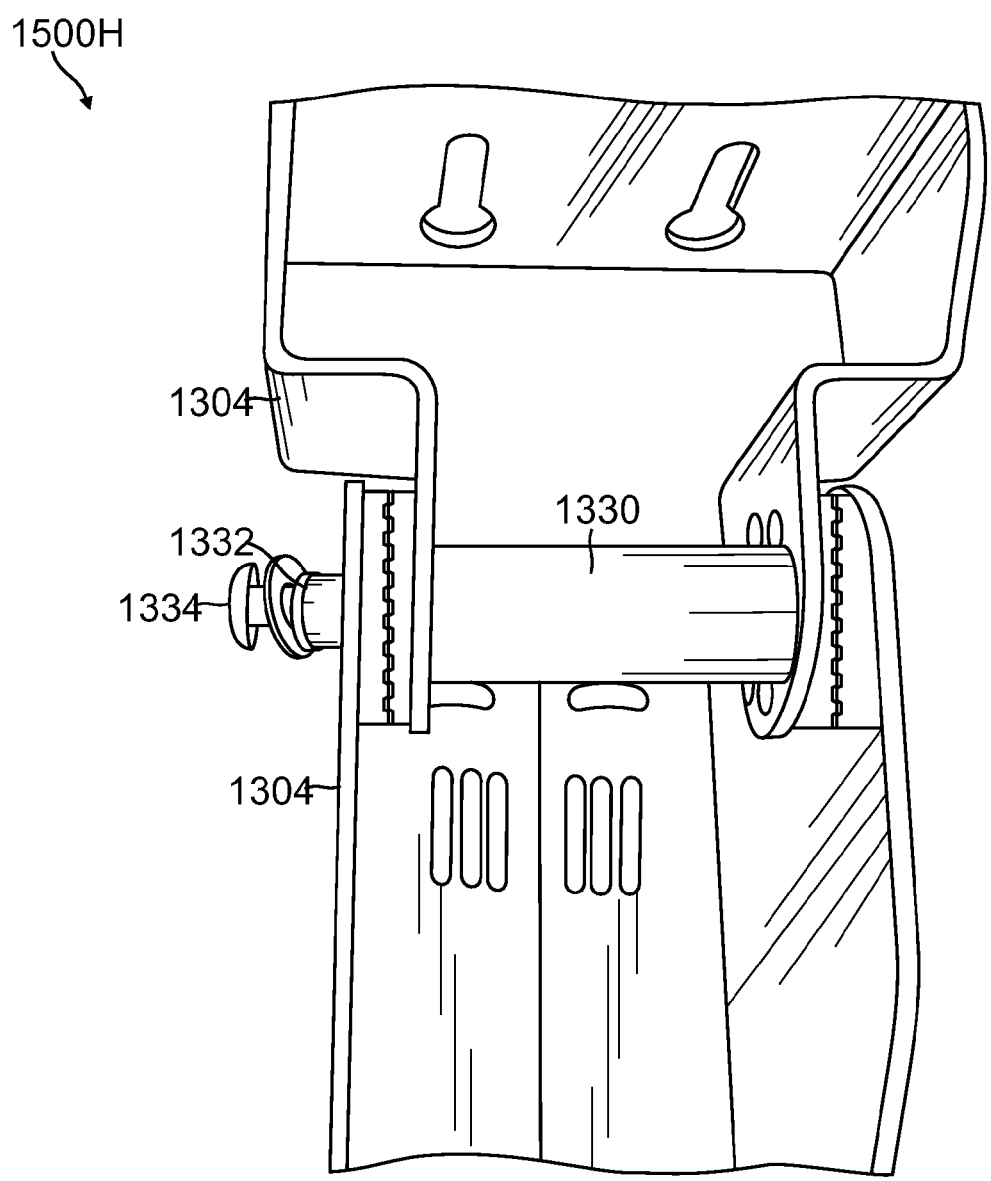

As further illustrated in FIG. 15F, the spacing tube 1330 can then be loosely positioned within the mounting bracket 1302 and between the pairs 1318 of the ratchet plates 1320 and held there while the compression stop 1328 is slid coaxially through central openings in each of the mounting bracket 1302, transducer support arm 1304, ratchet plates 1320, and the spacing tube 1330, as illustrated in FIG. 15G. As illustrated in FIG. 15H, after the compression stop 1328 has been installed, it can be loosely retained in place by installing one of the threaded fasteners 1334 and associated spring washers 1332 in an end of the compression stop 1328 on a side of the transducer support arm/mounting bracket 1304 opposite to the side upon which the end stop mechanism 1336 is to be mounted, resulting in the assembly illustrated in FIG. 15I.

Figure 15J:
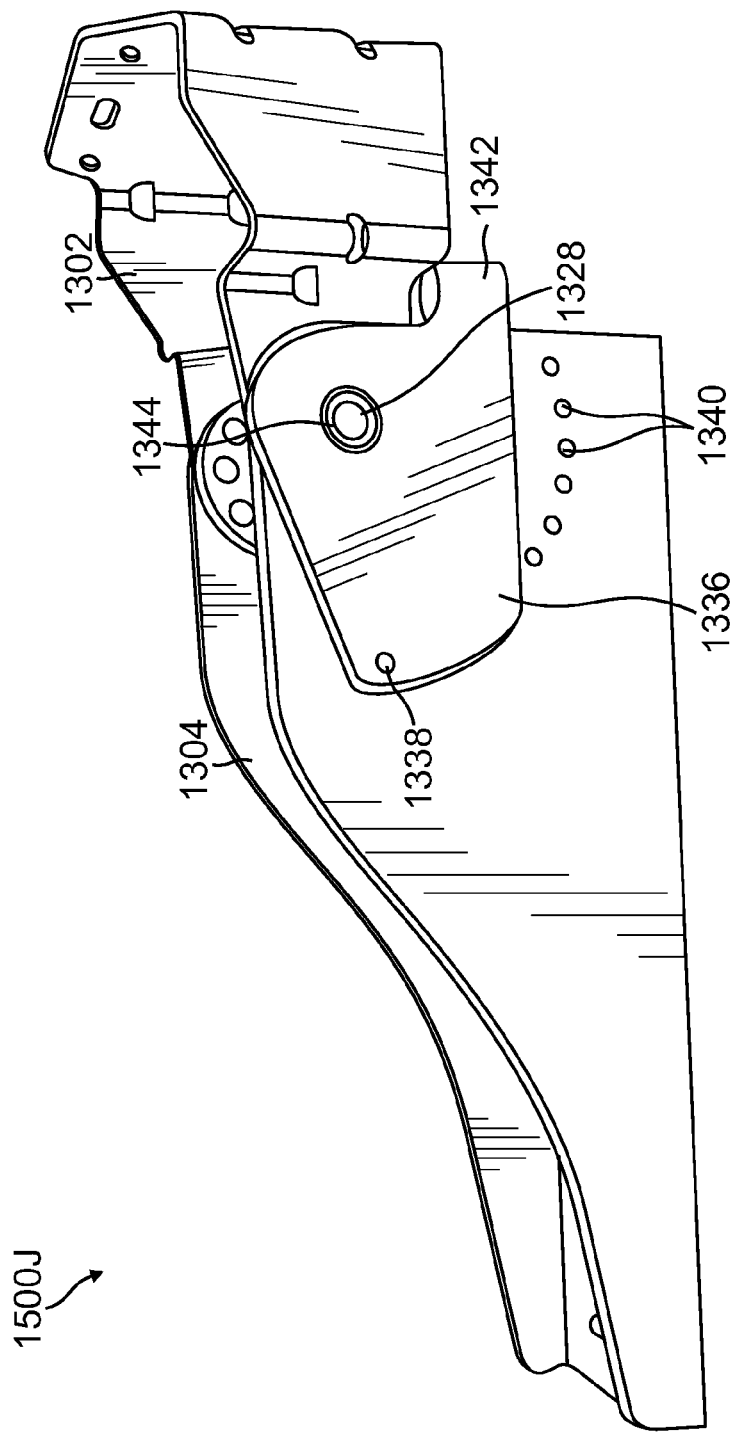
Figure 15K:
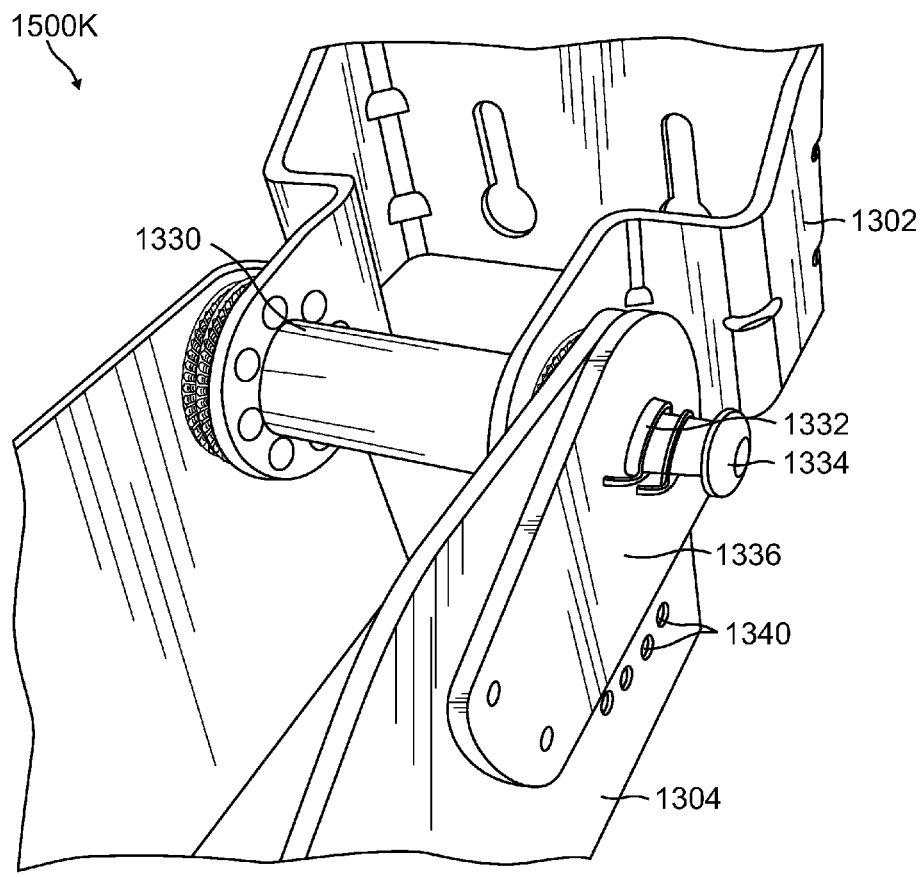
Figure 15L:
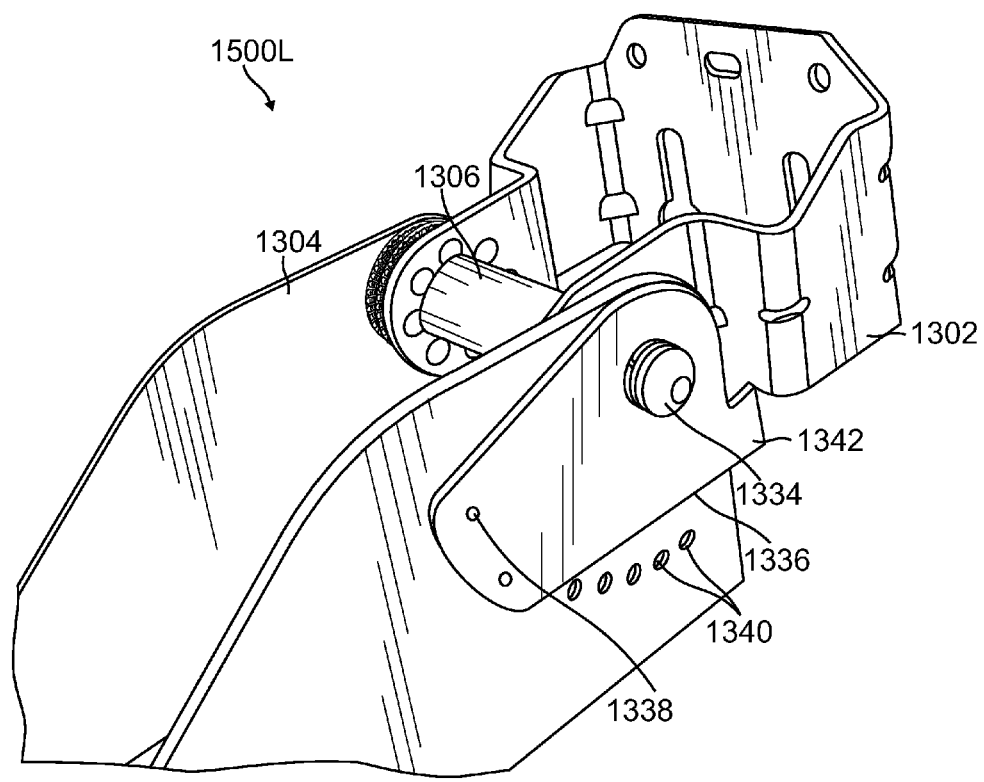
Figure 15M:
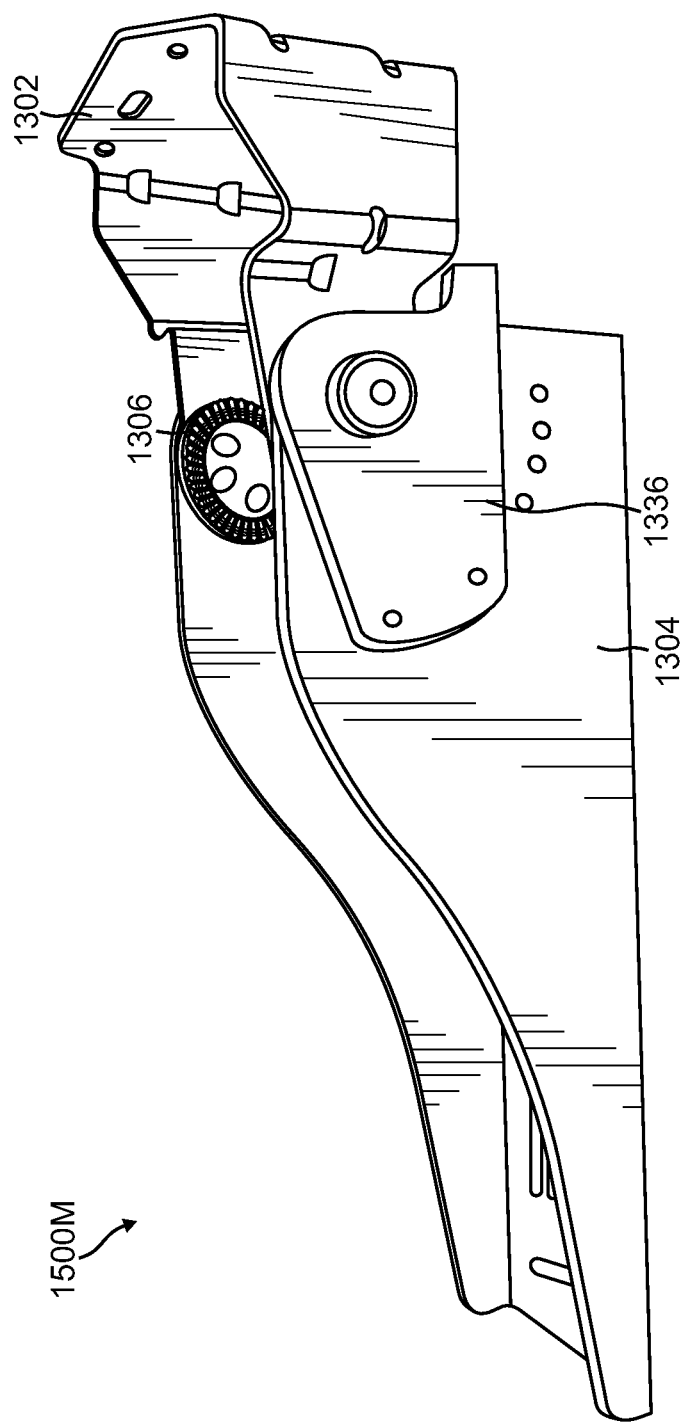
Figure 15N:
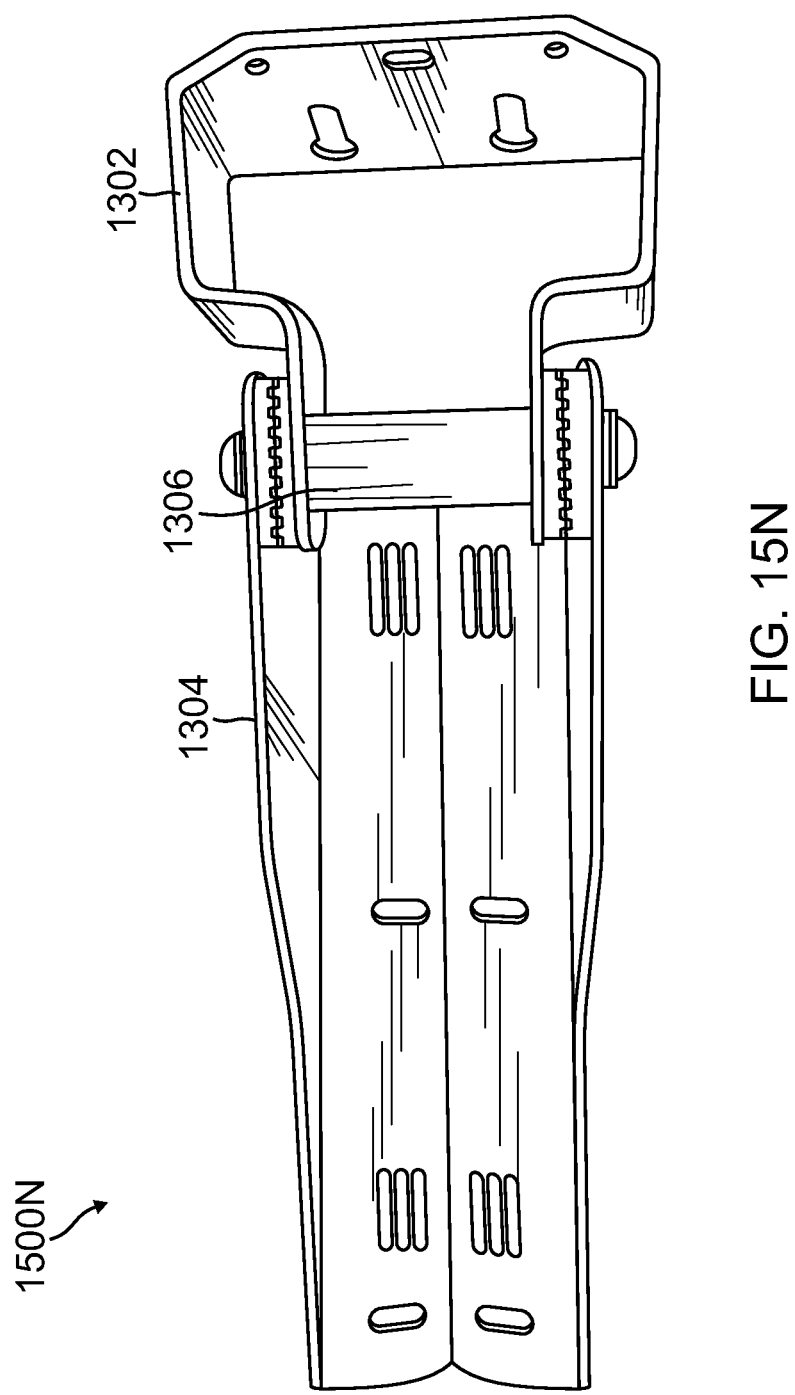
Figure 15O:
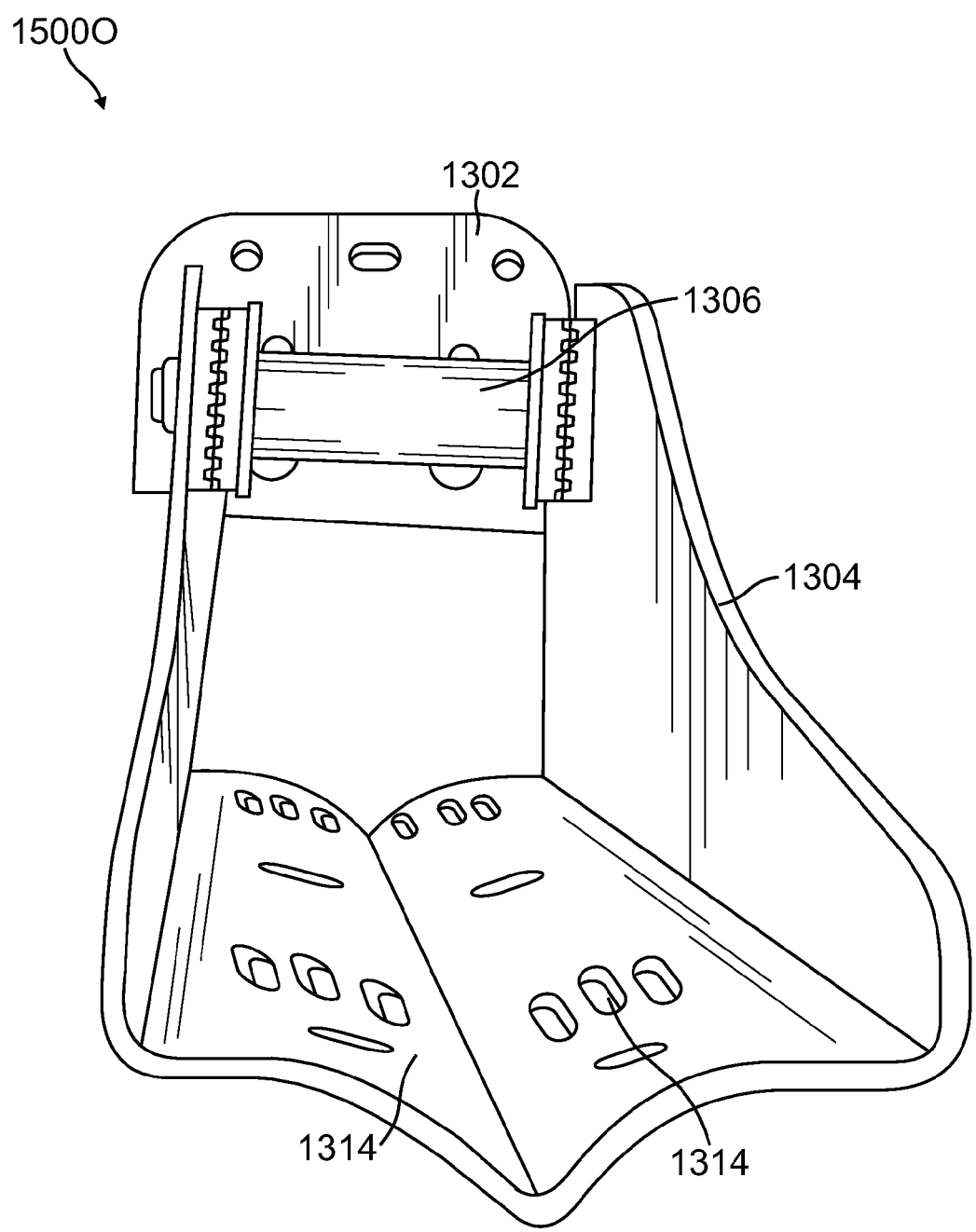

As illustrated in FIGS. 15J, 15K and 15L, the end stop mechanism 1336 can then be positioned against the side of the transducer support arm 1304 on which the associated adjustment holes 1340 are located, with the location pin 1338 disposed within one of the openings 1340, and with an opening 1344 in the end stop mechanism 1336 disposed concentrically over the compression stop 1328, as illustrated in FIG. 15J. As illustrated in FIGS. 15K and 15L, the end stop mechanism 1336 can then be retained in place by installing the other one of the threaded fasteners 1334 through the associated spring washers 1332 and the opening 1344 of the end stop mechanism 1336 and into the other end of the compression stop 1328, and which point, the assembly of the pivoting mechanism 1306 is essentially complete, and resulting in the assembly illustrated in FIGS. 15M, 15N and 15O.

Figure 16A:
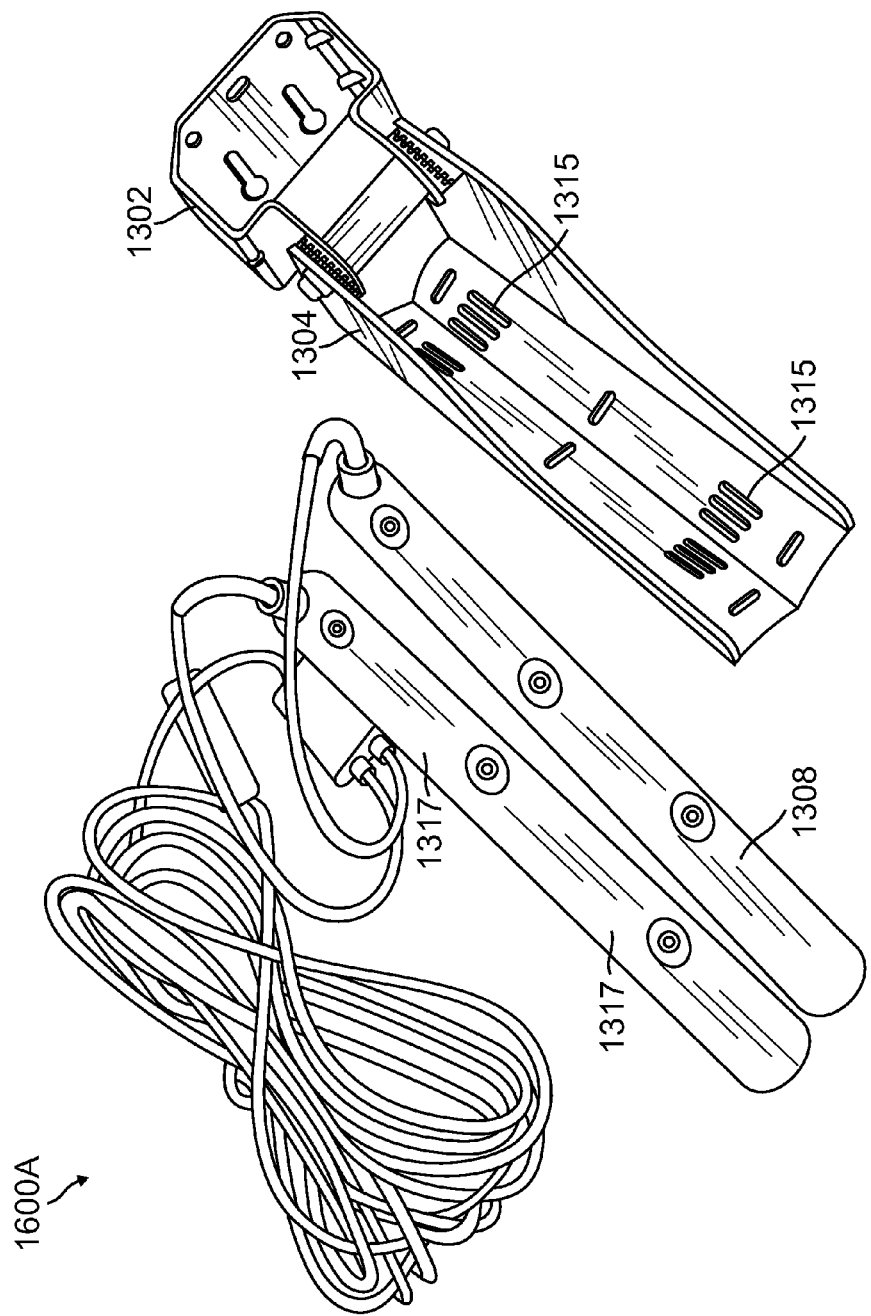
Figure 16C:
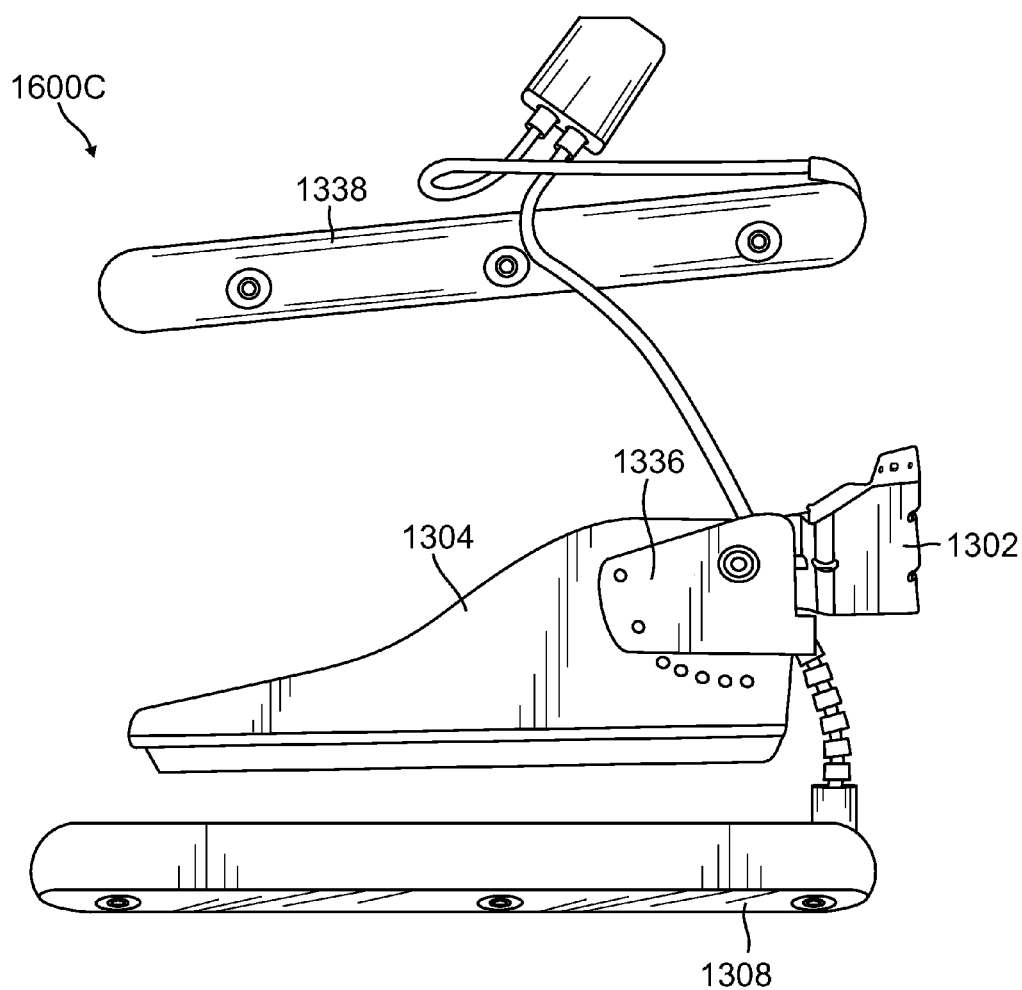
Figure 16D:
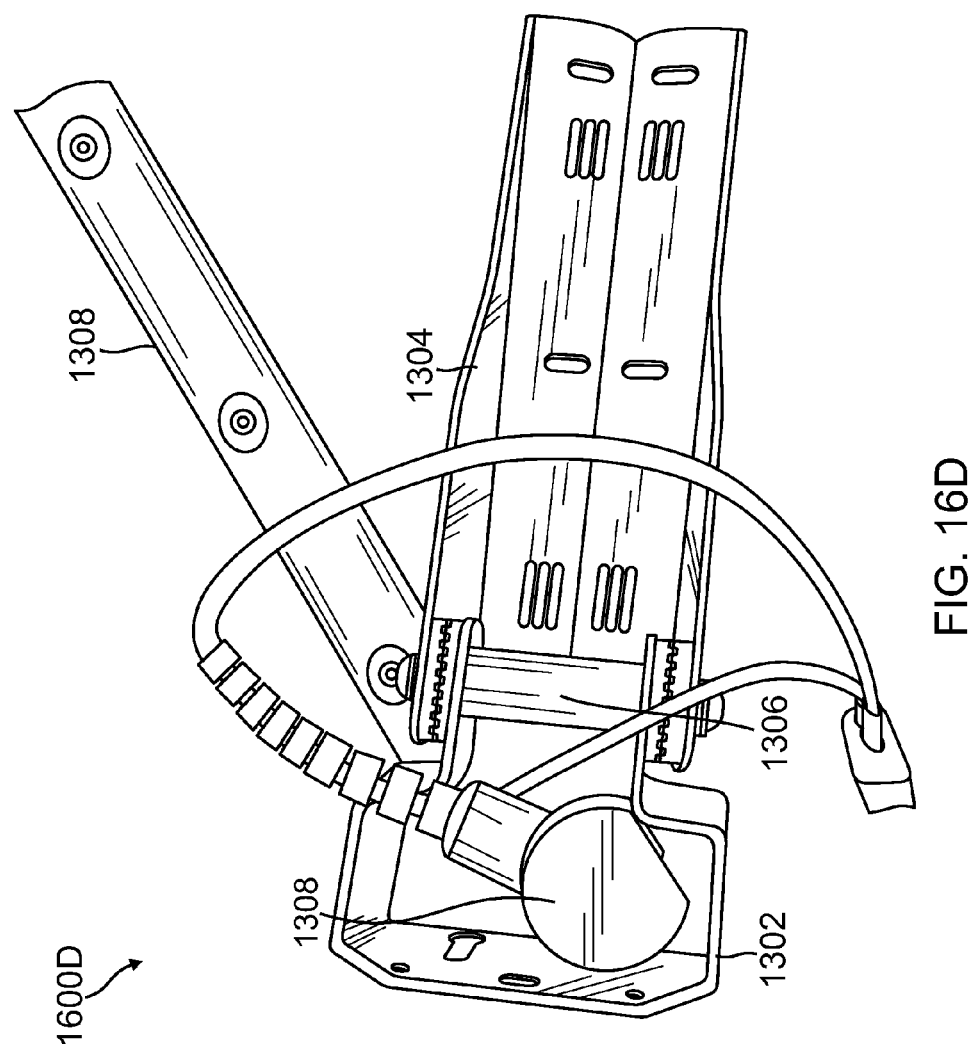
Figure 16E:
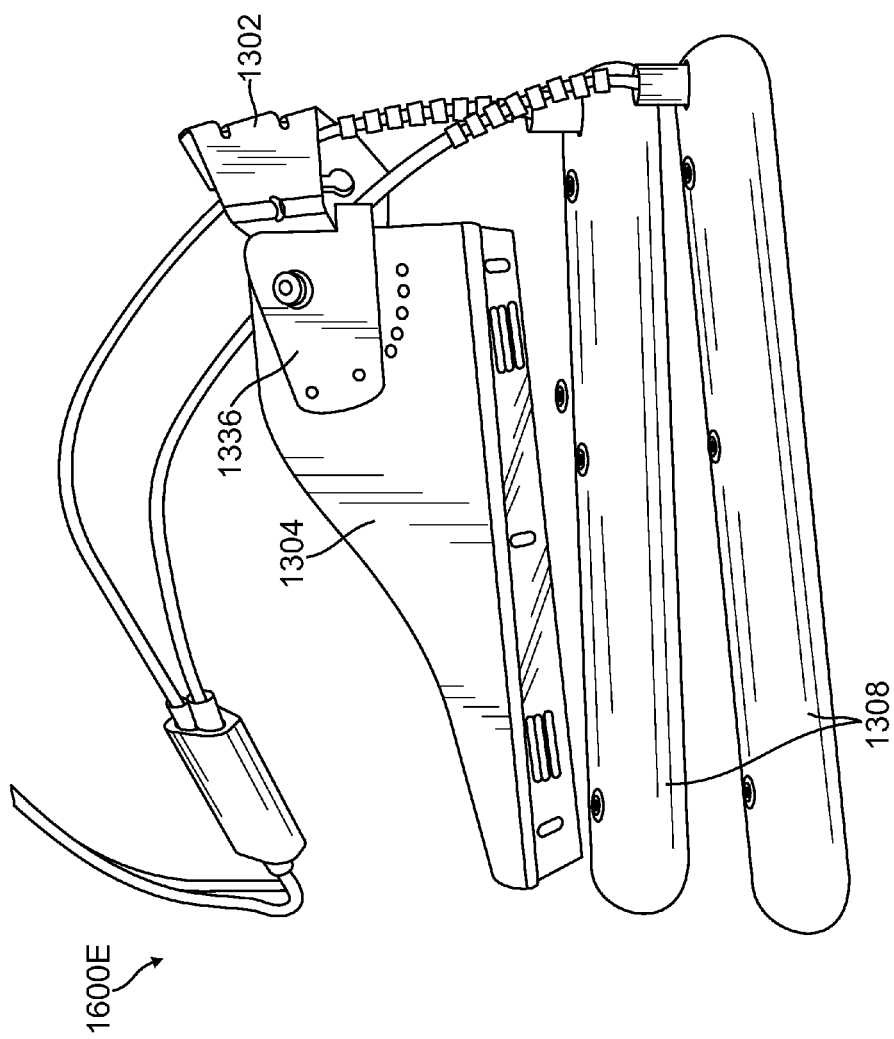

FIGS. 16A-16H illustrate sequential steps involved in an example method for installing one or more transducer assemblies 1308 and associated wiring cables onto the lower surfaces of the transducer support arm 1304 of the assembly 1300, as described in detail above. For example, as shown in FIG. 16A, transducer assemblies 1308 (e.g., along with cabling and/or electronics) may be provided along with transducer support and kick-up assembly 1300 including mounting bracket 1302 and transducer support arm 1304. In embodiments where transducer support and kick-up assembly is assembled, a first one of the transducer assemblies 1308 may be threaded through a void formed between mounting bracket 1302 and transducer support arm 1304, with end stop mechanism 1336 either engaged with mounting bracket 1302 as shown in FIG. 16B, for example, or swung away from mounting bracket 1302 in an at least partially kicked up position (e.g., similar to that shown in FIG. 14B). The second transducer assembly 1308 may then be threaded through in a similar fashion as shown in FIGS. 16C, 16D, and 16E.

Figure 16F:
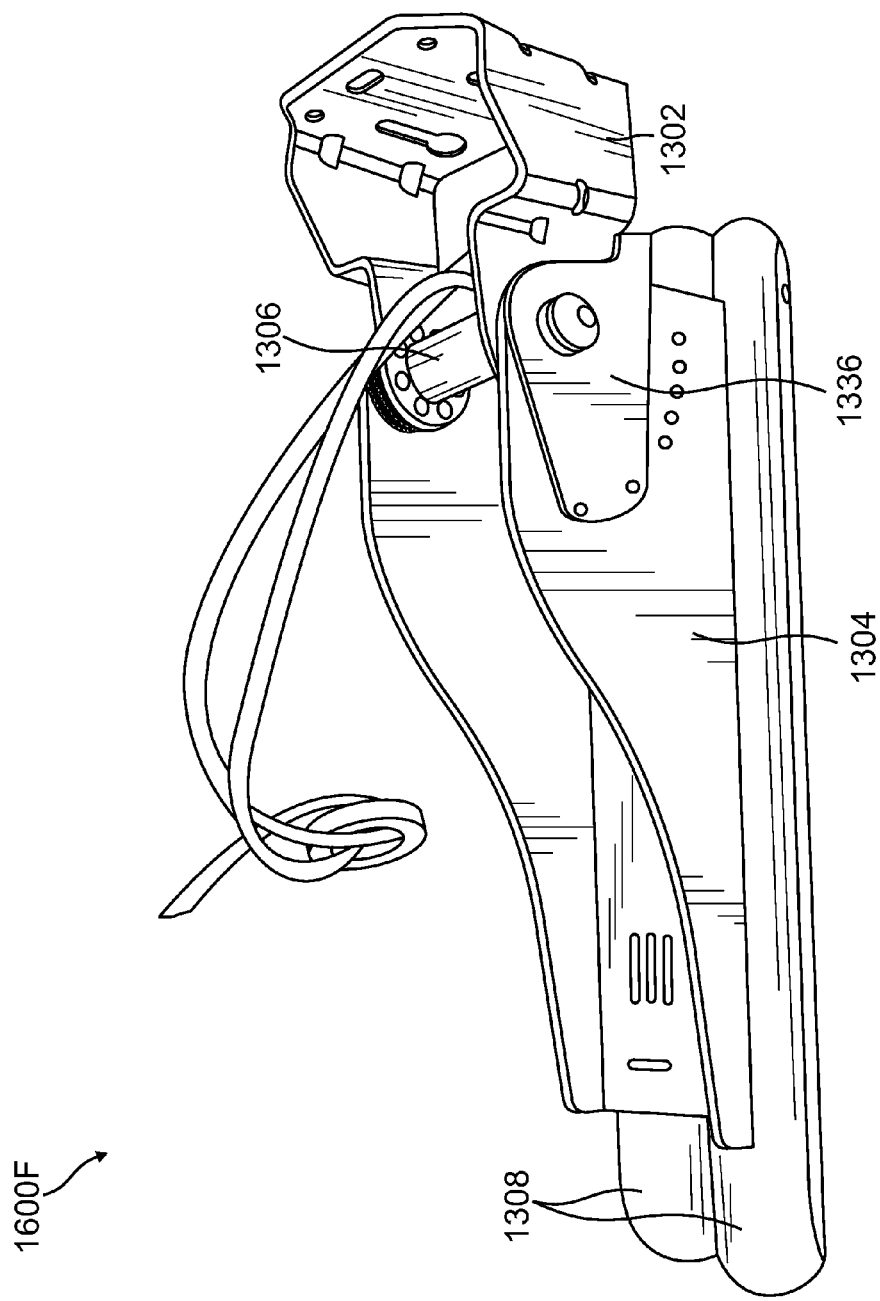
Figure 16G:
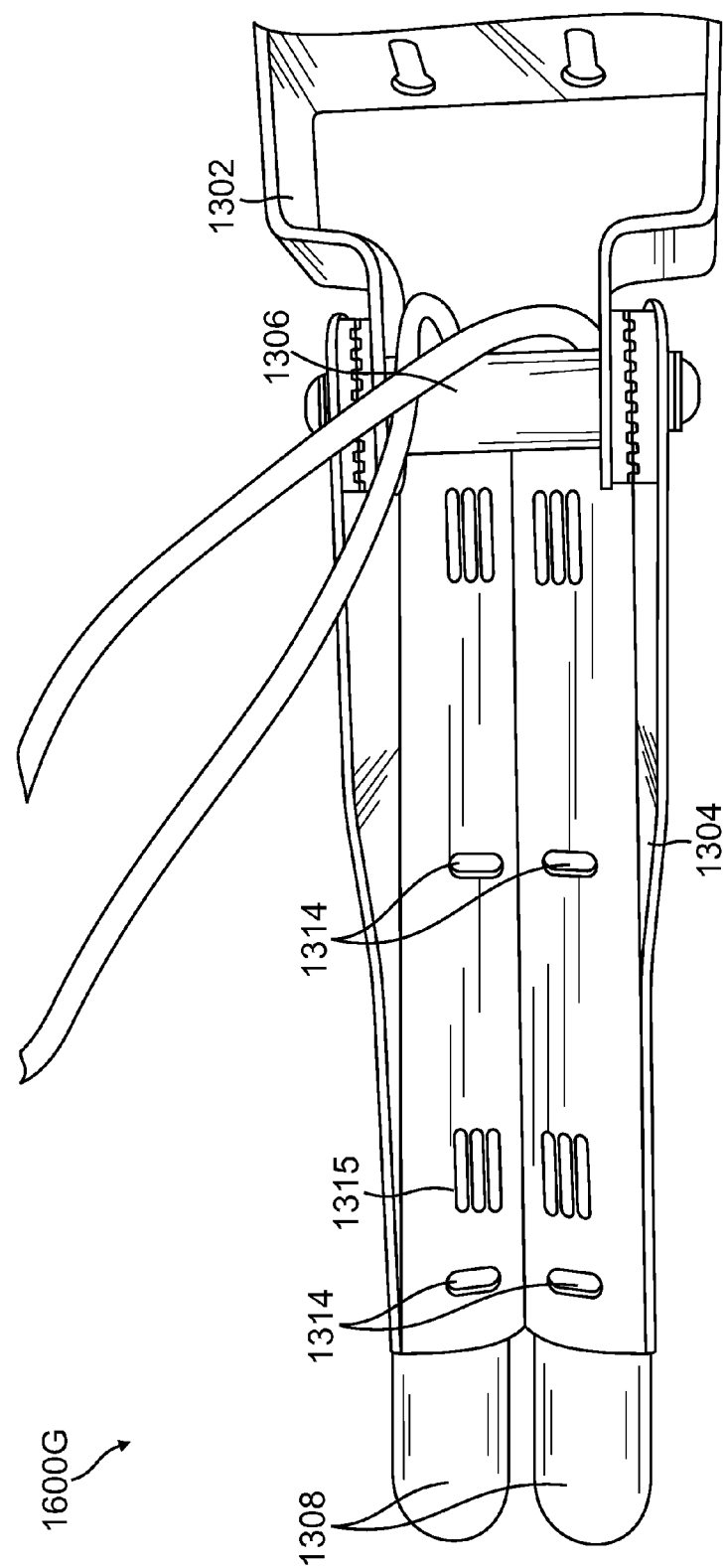
Figure 16H:
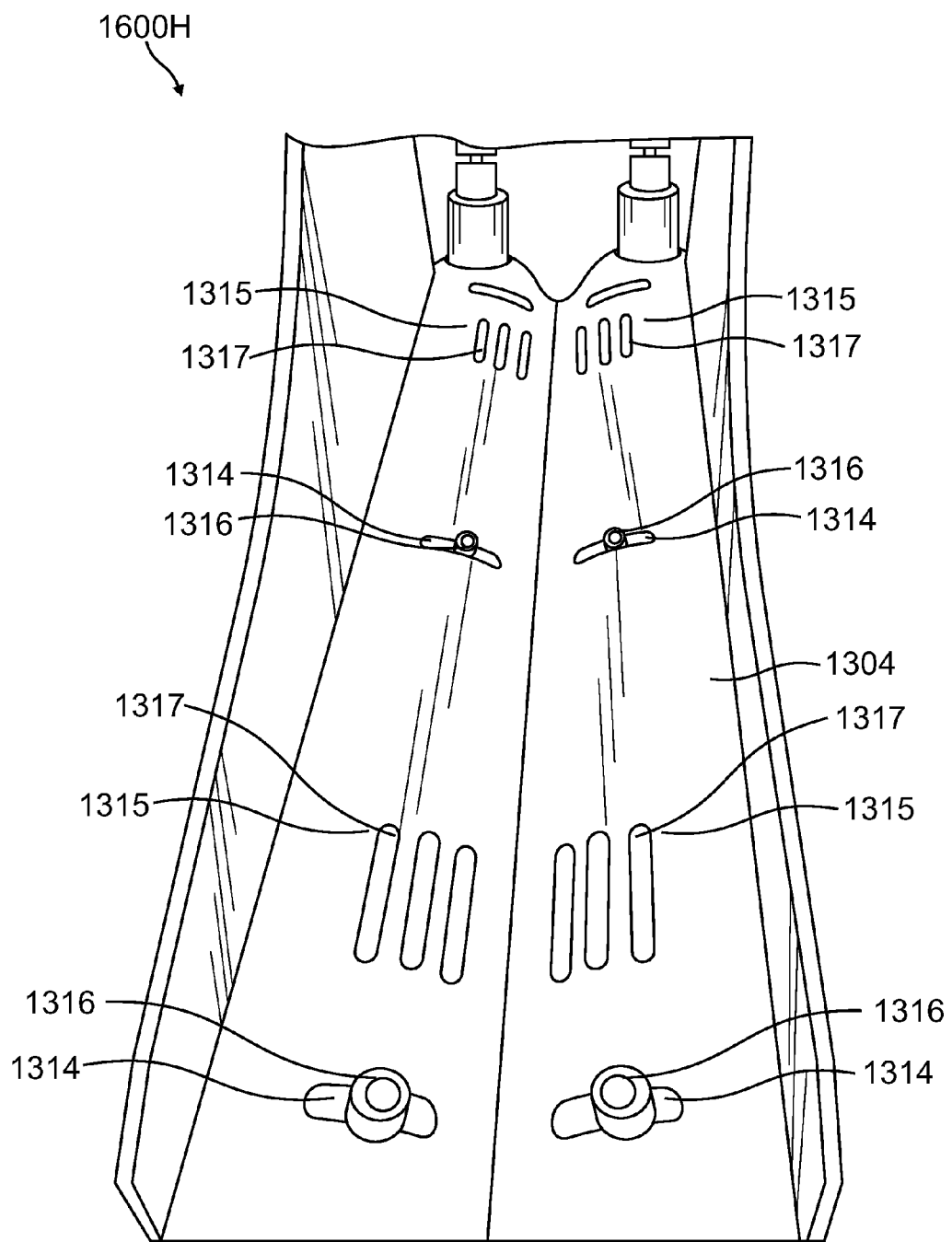

Once transducer assemblies 1308 (e.g., and their associated cabling and/or electronics) are threaded through assembly 1300, the transducer assemblies 1308 may be positioned adjacent to corresponding lower mounting surfaces of the transducer support arm 1304 as shown in FIGS. 16F and 16G. For example, as shown in FIG. 16G, a first pair of aligned elongate nubs 1317 protruding from a top outer surface of a first transducer assembly may be positioned within one pair of the three pairs of transducer assembly alignment slots 1315 (e.g., each pair including an alignment slot near pivoting mechanism 1306 and a similarly aligned slot near an opposite end of transducer support arm 1304, as shown) to select a particular known depression angle for the first transducer assembly, and a second pair of aligned elongate nubs 1317 protruding from the second transducer assembly may be positioned within the mirror pair of transducer assembly alignment slots 1315 to select the same known depression angle for the second transducer assembly before securing both transducer assemblies 1308 to transducer support arm 1304 using threaded fasteners 1316 threaded through circumferential slots 1314 and into threaded holes in transducer assemblies 1308 as shown in FIGS. 16G and 16H.

The various embodiments described herein may each include various repeatable and/or identical internal and/or external structures, may be formed from various similar and/or identical materials, and/or may be fabricated using various repeatable and/or identical manufacturing processes, each of which may be selected to increase yield rates with relatively small dimensional tolerances (e.g., resulting in highly reliable and accurate devices at volume) and to reduce manufacturing costs across a large range of product lines. Moreover, the various embodiments described herein provide a modular methodology to the design, manufacture, and use of sonar systems that reduces overall system cost and provides the additional features and greater ease of use that arise from the increased system accuracy, flexibility, and control offered by embodiments of the present disclosure.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system, comprising:
a mounting bracket;
a transducer support arm;
a pivoting mechanism pivotably coupling the transducer support arm to the mounting bracket such that,
for forces acting on the transducer support arm that are less than a preselected kick-up level, the pivoting mechanism holds the transducer support arm against those forces and at a user selectable first angular position relative to the mounting bracket, and
for forces acting on the transducer support arm that are equal to or greater than the preselected kick-up level, the pivoting mechanism allows the transducer support arm to be moved by those forces to a second angular position relative to the mounting bracket; and an end stop mechanism rotatably disposed on the pivoting mechanism for rotational movement relative to the mounting bracket and the transducer support arm, the end stop mechanism including a location pin configured to engage within one of a plurality of adjustment holes disposed in the transducer support arm and arrayed in a semicircular pattern about the pivoting mechanism to prevent rotation of the end stop mechanism relative to the transducer support arm, and a stop tab disposed to abut the mounting bracket when the transducer support arm is disposed in the first angular position to prevent further rotation of the transducer support arm away from the mounting bracket.

2. The system of claim 1, wherein the mounting bracket is coupled to a transom of a vessel disposed on a surface of a body of water and further comprising a transducer assembly coupled to the transducer support arm such that the transducer assembly is disposed substantially below a hull of the vessel when the transducer support arm is disposed in the first angular position and substantially above a lower trailing edge of the transom when the transducer support arm is disposed in the second angular position.

3. The system of claim 2, wherein the transducer assembly is elongated and arranged on the transducer support arm to be conveyed by the vessel longitudinally through the body of water, the forces acting on the transducer support arm comprise forces acting on a forward end of the transducer assembly, and the kick-up level corresponds to a force imparted to the forward end of the transducer assembly by a collision of the transducer assembly with an object submerged below the surface of the body of water.

4. The system of claim 2, wherein the transducer assembly has an arcuate upper surface, the transducer support arm has an arcuate lower surface corresponding to the arcuate upper surface of the transducer assembly, the arcuate lower surface of the transducer support arm has a circumferential slot extending through it, and the transducer assembly is coupled to the transducer support arm at an adjustable angular position relative to the transducer support arm with a fastener that extends through the circumferential slot and into the transducer assembly.

5. The system of claim 1 wherein the pivoting mechanism comprises a pair of ratchet plates respectively coupled to an associated one of the mounting bracket and the transducer support arm for conjoint rotation therewith, each plate having a plurality of laterally extending radial teeth interdigitated with the teeth of the other plate, the plates being biased toward each other laterally with a resilient biasing force such that rotation of one plate relative to the other causes the two plates to be forced apart laterally and against the resilient biasing force.

6. The system of claim 5, wherein the teeth of each ratchet plate are arrayed at equal angular increments of about 10 degrees.

7. The system of claim 1, wherein the adjustment holes of the transducer support arm are arrayed at equal angular increments of about 10 degrees.

8. The system of claim 1, further comprising:

a transducer assembly coupled to the transducer support arm, the transducer assembly being capable of producing and emitting an acoustic beam in response to the application of an electrical signal thereto, and receiving an acoustic return and converting it to an electrical signal;

a controller operable to apply electrical signals to the transducer assembly and to receive electrical signals therefrom;

a user interface for inputting user commands to the controller; and an electroconductive harness for interconnecting the user interface, the transducer assembly and the controller and for conveying the user commands and electrical signals between them.

9. The system of claim 8, wherein the user interface comprises:

a logic device for converting the electrical signals received from the transducer assembly into image data; and a display for visually displaying the image data to a user of the system.

10. A method, comprising:

providing a mounting bracket;

pivotably coupling a transducer support arm to the mounting bracket with a pivoting mechanism such that, for forces acting on the transducer support arm that are less than a preselected kick-up level, the pivoting mechanism holds the transducer support arm against those forces and at a user selectable first angular position relative to the mounting bracket, and for forces acting on the transducer support arm that are equal to or greater than the preselected kick-up level, the pivoting mechanism allows the transducer support arm to be moved by those forces to a second angular position relative to the mounting bracket;

rotatably disposing an end stop mechanism on the pivoting mechanism for rotational movement relative to the mounting bracket and the transducer support arm;

rotating the transducer support arm to the first angular position relative to the mounting bracket; and engaging a location pin on the end stop mechanism within one of a plurality of adjustment holes disposed in the transducer support arm and arrayed in a semicircular pattern about the pivoting mechanism such that the end stop mechanism is prevented from rotating relative to the transducer support arm, and a stop tab disposed on the end stop mechanism is disposed in abutment with the mounting bracket so as to prevent further rotation of the transducer support arm away from the mounting bracket.

11. The method of claim 10, further comprising:

coupling the mounting bracket to a transom of a vessel disposed on a surface of a body of water; and coupling a transducer assembly to the transducer support arm such that the transducer assembly is disposed substantially below a hull of the vessel when the transducer support arm is disposed in the first angular position and substantially above a lower trailing edge of the transom when the transducer support arm is disposed in the second angular position.

12. The method of claim 11, further comprising:

disposing the transducer support arm in the first angular position such that the transducer assembly is disposed substantially below the hull of the vessel; and conveying the transducer assembly through the body of water using the vessel.

13. The method of claim 12, further comprising striking an object submerged below the surface of the body of water with the transducer assembly and with a force greater than the kick-up level, such that the pivoting mechanism allows the transducer support arm to be moved by that force to the second angular position relative to the mounting bracket.

14. The method of claim 10, further comprising:
manually rotating the transducer support arm from the first angular position relative to the mounting bracket to the second angular position relative to the mounting bracket; and
manually rotating the transducer support arm from the second angular position relative to the mounting bracket back to the first angular position relative to the mounting bracket, such that the stop tab on the end stop mechanism is disposed in abutment with the mounting bracket so as to prevent further rotation of the transducer support arm away from the mounting bracket and the transducer assembly is disposed substantially below the hull of the vessel.

15. A method, comprising:
providing a mounting bracket;
providing a transducer support arm; and
pivotally coupling the transducer support arm to the mounting bracket with a pivoting mechanism that holds the transducer support arm at a user selectable first angular position relative to the mounting bracket and against forces acting on the transducer support arm that are less than a preselected kick-up level, and
allows the transducer support arm to be moved to a second angular position relative to the mounting bracket by forces acting on the transducer support arm that are equal to or greater than the preselected kick-up level;
rotatably disposing an end stop mechanism on the pivoting mechanism for rotational movement relative to the mounting bracket and the transducer support arm;
rotating the transducer support arm to the first angular position relative to the mounting bracket; and
engaging a location pin on the end stop mechanism within one of a plurality of adjustment holes disposed in the transducer support arm and arrayed in a semicircular pattern about the pivoting mechanism such that
the end stop mechanism is prevented from rotating relative to the transducer support arm, and
a stop tab disposed on the end stop mechanism is disposed in abutment with the mounting bracket so as to prevent further rotation of the transducer support arm away from the mounting bracket.

16. The method of claim 15, further comprising:
coupling a transducer assembly to a lower surface of the transducer support arm, wherein
the transducer assembly has an arcuate upper surface,
the transducer support arm has an arcuate lower surface corresponding to the arcuate upper surface of the transducer assembly,
the arcuate lower surface of the transducer support arm has a circumferential slot extending through it, and
the coupling comprises adjusting an angular position of the transducer assembly relative to the transducer support arm and fastening the transducer assembly to the transducer support arm with a fastener extending through the circumferential slot and into the transducer assembly.

17. The method of claim 16, further comprising electroconductively interconnecting the transducer assembly with a transducer controller.

* * * * *

UNITED STATES PATENT AND TRADEMARK OFFICE
CERTIFICATE OF CORRECTION

PATENT NO. : 9,947,309 B2
APPLICATION NO. : 14/749007
DATED : April 17, 2018
INVENTOR(S) : Paul Stokes et al.

It is certified that error appears in the above-identified patent and that said Letters Patent is hereby corrected as shown below:

In the Specification

In Column 15, Line 21, change "may be faulted from" to --may be formed from--.

In Column 15, Lines 58 and 59, change "may be deter mined" to --may be determined--.

In Column 16, Line 3, change "may be Ruined" to --may be formed--.

In Column 29, Line 37, change "transducer support aim" to --transducer support arm--.

Signed and Sealed this
Twenty-fourth Day of July, 2018

Andrei Iancu
*Director of the United States Patent and Trademark Office*